(12) United States Patent
Smith et al.

(10) Patent No.: US 8,553,037 B2
(45) Date of Patent: Oct. 8, 2013

(54) DO-IT-YOURSELF PHOTO REALISTIC TALKING HEAD CREATION SYSTEM AND METHOD

(76) Inventors: Shawn Smith, Los Angeles, CA (US); Michael Cheiky, Camarillo, CA (US); Peter Gately, Santa Barbara, CA (US)

(*) Notice: Subject to any disclaimer, the term of this patent is extended or adjusted under 35 U.S.C. 154(b) by 1049 days.

(21) Appl. No.: 12/296,912

(22) PCT Filed: Apr. 10, 2006

(86) PCT No.: PCT/US2006/013679
§ 371 (c)(1),
(2), (4) Date: Sep. 22, 2009

(87) PCT Pub. No.: WO2008/156437
PCT Pub. Date: Dec. 24, 2008

(65) Prior Publication Data
US 2010/0007665 A1    Jan. 14, 2010

Related U.S. Application Data

(63) Continuation-in-part of application No. 10/219,689, filed on Aug. 14, 2002, now Pat. No. 7,027,054.

(51) Int. Cl.
*G06T 13/00* (2011.01)
*G06F 17/00* (2006.01)

(52) U.S. Cl.
USPC .......................................... 345/473; 345/474

(58) Field of Classification Search
CPC ............................ G06T 13/40; G06T 15/005
USPC ........................................................ 345/743
See application file for complete search history.

(56) References Cited

U.S. PATENT DOCUMENTS

| 4,276,570 A | * | 6/1981 | Burson et al. | 382/276 |
| 4,841,575 A | * | 6/1989 | Welsh et al. | 704/260 |

* cited by examiner

*Primary Examiner* — Kee M Tung
*Assistant Examiner* — Frank Chen
(74) *Attorney, Agent, or Firm* — Harvey Lunenfeld

(57) ABSTRACT

A do-it-yourself photo realistic talking head creation system comprising: a template; handheld device comprising display and video camera having an image output signal of a subject; a computer having a mixer program for mixing the template and image output signal of the subject into a composite image, and an output signal representational of the composite image; a computer adapted to communicate the composite image signal to the display for display to the subject as a composite image; the display and the video camera adapted to allow the video camera to collect the image of the subject, the subject to view the composite image, and the subject to align the image of the subject with the template; storage means having an input for receiving the output signal of the video camera representational of the collected image of the subject and storing the image of the subject substantially aligned with the template.

75 Claims, 37 Drawing Sheets

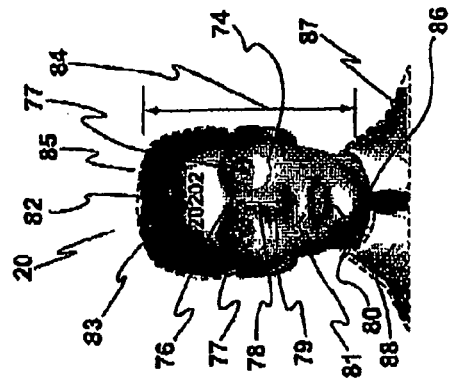
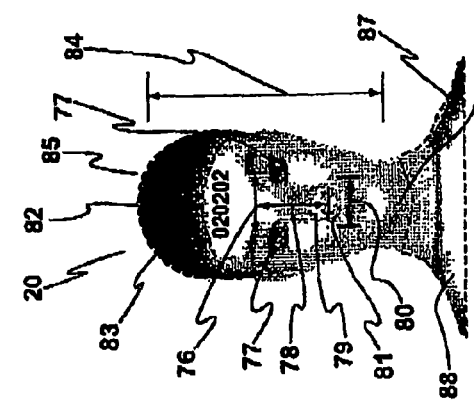
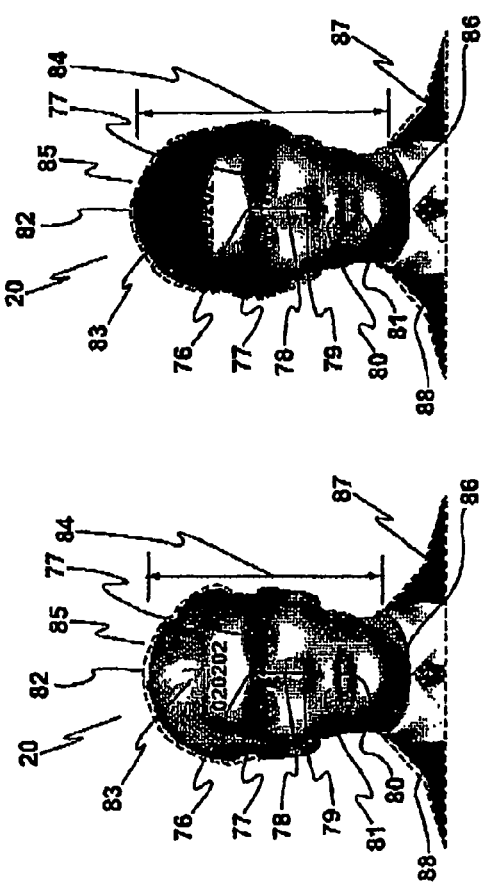
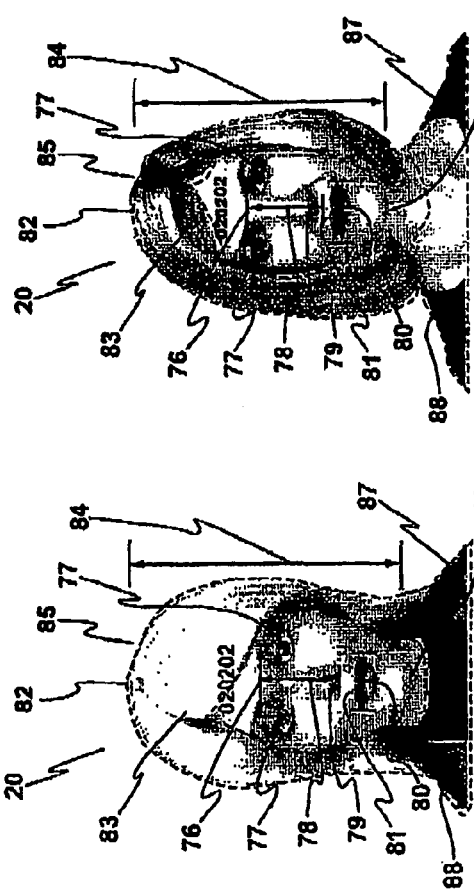

DO-IT-YOURSELF PHOTO REALISTIC TALKING HEAD CREATION SYSTEM AND METHOD

CROSS-REFERENCES TO RELATED APPLICATIONS

This application is a continuation-in-part of U.S. patent application Ser. No. 10/219,689, filed Aug. 14, 2002, now U.S. Pat. No. 7,027,054, the full disclosure of which is incorporated herein by reference. The present application is the National Stage Application of International Application No. PCT/US06/13679, filed Apr. 10, 2006, which is a continuation-in-part of U.S. patent application Ser. No. 10/219,689, filed Aug. 14, 2002, now U.S. Pat. No. 7,027,054, the full disclosures of which all are incorporated herein by reference. The above referenced documents are not admitted to be prior art with respect to the present invention by their mention herein.

BACKGROUND OF THE INVENTION

1. Field of the Invention

The present invention relates generally to talking heads and more particularly to the construction of photo realistic talking heads.

2. Background Art

Digital communications are an important part of today's world. Individuals and businesses communicate with each other via networks of all types, including the internet, each of which is typically bandwidth limited. Personal computers, hand held devices, personal digital assistants (PDA's), web-enabled cell phones, e-mail and instant messaging services, pc phones, video conferencing, and other suitable means are used to convey information between users, and satisfy their communications needs via wireless and hard wired networks. Information is being conveyed in both animated and text based formats having video and audio content, with the trend being toward animated human beings, which are capable of conveying identity, emphasizing points in a conversation, and adding emotional content. In most instances, however, photographic realistic images of actual human beings having motion have been limited and/or of low quality, as a result of artifacts that blur the video image when compressed to reduce file size and streamed to reduce download time.

Various methods have been used to generate animated images of talking heads, which yield more personalized appearance of newscasters, for example, yet these animated images typically lack the photo realistic quality required to convey personal identity, emphasize points in a conversation, and add emotional content, are often blurred, have poor lip synchronization, require substantially larger bandwidths than are typically available on most present day networks and/or the internet, and are difficult and time consuming to create.

News casting is a fundamental component of electronic communications media, the newscaster format being augmented by graphics and pictures, associated with news coverage, the use of animated images of talking heads, having photo realistic quality and yielding personalized appearance is one of many applications in which such talking heads may be used.

There is thus a need for a do-it-yourself photo realistic talking head creation system and method, which allows a user to generate photo realistic animated images of talking heads, such as newscasters, quickly, easily, and conveniently. The do-it-yourself photo realistic talking head creation system and method should yield images that have the photo realistic quality required to convey personal identity, emphasize points in a conversation, and add emotional content, show the animated photo realistic images clearly and distinctly, with high quality lip synchronization, and require less bandwidth than is typically available on most present day networks and/or the internet.

The do-it-yourself photo realistic talking head creation system and method should be capable of capturing frames of an actual human being, and creating a library of photo realistic talking heads in different angular positions. The library of photo realistic talking heads may then be used to create an animated performance of, for example, a newscaster or other such talking head having the photo realistic quality required to convey personal identity, emphasize points in a conversation, and add emotional content. The animated photo realistic images should show the animated talking head clearly and distinctly, with high quality lip synchronization, and require less bandwidth than is typically available on most present day networks and/or the internet.

The library of photo realistic talking heads should be capable of being constructed quickly, easily, and efficiently by an individual having ordinary computer skills, and minimizing production time, using guides, which may be used as templates for mixing and alignment with images of an actual human being in different angular positions.

A library of different ones of the guide libraries should be provided, each of the guide libraries having different ones of the guides therein, and each of the guides for a different angular position. Each of the guide libraries should having facial features different one from the other, thus, allowing a user to select the guide library from the library of different ones of the guide libraries, having facial features and characteristics close to those of the user.

The talking heads should be capable of being used in a newscaster format, associated with news coverage, the use of animated images of talking heads, having photo realistic quality and yielding personalized appearance, for use in a number and variety of applications.

The do-it-yourself photo realistic talking head creation system and method should also optionally be capable of creating a library of computer based two dimensional images from digital videotape footage taken of an actual human being. A user should be capable of manipulating a library of 3D rendered guide images or templates that are mixed, using personal computer software, and displayed on a computer monitor or other suitable device to provide a template for ordered head motion. A subject or newscaster should be capable of using the guides to maintain the correct pose alignment, while completing a series of facial expressions, blinking eyes, raising eyebrows, and speaking a phrase that includes target phonemes or mouth forms. The session should optionally be capable of being recorded continuously on high definition digital videotape. A user should optionally be capable of assembling the talking head library with image editing software, using selected individual video frames containing an array of distinct head positions, facial expressions and mouth shapes that are frame by frame comparable to the referenced source video frames of the subject. Output generated with the do-it-yourself photo realistic talking head creation system and method should be capable of being used in lieu of actual video in various applications and presentations on a personal computer, PDA or cell phone. The do-it-yourself photo realistic talking head creation system should also be optionally capable of constructing a talking head presentation from script commands.

The do-it-yourself photo realistic talking head creation system and method should be capable of being used with portable devices and portable wireless devices. These portable devices and portable wireless devices should include digital communications devices, portable digital assistants, cell phones, notebook computers, video phones, digital communications devices having video cameras and video displays, and other suitable devices.

The portable devices and portable wireless devices should be handheld devices, and the portable wireless devices should be capable of wirelessly transmitting and receiving signals.

A human subject should be capable of capturing an image of himself or herself with a video camera of such a device and view live video of the captured image on a video display of the device.

Guide images of the human subject should be capable of being superimposed on the displays of the portable devices and/or portable wireless devices of the do-it-yourself photo realistic talking head creation systems.

Each of the displays of such devices should be capable of displaying a composite image of the collected image of the human subject and a selected alignment template. The display and the video camera should allow the video camera to collect the image of the human subject, the human subject to view the composite image, and align the image of his or her head with the alignment template head at substantially the same angular position as the specified alignment template head angular position.

Such portable devices and/or portable wireless devices should be capable of being connected to a personal computer via a wired or wireless connection, and/or to a remote server via a network of sufficient bandwidth to support real-time video streaming and/or transmission of suitable signals. Typical networks include cellular networks, wireless networks, wireless digital networks, distributed networks, such as the internet, global network, wide area network, metropolitan area network, or local area network, and other suitable networks.

More than one user should be capable of being connected to a remote server at any particular time. Captured video streams and/or still images should be capable of being communicated to the computer and/or the server for processing into a photo realistic talking head library, or optionally, processing should be capable of being carried out in the devices themselves.

Software applications and/or hardware should be capable of residing in such devices, computers and/or remote servers to analyze composite signals of the collected images of the human subjects and the alignment templates, and determine the accuracy of alignment to the guide images.

The do-it-yourself photo realistic talking head creation system and method should be capable of using voice prompts created by a synthetically generated voice, actual recorded human voice, or via a live human technical advisor, and communicated to the human subject in real-time to assist the user during the alignment process, and alternatively and/or additionally using video prompts. The human subject may then follow the information in the prompts to adjust his or her head position, and when properly aligned initiate the spoken phrase portion of the capture process. Voice and/or video prompts may be used to assist the human subject in other tasks as well, such as when to repeat a sequence, if proper alignment is possibly lost during the capture and/or alignment process, and/or when to start and/or stop the session.

Different methods and apparatus for producing, creating, and manipulating electronic images, particularly associated with a head, head construction techniques, and/or a human body, have been disclosed. However, none of the methods and apparatus adequately satisfies these aforementioned needs.

U.S. Pat. No. 6,919,892 (Cheiky, et al.) discloses a photo realistic talking head creation system and method comprising: a template; a video camera having an image output signal of a subject; a mixer for mixing the template and the image output signal of the subject into a composite image, and an output signal representational of the composite image; a prompter having a partially reflecting mirror between the video camera and the subject, an input for receiving the output signal of the mixer representational of the composite image, the partially reflecting mirror adapted to allow the video camera to collect the image of the subject therethrough and the subject to view the composite image and to align the image of the subject with the template; storage means having an input for receiving the output image signal of the video camera representational of the collected image of the subject and storing the image of the subject substantially aligned with the template.

U.S. Pat. No. 6,351,265 (Bulman) discloses a method of providing normalized images, comprising the steps of: (a) receiving an electronic representation of an image including a head; (b) extracting the head from the image; (c) determining a size of the head; (d) rescaling the head to a plurality of desired sizes; and (e) outputting the plurality of rescaled heads as printed images on a medium.

U.S. Pat. No. 4,276,570 (Burson, et al) discloses a method and apparatus for producing an image of a person's face at a different age, in which in order to simulate the appearance of a different age on a person's face, a picture of an old face and a corresponding young face are recorded and the differences between the old and young face found and recorded. A picture of the person's face to be simulated at a different age is then recorded, modified with the differences and the image resulting after modification is displayed.

U.S. Pat. No. 4,841,575 (Welsh, et al.) discloses an image encoding and synthesis apparatus, in which visual images of the face of a speaker are processed to extract a still frame of the image and a set of typical mouth shapes, during a learning sequence. Encoding of a sequence to be transmitted, recorded is then achieved by matching the changing mouth shapes to those of the set, and generating codewords identifying them. Alternatively, the codewords may be generated to accompany real or synthetic speech, using a look-up table relating speech parameters to codewords. In a receiver, the still frames and set of mouth shapes are stored, and received codewords are used to select successive mouth shapes to be incorporated in the still frame.

U.S. Pat. No. 6,654,018 (Cosatto, et al.) discloses an audio-visual selection process for the synthesis of photo-realistic talking-head animations. A system and method for generating photo-realistic talking-head animation from a text input utilizes an audio-visual unit selection process is disclosed. Lip-synchronization is obtained by selecting and concatenating variable-length video units of the mouth area. A unit selection process utilizes acoustic data to determine the target costs for the candidate images, and utilizes visual data to determine the concatenation costs. The image database is prepared in a hierarchical fashion, including high-level features (such as a full 3D modeling of the head, geometric size and position of elements) and pixel-based, low-level features (such as a PCA-based metric for labeling various feature bitmaps).

U.S. Pat. No. 6,283,858 (Hayes, Jr., et al) discloses a system and method for manipulating images. The system includes a digital computer, input and output peripherals, and a program which provides a plurality of functions for manipulating various images. The images are processed to generate unique objects, which may be modified by an operator. The program also allows integration and data transfer to various systems including video games, other digital computers, etc. The system may be used to transfer data to the video game in order to replace characters with the actual image of the player. The system may also be used to perform animation of an image, simulate facial movement resulting from speech, and simulate cosmetic reconstruction of a body portion in real time. The program is further capable of generating three-dimensional representations of an image being manipulated.

U.S. Pat. No. 5,960,099 (Hayes, Jr., et al) discloses a system and method for producing a digitized likeness of a person. The system includes a digital computer and a scanning device operatively coupled to the digital computer. Headshot photographs of a person are scanned and the data is transmitted to the digital computer. A program is provided for manipulating the data and reconstructing a digital image for display on the digital computer. The program allows customization of the expressions on the face of the digital image. The program also allows enlargement and reduction of the digitized likeness, while maintaining necessary proportional relations. The program also allows integration and data transfer to a Computer Aided Manufacturing (CAM) system so that three dimensional contours and depressions corresponding to facial features may be automatically reproduced.

U.S. Pat. No. 4,843,568 (Krueger, et al) discloses an apparatus and method for using an image of the human body to control real time computer events. Perception and feature analysis are carried out by specialized circuitry and computer software, and response to perception is expressed using a device controllable by a computer. Participants generally are unaware of processing delays between action and reaction, and their perception of an event is similar to dealing with a human being or animate creature. Perception and response occur in real time with action and reaction closely coupled.

U.S. Pat. No. 6,044,226 (McWilliams) discloses a device and method for focusing the attention of subjects of photography. A point of interest is reflected by a reflective pane which in turn is reflected by a beam splitter, toward the subject of the photography, into an image area. Photography equipment is placed behind the beam splitter and image area. Reflection of the image at the point of interest into the image area results in focusing the attention of the photography subject to the location desired.

U.S. Pat. No. 6,084,979 (Kanade, et al) discloses a method of virtualizing reality, i.e., a method of creating a photo realistic virtual reality from images of a real event, which is comprised of the steps of capturing a plurality of images of each time instant of a real event using a plurality of cameras positioned at a plurality of angles. Each image is stored as intensity and/or color information. A suitable internal representation is computed from these images and the information regarding the camera angles. An image of each time instant may be generated from any viewing angle using the internal representation of it. The virtual viewpoints could be displayed on a single TV screen, or using a stereoscopic display device for a true three-dimensional effect. The event thus virtualized can be navigated through, and interacted with, any virtual reality system.

U.S. Pat. No. 6,278,466 (Chen) discloses an apparatus and method for creating an animation. A sequence of video images is inspected to identify a first transformation of a scene depicted in the sequence of video images. A first image and a second image are obtained from the sequence of video images, the first image representing the scene before the first transformation, and the second image representing the scene after the first transformation. Information is generated that indicates the first transformation, and that can be used to interpolate between the first image and the second image to produce a video effect that approximates display of the sequence of video images.

U.S. Pat. No. 5,995,119 (Cosatto, et al) discloses a method for generating photo realistic characters, wherein one or more pictures of an individual are decomposed into a plurality of parameterized facial parts. The facial parts are stored in memory. To create animated frames, the individual facial parts are recalled from memory in a defined manner and overlaid onto a base face to form a whole face, which, in turn, may be overlaid onto a background image to form an animated frame.

U.S. Pat. No. 6,250,928 (Poggio, et al) discloses a talking facial display method and apparatus. The method and apparatus converts input text into an audio-visual speech stream, which results in a talking face image enunciating the text. This method of converting input text into an audio-visual speech stream comprises the steps of: recording a visual corpus of a human-subject, building a viseme interpolation database, and synchronizing the talking face image with the text stream. In a preferred embodiment, viseme transitions are automatically calculated using optical flow methods, and morphing techniques are employed to result in smooth viseme transitions. The viseme transitions are concatenated together and synchronized with the phonemes, according to the timing information. The audio-visual speech stream is then displayed in real time, thereby displaying a photo realistic talking face.

U.S. Pat. No. 6,272,231 (Maurer, et al) discloses wavelet-based facial motion capture for avatar animation, which is embodied in an apparatus, and related method, for sensing a person's facial movements, features and characteristics and the like, to generate and animate an avatar image, based on facial sensing. The avatar apparatus uses an image processing technique based on model graphs and bunch graphs, that efficiently represent image features as jets. The jets are composed of wavelet transforms processed at node or landmark locations on an image corresponding to readily identifiable features. The nodes are acquired and tracked to animate an avatar image, in accordance with the person's facial movements. Also, the facial sensing may use jet similarity, to determine the person's facial features and characteristic, and, thus, allows tracking of a person's natural characteristics, without any unnatural elements that may interfere or inhibit the person's natural characteristics.

U.S. Pat. No. 6,301,370 (Steffens, et al) discloses face recognition from video images, which is embodied in an apparatus, and related method, for detecting and recognizing an object in an image frame. The object may be, for example, a head having particular facial characteristics. The object identification and recognition process uses an image processing technique, based on model graphs and bunch graphs that represent image features as jets. The jets are composed of wavelet transforms and are processed at nodes or landmark locations on an image corresponding to readily identifiable features. The system is particularly advantageous for recognizing a person over a wide variety of pose angles.

U.S. Pat. No. 6,163,322 (LaChapelle) discloses a method and apparatus for providing real-time animation utilizing a database of postures and for animating a synthetic body part. The 3D-animation system and method use a database of basic postures. In a first step, for each frame, a linear combination of the basic postures from a database of basic postures is obtained by minimizing the Euclidean distance between the displacement of critical points. The displacement information is supplied externally, and typically can be obtained by observing the displacement of physical markers placed on a moving physical body part in the real world. For instance, the synthetic body part may be an expression of a human face, and the displacement data are obtained by observing physical markers placed on the face of an actor. The linear combination of the postures in the database of postures is then used to construct the desired posture. Postures are constructed for each time frame, and are then displayed consecutively to provide animation. A computer readable storage medium containing a program element to direct a processor of a computer to implement the animation process is also provided.

U.S. Pat. No. 6,181,351 (Merrill, et al) discloses a method and apparatus for synchronizing the moveable mouths of animated characters with recorded speech. The animation of a speaking character is synchronized with recorded speech, by creating and playing a linguistically enhanced sound file. A sound editing tool employs a speech recognition engine to create the linguistically enhanced sound file from recorded speech and a text of the speech. The speech recognition engine provides timing information related to word breaks and phonemes, that are used by the sound editing tool to annotate the speech sound data, when creating the linguistically enhanced sound file. When the linguistically enhanced sound file is played to produce sound output, the timing information is retrieved to control the animated character's mouth movement and word pacing in the character's word balloon. The sound editing tool additionally provides editing functions for manipulating the timing information. A text to speech engine can use the same programming interface as the linguistically enhanced sound file player to send notifications to the animation, providing prototyping without recorded speech. Since both use the same interface, recorded speech can be incorporated at a later time with minimal modifications.

U.S. Pat. No. 5,878,396 (Henton) discloses a method and apparatus for synthetic speech in facial animation, in which facial imaging synchronized with synthetic speech. Mapping viseme images to a diphone requires the same "transitioning," in that the imaging associated with a diphone is not a static image, but rather, a series of images which dynamically depict, with lip, teeth and tongue positioning, the sound transition occurring in the relevant diphone. Each series of lip, teeth, and tongue positioning transitions is referred to in the Henton patent as a "diseme." A diseme (like a diphone), thus, begins somewhere during one viseme (phone), and ends somewhere during a following viseme (phone). Owing to lip, teeth and tongue position imaging commonality, phones are grouped into archiphonic families. A single diseme, which depicts the transition from a phone in one archiphonic family to another phone in a different archiphonic family, can be used for displaying the transition between any phone in the first archiphonic family to any phone in the second archiphonic family. In this way, the approximately 1800 diphones in General American English can be visually depicted by a relatively small number of disemes, again, due to their similarity in lip, teeth, and tongue image positioning. This results in a mapping between synthetic speech and facial imaging, which more accurately reflects the speech transitional movements of a realistic speaker image.

U.S. Pat. No. 5,983,190 (Trower, II, et al) discloses a client server animation system for managing interactive user interface characters, which provides services to enable clients to play animation and lip-synched speech output for an interactive user interface character. Through the programming interface of the server, clients can specify both speech and cursor device input that an instance of an interactive user interface character will respond to when the clients are active. Clients can also request playback of animation and lip-synched speech output through this interface. Services can be invoked from application programs, as well as web scripts embedded in web pages downloaded from the Internet.

U.S. Pat. No. 6,069,633 (Apparao, et al) discloses a sprite engine or compositor, that is well-adapted to a variety of host platforms, and that minimizes the amount of drawing that occurs on a refresh of a frame buffer display area. The invention exploits the host platform's abilities to perform both back-to-front and front-to-back drawing algorithms, where the choice of algorithm used depends upon whether a sprite is opaque or transparent. Each sprite registers itself with a sprite engine, identifying whether or not the sprite is wholly opaque or transparent, the bounding area of the sprite, and the function that the sprite uses to draw. The function can be the drawing routine that is available from the host platform or operating system. The sprite engine keeps track of the Z position of each sprite and examines each sprite to determine if the sprite overlaps a particular region that needs to be refreshed. Sprites that are rectangular and opaque are considered special cases that can be easily drawn using the host platform's front-to-back drawing algorithm. In a top-down manner, by Z position, all sprites that are opaque are allowed to be drawn. All other kinds of sprites are drawn in a back-to-front manner. When a transparent sprite is found, the sprite engine searches the remaining sprites in a bottom-up manner and draws the sprites with a Z position below the transparent sprite, finishing with the transparent sprite, using a back-to-front algorithm in the remaining region.

U.S. Pat. No. 5,933,151 (Jayant, et al) discloses a method for simulating natural movement of a computer-generated synthesized talking head, using an N-state Markov model. Initially, the number of states N is set representing N different positional orientations of the synthesized talking head. The transitions from each possible current position to each possible next position of the talking head are identified with a set of transitional probabilities in a range from zero to one. A uniformly distributed random number is generated and the state identified by the transition probabilities associated with the random number identifies the next position of the talking head. The synthesized talking head is rotated to that next position, and remains there for a durational time period, before transitioning to a next position, which is probabilistically determined in like manner. To further simulate realistic head movement, the synthesized head may be programmed to remain in a particular state or position, for an extended period of time at the end of a sentence of simulated speech.

U.S. Pat. Nos. 6,097,381 and 6,232,965 (Scott, et al) disclose methods and apparatus for synthesizing realistic animations of a human speaking, using a computer, which synthesizes speech or facial movements to match selected speech sequences. A videotape of an arbitrary text sequence is obtained, including a plurality of images of a user speaking various sequences. Video images corresponding to specific spoken phonemes are obtained. A video frame is digitized from that sequence, which represents the extreme of mouth motion and shape. This is used to create a database of images of different facial positions relative to spoken phonemes and diphthongs. An audio speech sequence is then used as the element to which a video sequence will be matched. The audio sequence is analyzed to determine spoken phoneme sequences and relative timings. The database is used to obtain images for each of these phonemes and these times, and morphing techniques are used to create transitions between the images. Different parts of the images can be processed in different ways to make a more realistic speech pattern. The U.S. Pat. No. 6,232,965 patent uses an audio speech sequence, as the element to which a video sequence will be matched, which is analyzed to determine spoken phoneme sequences and relative timings.

U.S. Pat. No. 6,072,496 (Guenter, et al) discloses a method and system for capturing and representing 3D geometry, color and shading of facial expressions and other animated objects. The method captures a 3D model of a face, which includes a 3D mesh and a series of deformations of the mesh, that define changes in position of the mesh over time (e.g., for each frame). The method also builds a texture map associated with each frame in an animation sequence. The method achieves significant advantages, by using markers on an actor's face to track motion of the face over time, and to establish a relationship between the 3D model and texture. Specifically, videos of an actor's face with markers are captured from multiple cameras. Stereo matching is used to derive 3D locations of the markers in each frame. A 3D scan is also performed on the actor's face with the markers to produce an initial mesh with markers. The markers from the 3D scan are matched with the 3D locations of the markers in each frame from the stereo matching process. The method determines how the position of the mesh changes from frame to frame by matching the 3D locations of the markers from one frame to the next. The method derives textures for each frame by removing the dots from the video data, finding a mapping between texture space and the 3D space of the mesh, and combining the camera views for each frame into a signal texture map. The data needed to represent facial animation includes: 1) an initial 3D mesh, 2) 3D deformations of the mesh per frame, and 3) a texture map associated with each deformation. The method compresses 3D geometry by decomposing the deformation data into basis vectors and coefficients. The method compresses the textures, using video compression.

U.S. Pat. No. 5,719,951 (Shackleton, et al) discloses a method of processing an image, including the steps of: locating within the image the position of at least one predetermined feature; extracting from the image data representing each feature; and calculating for each feature a feature vector representing the position of the image data of the feature in an N-dimensional space, such space being defined by a plurality of reference vectors, each of which is an eigenvector of a training set of like features, in which the image data of each feature is modified to normalize the shape of each feature, thereby to reduce its deviation from a predetermined standard shape of the feature, which step is carried out before calculating the corresponding feature vector.

U.S. Pat. No. 6,044,168 (Tuceryan, et al) discloses a method of model based facial coding and decoding, using feature detection and eigenface coding. The method uses a three-dimensional face model, and a technique called eigenface decomposition to analyze the video at one end. The facial feature locations and eigenface coding of the face image are sent to a decoder. The decoder synthesizes the face image at the receiving end. Eigenface decoding is used to texture map a three-dimensional model warped by detected feature locations.

U.S. Pat. No. 6,088,040 (Oda, et al) discloses a method and apparatus of facial image conversion by interpolation/extrapolation for plurality of facial expression components representing a facial image. An input/output control mechanism receives facial image information of different facial expressions of a plurality of human beings to provide control, so that a normalization processing mechanism normalizes the facial image information. A facial expression generation mechanism converts the normalized facial image information into facial expression components, and averages the facial expression components for each facial expression, to store the same as average facial expression components. The input/output control mechanism has the facial expression component converted by the facial expression generation mechanism, after the applied facial image information is normalized. The facial expression generation mechanism converts the facial expression components of the applied facial image information according to a difference between an average facial expression component corresponding to a facial expression of applied facial image information and an average facial expression component of a specified facial expression. Synthesized facial image information is generated from the converted synthesized facial expression component.

U.S. Pat. No. 6,307,576 (Rosenfeld) discloses a method for automatically animating lip synchronization and facial expression of animated characters, and in particular three dimensional animated characters, using weighted morph targets and time aligned phonetic transcriptions of recorded text. The method utilizes a set of rules, that determine system output, comprising a stream of morph weight sets, when a sequence of timed phonemes and/or other timed data are encountered. Other data, such as timed emotional state data or emotemes, such as "surprise," "disgust," "embarrassment," "timid smile,", or the like, may be inputted to affect the output stream of morph weight sets, or create additional streams.

U.S. Pat. No. 6,028,960 (Graf, et al) discloses a face feature analysis method for automatic lip reading and character animation, which begins by generating multiple face feature candidates, e.g., eyes and nose positions, using an isolated frame face analysis. Then, a nostril tracking window is defined around a nose candidate, and tests are applied to the pixels therein, based on percentages of skin color area pixels and nostril area pixels, to determine whether the nose candidate represents an actual nose. Once actual nostrils are identified, size, separation and contiguity of the actual nostrils is determined, by projecting the nostril pixels within the nostril tracking window. A mouth window is defined around the mouth region, and mouth detail analysis is then applied to the pixels within the mouth window to identify inner mouth and teeth pixels and therefrom generate an inner mouth contour. The nostril position and inner mouth contour are used to generate a synthetic model head. A direct comparison is made between the inner mouth contour generated and that of a synthetic model head, and the synthetic model head is adjusted, accordingly. Vector quantization algorithms may be used to develop a codebook of face model parameters, to improve processing efficiency. The face feature analysis is suitable, regardless of noise, illumination variations, head tilt, scale variations and nostril shape.

U.S. Pat. No. 6,069,631 (Tao, et al) discloses a method and apparatus of coding of facial animation parameters (FAPs) for transmission of synthetic talking head video over band limited channels. A FAP coding technique that realizes enough coding gain to transmit multiple synthetic talking heads over a band limited channel, without introducing perceptible artifacts into the reconstructed synthetic talking heads. This is accomplished by exploiting the spatial correlation of each FAP frame and/or the temporal correlation of the sequence of FAP frames. To remove intra-frame correlation, each FAP frame is transformed prior to segmentation from the n-dimensional space into an m-dimensional subspace, where m<n using an energy compaction transform. To remove inter-frame redundancy, the sequence is segmented, and each parameter vector is transform coded to decorrelate the vector.

U.S. Pat. No. 6,061,072 (Rouet, et al) discloses a method and apparatus for creating lifelike digital representations of computer animated objects, and in particular lifelike digital representations of three-dimensional objects. Steps and means are described, by which an animator may efficiently select and combine a plurality of animated objects to generate new animated objects. An animator may store a plurality of object shapes. To minimize storage, all of the object shapes are stored solely as differences from a base object. To form a new object, an animator may select a number of objects from the database, with the desired characteristics, and these objects will be blended with one another to create a new object, with features that are a combination of the selected objects. The extent to which a selected object is incorporated into the new object may be selected by the animator, by assigning each selected object with a weight. The new object is then a sum of each of the differences between each of the selected objects and the base object multiplied by their respective weights. An improved graphical user interface for animating facial objects is also included.

U.S. Pat. No. 5,680,481 (Prasad, et al) discloses a facial feature extraction method and apparatus for a neural network, acoustic and visual speech recognition system. The facial feature extraction method and apparatus uses the variation in light intensity (gray-scale) of a frontal view of a speaker's face. The sequence of video images are sampled and quantized into a regular array of 150× 150 pixels, that naturally form a coordinate system of scan lines and pixel position along a scan line. Left and right eye areas and a mouth are located, by thresholding the pixel gray-scale and finding the centroids of the three areas. The line segment joining the eye area centroids is bisected at right angle, to form an axis of symmetry. A straight line through the centroid of the mouth area, that is at right angle to the axis of symmetry constitutes the mouth line. Pixels along the mouth line and the axis of symmetry in the vicinity of the mouth area form a horizontal and vertical gray-scale profile, respectively. The profiles could be used as feature vectors, but it is more efficient to select peaks and valleys (maximas and minimas) of the profile, that correspond to the important physiological speech features, such as lower and upper lip, mouth corner, and mouth area positions and pixel values and their time derivatives, as visual vector components. Time derivatives are estimated by pixel position and value changes between video image frames. A speech recognition system uses the visual feature vector in combination with a concomitant acoustic vector, as inputs to a time-delay neural network.

U.S. Pat. No. 5,630,017 (Gasper, et al) discloses advanced tools for speech synchronized animation. A random access animation user interface environment, referred to as interFACE enables a user to create and control animated lip-synchronized images or objects, utilizing a personal computer for use in the users programs and products. A real-time random-access interface driver (RAVE) together with a descriptive authoring language (RAVEL) is used to provide synthesized actors ("synactors"). The synactors may represent real or imaginary persons or animated characters, objects or scenes. The synactors may be created and programmed to perform actions, including speech which are not sequentially pre-stored records of previously enacted events. Furthermore, animation and sound synchronization may be produced automatically and in real-time. Sounds and visual images of a real or imaginary person or animated character, associated with those sounds are input to a system, and may be decomposed into constituent parts to produce fragmentary images and sounds. A set of characteristics is utilized to define a digital model of the motions and sounds of a particular synactor. The general purpose system is provided for random access and display of synactor images on a frame-by-frame basis, which is organized and synchronized with sound. Both synthetic speech and digitized recording may provide the speech for synactors.

U.S. Pat. No. 4,710,873 (Breslow, et al) discloses a video game apparatus and method, which incorporates digitized images of being into game graphics, and includes an arrangement for acquiring and storing data representing an image of the face of a game player or other entity, and for selectively incorporating the image of the entity throughout the play of the game, at predetermined locations on the video game display, and in coordination with the video game graphics. In accordance with the play of the various games controlled by the video game apparatus, the stored image of one or more persons is utilized as the head of a video graphics generated body, as a portion of other generated graphics representations, as a functional game object representation, or as a controllable playing object. The video game apparatus also provides for the display of the game player image in a scoring display format, wherein the images of a predetermined number of previous game players attaining the highest scores are displayed at the beginning or end of a play of the game.

U.S. Pat. No. 6,208,359 (Yamamoto) discloses a system and method for communicating through computer animated images, which generate an animation sequence for a live character during communication. In response to a performer's voice and other inputs, the animation sequence of the character is generated on a real-time basis, and approximates human speech. The animated character is capable of expressing certain predetermined states of mind, such as happy, angry and surprised. In addition, the animated character is also capable of approximating natural movements, associated with speech.

U.S. Pat. No. 6,016,148 (Kang, et al) discloses automated mapping of facial images to animation wireframe topologies, using a method for mapping a digitized image of a face to a wireframe, which includes the steps of detecting a plurality of facial features from a plurality of pixels of a reference facial image. Equalized cropped images are compared in an image registration step. The wireframe is composed of a plurality of nodes connected by lines. Corresponding facial landmark nodes in the wireframe topology are determined. A transform between the facial features and the landmark nodes is computed to map the wireframe topology to a reference facial image. The reference facial image and a target facial image are cropped using a bounding box. The cropped reference facial image is registered with the cropped target facial image to determine a displacement field. The displacement field is applied to the mapped wireframe topology for the reference facial image to map the target facial image to the wireframe topology, the nodes being aligned with the salient facial features of the target facial image.

U.S. Pat. No. 6,611,613 (Kang, et al.) discloses an apparatus and method for detecting characteristics of a speaking person's eyes and face. An apparatus for detecting the position of a human face in an input image or video image and a method thereof are disclosed. The apparatus includes an eye position detecting means for detecting pixels having a strong gray characteristic to determine areas having locality and texture characteristics as eye candidate areas among areas formed by the detected pixels, in an input red, blue, and green (RGB) image, a face position determining means for creating search templates by matching a model template to two areas extracted from the eye candidate areas, and determining an optimum search template among the created search templates by using the value normalizing the sum of a probability distance for the chromaticity of pixels within the area of a search template, and horizontal edge sizes calculated in the positions of the left and right eyes, a mouth and a nose estimated by the search template, and an extraction position stabilizing means for forming a minimum boundary rectangle by the optimum search template, and increasing count values corresponding to the minimum boundary rectangle area and reducing count values corresponding to an area other than the minimum boundary rectangle area, among count values of individual pixels, stored in a shape memory, to output the area in which count values above a predetermined value are positioned, as eye and face areas. The apparatus is capable of detecting a speaking person's eyes and face in an image, and is tolerant of image noise.

U.S. Pat. No. 5,774,591 (Black, et al) discloses an apparatus and method for recognizing facial expressions and facial gestures in a sequence of images. A system tracks human head and facial features over time, by analyzing a sequence of images. The system provides descriptions of motion of both head and facial features between two image frames. These descriptions of motion are further analyzed by the system to recognize facial movement and expression. The system analyzes motion between two images using parameterized models of image motion. Initially, a first image in a sequence of images is segmented into a face region and a plurality of facial feature regions. A planar model is used to recover motion parameters that estimate motion between the segmented face region in the first image and a second image in the sequence of images. The second image is warped or shifted back towards the first image, using the estimated motion parameters of the planar model, in order to model the facial features relative to the first image. An affine model and an affine model with curvature are used to recover motion parameters, that estimate the image motion between the segmented facial feature regions and the warped second image. The recovered motion parameters of the facial feature regions represent the relative motions of the facial features between the first image and the warped image. The face region in the second image is tracked using the recovered motion parameters of the face region. The facial feature regions in the second image are tracked, using both the recovered motion parameters for the face region and the motion parameters for the facial feature regions. The parameters describing the motion of the face and facial features are filtered to derive mid-level predicates that define facial gestures occurring between the two images. These mid-level predicates are evaluated over time to determine facial expression and gestures occurring in the image sequence.

U.S. Pat. No. 5,280,530 (Trew, et al) and European Patent Application No. EP474,307A2 (Trew, et al) disclose a method and apparatus for tracking a moving object in a scene, for example the face of a person in videophone applications, which comprises: forming an initial template of the face, extracting a mask outlining the face, dividing the template into a plurality (for example sixteen) sub-templates, searching the next frame to find a match with the template, searching the next frame to find a match with each of the sub-templates, determining the displacements of each of the sub-templates with respect to the template, using the displacements to determine affine transform coefficients, and performing an affine transform to produce an updated template and updated mask.

U.S. Pat. No. 5,689,575 (Sako, et al) discloses a method and apparatus for processing images of facial expressions and states of facial parts, using a television camera, a computer, and generation of facial part masks. A facial part mask unit provides masking data to both a mouth area detection unit and an eye area detection unit. The mouth area detection, the eye area detection unit, and a fingertip detection unit are connected at their outputs to the personal computer, which automatically interprets sign language signal content of received data from each of the units.

U.S. Patent Application No. 2002/0012454 (Liu, et al) discloses rapid computer modeling of faces for animation, which uses a technique for creating a 3D face model, using images obtained from an inexpensive camera associated with a general purpose computer. Two still images of the user and two video sequences are captured. The user is asked to identify five facial features, which are used to calculate a mask and to perform fitting operations. Based on a comparison of the still images, deformation vectors are applied to a neutral face model to create the 3D model. The video sequences are used to create a texture map. The process of creating the texture map references the previously obtained 3D model to determine poses of the sequential video images.

U.S. Patent Application No. 2002/0024519 (Park) discloses a system and method for producing a three-dimensional moving picture, using an authoring tool, which supports synthesis of motion, facial expression, lip synchronizing and lip synchronized voice of a three-dimensional character, comprising: a memory system adapted to store facial expression information, the shape of lips, and motion of a character; a speech information-conversion engine adapted to receive text information and/or previously recorded speech information from a user, and to convert the inputted text information and/or previously recorded speech information into corresponding speech information; a lip synchronization-creation engine adapted to extract phoneme information from speech information outputted from the speech information-conversion engine, and to generate a facial expression and the shape of the lips of the character, corresponding to the extracted phoneme information from the memory system; an animation-creation engine adapted to receive motion information from the user, and to generate movement of the character, corresponding to the motion information from the memory system; and a synthesis engine adapted to synthesize the facial expression and the lip shape of the character, generated from the lip synchronization-creation engine, and the movement of the character, generated from the animation-creation engine, to display the synthesized images on a screen. The memory system may include: a motion library adapted to store motion information of the character; a facial expression library adapted to store facial expression information of the character and shape of the lips; a background scene library adapted to store information on a background scene of the character; and a sound library adapted to store sound information.

U.S. Patent Application No. 2002/0039098 (Hirota) discloses an information processing system, which includes a first computer or communications apparatus for transmitting news information, and a second computer or communications apparatus communicating with the first computer or communications apparatus for receiving the news information; voice output means for outputting the content of the received news information; display means for displaying an animation, which imitates a speaking individual, in conformance with the output of the voice. The first computer or communications apparatus outputs the content of the news information as voice in a predetermined order, based upon the content of the received news information, and the second computer or communications apparatus displays the animation, which imitates a speaking individual, in conformance with the voice output.

Japanese Patent No. JP406129834A (Kajiwara, et al) discloses a system for determining a personal feature automatically, by digitizing a picture image of the face of a person, and determining with which feature type among the plural feature types registered previously in a control part of the image is matched by means of a neural network. Facial characteristics, such as eyes, nose, mouth, eye brows, size, and separation of the characteristics, are used.

Different apparatus and methods for displaying more than one image simultaneously on one display, and image mixing, combining, overlaying, blending, and merging apparatus and methods have been disclosed. However, none of the methods and apparatus adequately satisfies these aforementioned needs.

U.S. Pat. No. 5,583,536 (Cahill, III) discloses a method and apparatus for analog video merging and key detection, in which monochrome and color video mixers mix an overlay image with a default image to form a composite image to be displayed on a computer display. The monochrome video mixer includes a summing circuit for summing an overlay signal and a default signal to generate a composite signal. The overlay signal corresponds to the overlay image, the default signal corresponds to the default image, and the composite signal corresponds to the composite image. The video mixer includes a comparator, that has a first input for receiving the composite signal and a second input for receiving the overlay signal. The comparator compares the signal level measured at the first input with the signal level measured at the second input. In response to the comparison, the comparator provides an enable signal in the presence of a default key color signal. In response to the enable signal, an enabling circuit in the video mixer provides the overlay signal to the summing circuit. The enabling circuit provides the overlay signal to the summing circuit, when the enable signal indicates that the first input signal level is equal to the second input signal level, or, alternatively, when the first input signal level is less than the second input signal level. A color video mixer includes a number of the above-described monochrome video mixers, wherein each monochrome video mixer provides a separate output to a color gun of the display device. The overlay signal from each mixer is passed on to its respective color gun (through the mixer summing circuit) only if all the comparators (for all monochrome mixers) provide an enable signal.

U.S. Pat. No. 5,566,251 (Hanna, et al) discloses a technique for deriving a composite video image by merging foreground and background video image data supplied from a plurality of separate video signal sources employing pattern-key insertion, rather than prior-art color-key insertion, for this purpose. Pattern-key insertion involves replacing a first pattern in a video scene with a second pattern. This is accomplished by first detecting the first pattern in the video scene and estimating the pose of this detected first pattern with respect to a reference object in the video scene. The second pattern is then geometrically transformed using the pose estimate of the detected first pattern. Finally, the detected first pattern is replaced with the geometrically-transformed second pattern.

U.S. Pat. No. 6,072,933 (Green) discloses a system for the production of video signals, which includes a playback device for playing back prerecorded video and audio signals from a prerecorded storage medium, a source of user supplied video and audio signals, a video and audio mixer for combining the prerecorded and user supplied signals to provide combined video and audio outputs, a production monitor connected to the mixer to display to the user the mixed signals, and a storage or reproduction device receiving a mixed video signal output from the mixer. The prerecorded storage medium, wherein the prerecorded storage medium stores, as well as a video channel and at least one audio channel, at least one prompting channel, the video signals stored on the prerecorded medium being prekeyed to indicate areas to be overlaid in the mixer by the user supplied video signals, and the mixer being operative to convert signals from the prompting channel into production control signals.

U.S. Pat. No. 5,977,933 (Wicher, et al) discloses a display control system for portable computer drives, from a single frame buffer, for a built-in flat panel (LCD type) display, a separate external CRT display, or an NTSC/PAL television monitor. Either identical or different images may be displayed simultaneously on the CRT display or television and on the flat panel display. Independent clocking is provided to each display to enable this simultaneous display of different images as well as simultaneously display of identical images. The display control system is suitable for use with a wide variety of CRT displays and flat panel displays by means of internal programmable controls.

U.S. Pat. No. 6,271,826 (Pol, et al) discloses a method and apparatus for mixing a graphics signal and a video signal.

U.S. Pat. No. 4,713,695 (Macheboeuf) discloses a television picture superimposing system, comprising a video mixer including two variable gain amplifying circuits, which receive two input picture signals having a given peak-to-peak amplitude, and an adding circuit for mixing the amplified picture signals into a resulting picture signal. The television picture superimposing system has an improvement, which provides a circuit for deriving a single gain control signal, based upon a linear combination of two signals, derived from the two input picture signals, respectively, so that the resulting signal has the given peak-to-peak amplitude. The control signal is applied, via an analog inverting circuit, and directly to gain control inputs of the variable gain amplifying circuits, respectively.

U.S. Pat. No. 5,751,576 (Monson) discloses an animated map display, which transposes information from any of the basic or application maps of a computer-controlled agronomic system, as well as geological or environmental features, physical structures, sensor signals, status information, and other data, into a two- or three-dimensional representation that is projected using a heads-up display (HUD) overlaid onto the real-world terrain and environment visible to the operator through the windshield of the product application vehicle. The animated map display may present information relating to a particular map set as a three-dimensional image corresponding spatially to real-world terrain or environment, as well as alphanumeric, pictorial, symbolic, color, or textural indicia relating to navigational, sensor, or other data inputs. The operator may use an input interface graphically linked to the animated map display to interactively enter information, relationships, or data into the database or agronomic system.

U.S. Pat. No. 6,166,744 (Jaszlics, et al) discloses a system for combining virtual images with images of the real world. A range scanner determines the shape and distance of real-world objects within a field of interest to the observer using the apparatus. Virtual masking objects, which are simplified computer models of real-world objects, are derived from the range data Virtual entities that are not present in the real world are simulated in an s electronic computer. Images of the virtual entities and the virtual masking objects are combined into masked virtual images. The masked virtual images show the portions of virtual entities that would be visible if these entities actually existed in the real world. The masked virtual images and images of the real world scene are combined in such a manner that the virtual images appear to be obscured, when appropriate for their simulated, virtual location by real-world objects. The resulting combined image is presented in an electronic or optical display.

U.S. Pat. No. 6,262,746 (Collins) discloses a system for displaying and storing an image having transparent and non-transparent pixels, in which an image is stored as data representing the values of non-transparent pixels, and stored instructions corresponding to some pixels, resulting in a data structure. The image may be displayed by executing two types of instructions. A first type of instruction includes a command to skip pixels in a destination image. A second type of instruction comprises a command to copy pixels from the source data to the destination image.

U.S. Pat. No. 6,356,313 (Champion, et al) discloses a system for overlaying a motion video signal onto an analog signal on a display. The system includes a motion video processing unit for receiving and processing the motion video signal into a signal having an analog video format, a video format analyzer and synchronizer device for receiving the analog signal and for determining video timing parameters and a corresponding original pixel clock of the analog signal and for controlling video timing parameters of the motion video signal to match the video timing parameters of the analog signal determined by the video format analyzer and synchronizer device, so as to provide an output motion video signal which is synchronized with the analog signal, and a display determining device for determining the display of the analog output signal or the synchronized output motion video signal on the display.

U.S. Pat. No. 6,229,550 (Gloudemans, et al) discloses a system for blending a graphic, in which graphic and video are blended by controlling the relative transparency of corresponding pixels in the graphic and the video through the use of blending coefficients.

U.S. Pat. No. 6,163,309 (Weinert) discloses a heads up display and vision system or vehicle imaging system for producing an integrated video image of a scene about a vehicle.

U.S. Pat. No. 5,956,180 (Bass, et al) discloses an optical viewing system for producing multiple image displays, which comprises a first screen for displaying a first two-dimensional image on a first electronic display device at a first predetermined distance from an observer and a second screen for displaying a second two-dimensional image on a second electronic display device at a second predetermined distance from the observer. Each of the screens is located at different predetermined locations on an optical viewing path relatively nearer to and farther from the observer. The first two-dimensional image is projected through the second screen, creating a multiple overlaid picture image. The first and second electronic display devices are operable asynchronously without degrading the multiple overlaid picture images. The screen disposed in the optical viewing path at the predetermined location nearer to the observer is partially transparent.

U.S. Pat. No. 5,589,980 (Bass, et al) discloses an optical viewing system for producing a simulated three dimensional image. The system includes electronic equipment for displaying an image on a first electronic display device. Additional electronic equipment is provided for displaying an image on at least one second display device. The at least one second electronic display device is a substantially transparent display device, whereby an observer can view through transparent areas of the second electronic display device. The first and second electronic display devices are located at different, predetermined locations along an optical viewing path such that the image displayed by the first electronic display device is projected through the second electronic display device. The first electronic display device includes an image projector and the second electronic display device includes a controllable pixel display spaced therefrom. The controllable pixel display is comprised of a positive pixel display panel having a field of pixel elements which are controllably illuminated. The controllable pixel display is substantially transparent, such that the image produced by the controllable pixel display is overlaid upon the image produced by the image projector. A recording system including at least two image recorder channels is also disclosed for producing a plurality of images for simulating a three dimensional scene.

U.S. Pat. No. 5,982,452 (Gregson, et al) discloses an analog video merging system for merging N video signals from N video cameras, and more particularly to a system that can take the output of a plurality of video cameras, and form a combined video signal which can be fed to a computer having only a single frame grabber card. This system is used to track targets using multiple video cameras, and is comprised of an analog video merging apparatus for merging N video signals from N video cameras. The apparatus is comprised of N video processors, each of which N processors are connected to the N video cameras in a one-to-one correspondence, wherein each of the N video processors compares the video signal associated with one of the N video cameras with a dynamic predetermined threshold level, and produces a binary output signal having a low level and a high level, the low level being output if the associated video signal is below the predetermined threshold, and the high level being output if the associated video signal is above the predetermined threshold. N binary combiners are provided, with each being connected to the N video processors in a one-to-one correspondence. Each of the combiners produces a processed binary signal having a low level and a high level, the low level being output in the presence of a low level output from the associated video processor, and a high level being output in the presence of a high level from the associated video processor, wherein the high level of the processed binary signal is a unique level to that particular binary combiner, such that a unique high level is output from the N binary combiners that are associated with the N video cameras. The processed binary signal for camera N is scaled by a factor of 2.sup.N-1 with respect to the other camera signals. A summing unit is provided for summing N processed binary signals from the N binary combiners to produce a merged video signal. A method of providing a merged video signal is also provided.

U.S. Pat. No. 5,519,450 (Urbanus, et al) discloses a graphics subsystem for overlaying a graphics sub display on a main video image, which shows an SLM-based digital display system, having a graphics display subsystem for closed captioning, on-screen displays, and other graphics images that are overlaid on the video image. The graphics display subsystem has a graphics processor that prepares the graphics data, which is inserted into the video data path after video data processing and prior to a look-up table unit. A select logic unit provides a control signal to a multiplexer, that selects between video data and graphics data for input to the look-up table unit. The look-up table unit performs its mapping according to the type of data received, such as by linearizing video data or palletizing graphics data.

U.S. Pat. No. 4,262,302 (Sexton) discloses a digital computing system having a monolithic microprocessor, a versatile input/output subsystem, a multi-medium capability. In the memory subsystem, a balanced mix of dynamic RAM, P-channel MOS ROM and N-channel MOS ROM are included, to minimize cost without sacrificing performance. In the video display subsystem, a monolithic video display processor performs all RAM access functions, in addition to composite video generation. The resultant composite video signal, which may include audio and external video information, can be applied directly to a video monitor or RF modulated for use by a television receiver.

U.S. Pat. No. 4,243,984 (Ackley, et al) discloses a digital computing system having a monolithic microprocessor, a versatile input/output subsystem, a multi-medium memory subsystem, and a video display subsystem with audio generating capability. In the memory subsystem, a balanced mix of dynamic RAM, P-channel MOS ROM and N-channel MOS ROM. In the video display subsystem, a monolithic video display processor performs all RAM access functions, in addition to composite video generation. The resultant composite video signal, which may include audio and external video information, can be applied directly to a video monitor or RF modulated for use by a television receiver.

U.S. Pat. No. 5,579,028 (Takeya) discloses an apparatus for mixing a play video signal with graphics video signal. The play video signal is derived by playing a recording medium, and the graphics video signal is derived on the basis of data processing. A video selecting signal generated on the basis of image data is delayed, where its delay time is adjustable. By issuing image data for testing, the delay time is manually or automatically adjusted so as to coincide at a time at which the video image selecting signal is generated, on the basis of the image data for testing, with a time at which the image data for testing is converted to a graphics video signal and issued.

U.S. Pat. No. 5,487,145 (Marsh, et al) discloses a method and apparatus for compositing display items, which minimizes locked drawing areas. A compositing architecture provides for correct rendering of overlapping opaque and translucent regions of respective graphic images with rapid pixel restoration, when an image floating above another image is moved or manipulated to reveal pixels of a graphic image at a greater depth, by provision for buffering data corresponding to a portion of a graphic image, which is beneath another graphic image. Data representing graphic images is selectively routed to a painter in response to a determination of opacity and depth order of the graphic images. A plurality of painters are preferably provided, with image rendering pipeline of differing lengths. A painter is chosen in accordance with the number of images to be composited. Data buffering is minimized by dynamic creation and removal of buffers, in accordance with the intersecting regions of the graphic images.

U.S. Pat. No. 5,416,497 (Nishi, et al) discloses a video display control system, which displays a multicolor animation pattern on a screen of a video display unit. The video display control system is mainly constructed by a video RAM (VRAM) and a video display processor (VDP). The VRAM stores animation pattern data, display position data and at least two color data. The VDP reads these data and makes an animation pattern image displayed in at least two colors at a display position on the screen. The animation pattern image, two colors and display position are determined by the animation pattern data, two color data and display position data. In another video display control system, the VRAM stores at least two sets of animation pattern data, display position data and color data. When displaying two animation patterns, the VDP effects a logical operation on the two color data, with respect to the overlapping portion of the two patterns and makes the overlapping portion displayed in a new color corresponding to the operation result. When the animation patterns overlaps, the VDP can also deliver a collision signal in place of the logical operation, thereby enabling a CPU to recognize the position of the overlapping portion.

U.S. Pat. No. 5,892,521 (Blossom, et al) discloses a system and method for composing a display frame of multiple layered graphic sprites, which includes a graphics display device, for displaying a display frame comprising a plurality of display frame pixels. A sprite management system composes the display frame from a plurality of graphic sprites. Each graphic sprite comprises a plurality of sprite pixels and corresponding sprite pixel values. Each sprite has a specified depth relative to the other sprites. One of the sprites is designated to be a video sprite. This sprite is loaded with a chroina-key value. The sprite management system includes a data processing device connected to access a display frame composition buffer. The data processing device is programmed to write pixel values of individual sprites to the display frame composition buffer. This writing begins with the pixel values of the sprite having the greatest depth and proceeds with the pixel values of the remaining sprites in order of decreasing sprite depth. The display frame data is then passed to a video overlay board which overlays a video image over those pixels containing the chroma-key value. The result is a display frame, in which the plurality of graphic sprites, including the video sprite, appear layered with respect to each other, in accordance with their respectively specified depths.

U.S. Pat. No. 6,362,850 (Alsing, et al) discloses a method and system for interactively creating a movie from a still image in a digital imaging device that includes a display screen, which includes determining a path of panning across the still image, generating image frames along the path of panning, and then displaying the image frames for a predetermined time interval on the display screen to play the movie.

U.S. Pat. No 5,404,437 (Nguyen) and European Patent Application No. EP597616A1 (Nguyen) disclose an apparatus and method for mixing animation sequences with computer graphics information for presentation on a computer display screen. The animation sequences may be stored in compressed format in a standard storage medium. An animation sequence generator retrieves the compressed animation sequences, decompresses them into pixel information, and sends them to a single line store for synchronization with the computer graphics pixel information. Pixels from the animation sequences and from the computer graphics generator are mixed, windowed and overlaid in a digital mixer. The output of the digital mixer is sent to a visual display system such as a video digital-to-analog converter driving a computer display monitor.

U.S. Pat. No. 2,711,667 (Simjian) discloses a prompting device for a person posing in front of a moving picture camera, a television camera, or similar apparatus, in which visual prompting information is made available to the person posing, but rendered invisible to such audio-visual recording apparatus.

Different image alignment and registration methods and apparatus have been disclosed. However, none of the methods and apparatus adequately satisfies these aforementioned needs.

U.S. Pat. No. 6,009,212 (Miller, et al) discloses an apparatus and method for image registration involves computing a first transform based on landmark manifolds, using a distance measure, computing a second transform from the distance measure and the first transform. Registering the images is accomplished by applying the second transform.

U.S. Pat. No. 6,157,747 (Szeliski, et al) discloses a 3-dimensional image rotation method and apparatus for producing image mosaics, which align a set of plural images to construct a mosaic image.

U.S. Pat. No. 5,926,190 (Turkowski, et al) discloses a system and method for simulating motion in an interactive computer application wherein images of a scene are used to render views of the scene from particular viewpoints. The method and system includes registering a first image and a second image, using a transformation that overlays common features of both the first and the second image. After the two images are registered, at least one intermediate image is generated by applying a first interpolated transformation to the first image and a second interpolated transformation to the second image. The first image, the intermediate image, and the second image are then sequentially rendered to simulate motion through the scene.

U.S. Pat. No. 6,314,197 (Jain, et al) discloses a system and method for determining alignment parameters (rotation angle and translation vector) between two images of a scene, in particular fingerprint images, based on the attributes of segments associated with a pair of corresponding points, each point extracted from each of the images.

U.S. Pat. No. 6,349,153 (Teo) discloses a method and system for composition of two digital images, which overlap in an overlapping pixel region, including adjusting the pixel color values of at least one of the digital images, so as to produce resulting digital images including at least one modified digital image, and combining the resulting digital images in the overlapping pixel region by taking weighted averages of their pixel color values. There is also described a method for feathering two digital images which overlap in an overlapping pixel region, including aligning the digital images, so as to approximately register them in the overlapping pixel region, determining three curves, one of which is a leftmost curve, another of which is a middle curve and another of which is a rightmost curve, and at least one of which is not a straight vertical line, the curves extending from the top to the bottom of the overlapping pixel region and lying within the overlapping pixel region, and the middle curve lying between the leftmost and the rightmost curve, and combining the digital images by taking a weighted average of the pixel color values, in such a way that the weights used are a value above 50% of image A and a value below 50% of image B to the left of the leftmost curve, 50% of image A and 50% of image B along the middle curve, and a value below 50% of image A and a value above 50% of image B to the right of the rightmost curve. Systems for carrying out the methods are also described.

U.S. Pat. No. 6,205,364 (Lichtenstein, et al) discloses a method and apparatus for controlling a processing machine to perform a processing operation on a work piece by (a) determining the nominal locations of at least two sensible reference marks on the work piece in terms of the coordinates of the work piece; (b) loading the work piece on the processing machine; (c) sensing, and measuring the actual locations of, the reference marks on the work piece when so mounted, in terms of the coordinates of the processing machine; (d) determining at least one geometrical transformation needed to transform the work piece coordinates of the nominal locations of the reference marks to the processing machine coordinates of the actual locations of the reference marks; (e) and controlling the processing machine in accordance with the determined geometrical transformation.

U.S. Pat. No. 6,362,797 (Dehmlow) discloses an apparatus and method for aligning portions of a tiled projection display, which become misaligned during operation of the display, including interposing at least one two-dimensionally electro-mechanically gimballed glass plate in the projection path of one of the display sections, sensing the misalignment of the tiles and automatically adjusting the alignment in response thereto, and further having apparatus and steps for alignment of the tiles, based upon operational characteristics of an aircraft upon which the display is used.

U.S. Pat. Nos. 5,835,194 and 5,959,718 (Morton) each disclose apparatus and methods for aligning and printing integral images.

For the foregoing reasons, there is a need for a do-it-yourself photo realistic talking head creation system and method, which allows a user to generate photo realistic animated images of talking heads, such as newscasters, quickly, easily, and conveniently. The do-it-yourself photo realistic talking head creation system and method should yield images that have the photo realistic quality required to convey personal identity, emphasize points in a conversation, and add emotional content, show the animated photo realistic images clearly and distinctly, with high quality lip synchronization, and require less bandwidth than is typically available on most present day networks and/or the internet.

The do-it-yourself photo realistic talking head creation system and method should be capable of capturing frames of an actual human being, and creating a library of photo realistic talking heads in different angular positions. The library of photo realistic talking heads may then be used create an animated performance of, for example, a newscaster or other such talking head having the photo realistic quality required to convey personal identity, emphasize points in a conversation, and add emotional content. The animated photo realistic images should show the animated talking head clearly and distinctly, with high quality lip synchronization, and require less bandwidth than is typically available on most present day networks and/or the internet.

The library of photo realistic talking heads should be capable of being constructed quickly, easily, and efficiently by an individual having ordinary computer skills, and minimizing production time, using guides, which may be used as templates for mixing and alignment with images of an actual human being in different angular positions.

A library of different ones of the guide libraries should be provided, each of the guide libraries having different ones of the guides therein, and each of the guides for a different angular position. Each of the guide libraries should having facial features different one from the other, thus, allowing a user to select the guide library from the library of different ones of the guide libraries, having facial features and characteristics close to those of the user.

The talking heads should be capable of being used in a newscaster format, associated with news coverage, the use of animated images of talking heads, having photo realistic quality and yielding personalized appearance, for use in a number and variety of applications.

The do-it-yourself photo realistic talking head creation system and method should also optionally be capable of creating a library of computer based two dimensional images from digital videotape footage taken of an actual human being. A user should be capable of manipulating a library of 3D rendered guide images or templates that are mixed, using personal computer software, and displayed on a computer monitor or other suitable device to provide a template for ordered head motion. A subject or newscaster should be capable of using the guides to maintain the correct pose alignment, while completing a series of facial expressions, blinking eyes, raising eyebrows, and speaking a phrase that includes target phonemes or mouth forms. The session should optionally be capable of being recorded continuously on high definition digital videotape. A user should optionally be capable of assembling the talking head library with image editing software, using selected individual video frames containing an array of distinct head positions, facial expressions and mouth shapes that are frame by frame comparable to the referenced source video frames of the subject. Output generated with the do-it-yourself photo realistic talking head creation system and method should be capable of being used in lieu of actual video in various applications and presentations on a personal computer, PDA or cell phone. The do-it-yourself photo realistic talking head creation system should also be optionally capable of constructing a talking head presentation from script commands.

The do-it-yourself photo realistic talking head creation system and method should be capable of being used with portable devices and portable wireless devices. These portable devices and portable wireless devices should include digital communications devices, portable digital assistants, cell phones, notebook computers, video phones, digital communications devices having video cameras and video displays, and other suitable devices.

The portable devices and portable wireless devices should be handheld devices, and the portable wireless devices should be capable of wirelessly transmitting and receiving signals.

A human subject should be capable of capturing an image of himself or herself with a video camera of such a device and view live video of the captured image on a video display of the device.

Guide images of the human subject should be capable of being superimposed on the displays of the portable devices and/or portable wireless devices of the do-it-yourself photo realistic talking head creation systems.

Each of the displays of such devices should be capable of displaying a composite image of the collected image of the human subject and a selected alignment template. The display and the video camera should allow the video camera to collect the image of the human subject, the human subject to view the composite image, and align the image of his or her head with the alignment template head at substantially the same angular position as the specified alignment template head angular position.

Such portable devices and/or portable wireless devices should be capable of being connected to a personal computer via a wired or wireless connection, and/or to a remote server via a network of sufficient bandwidth to support real-time video streaming and/or transmission of suitable signals. Typical networks include cellular networks, distributed networks, such as the internet, global network, wide area network, metropolitan area network, or local area network, and other suitable networks.

More than one user should be capable of being connected to a remote server at any particular time. Captured video streams and/or still images should be capable of being communicated to the computer and/or the server for processing into a photo realistic talking head library, or optionally, processing should be capable of being carried out in the devices themselves.

Software applications and/or hardware should be capable of residing in such devices, computers and/or remote servers to analyze composite signals of the collected images of the human subjects and the alignment templates, and determine the accuracy of alignment to the guide images.

The do-it-yourself photo realistic talking head creation system and method should be capable of using voice prompts created by a synthetically generated voice, actual recorded human voice, or via a live human technical advisor, and communicated to the human subject in real-time to assist the user during the alignment process, and alternatively and/or additionally using video prompts. The human subject may then follow the information in the prompts to adjust his or her head position, and when properly aligned initiate the spoken phrase portion of the capture process. Voice and/or video prompts may be used to assist the human subject in other tasks as well, such as when to repeat a sequence, if proper alignment is possibly lost during the capture and/or alignment process, and/or when to start and/or stop the session.

SUMMARY

The present invention is directed to a do-it-yourself photo realistic talking head creation system and method, which allows a user to generate photo realistic animated images of talking heads, such as newscasters, quickly, easily, and conveniently. The do-it-yourself photo realistic talking head creation system and method yields images that have the photo realistic quality required to convey personal identity, emphasize points in a conversation, and add emotional content, show the animated photo realistic images clearly and distinctly, with high quality lip synchronization, and requires less bandwidth than is typically available on most present day networks and/or the internet.

The do-it-yourself photo realistic talking head creation system and method is capable of capturing frames of an actual human being, and creating a library of photo realistic talking heads in different angular positions. The library of photo realistic talking heads may then be used create an animated performance of, for example, a newscaster or other such talking head having the photo realistic quality required to convey personal identity, emphasize points in a conversation, and add emotional content. The animated photo realistic images show the animated talking head clearly and distinctly, with high quality lip synchronization, and require less bandwidth than is typically available on most present day networks and/or the internet.

The library of photo realistic talking heads is capable of being constructed quickly, easily, and efficiently by an individual having ordinary computer skills, and minimizing production time, using guides, which may be used as templates for mixing and alignment with images of an actual human being in different angular positions.

A library of different ones of the guide libraries are provided, each of the guide libraries having different ones of the guides therein, and each of the guides for a different angular position. Each of the guide libraries has facial features different one from the other, thus, allowing a user to select the guide library from the library of different ones of the guide libraries, having facial features and characteristics close to those of the user.

The talking heads are capable of being used in a newscaster format, associated with news coverage, the use of animated images of talking heads, having photo realistic quality and yielding personalized appearance, for use in a number and variety of applications.

The do-it-yourself photo realistic talking head creation system and method of the present invention mixes or combines a human subject's head and a guide or template, so as to allow the human subject to view the image of his or her own head, and to align his or her head image with the guide.

Upon proper alignment, the image of the human subject's head is stored. The process is repeated for different head tilt, swivel, and nod positions, and a library of photo realistic talking heads is, thus, constructed and stored. Additionally, the human subject utters selected sounds and makes selected eye movements, i.e. closes and opens the eyes, at each of the head positions, resulting in changes in mouth and eye shapes, and changes in facial expressions, cropped images of the human subject's mouth and eyes additionally being stored for each of the selected utterances and eye movements.

The guides, which are images, are used as reference guides or templates for assisting the human subject in maneuvering his or her head into a plurality of positions. The guide and an image of the human subject's head are mixed or combined, so as to allow the human subject to view the image of his or her own head, and to align his or her head image with the guide. Upon proper alignment, the image of the human subject's head is stored. Additionally, the human subject utters selected sounds and makes selected eye movements, i.e. closes and opens the eyes, at each of the head positions, resulting in changes in mouth and eye shapes, and changes in facial expressions, cropped images of the human subject's mouth and eyes additionally being stored for each of the selected utterances and eye movements. The process is repeated for different head tilt, swivel, and nod positions, and the library of photo realistic talking heads is, thus, constructed and stored. The library of photo realistic talking heads may be used for creating highly detailed talking head newscasters for internet based applications. Image mixing and alignment means assist the human subject in aligning his or her head with the guide.

The do-it-yourself photo realistic talking head creation system and method can be used to create a library of computer based two-dimensional images from digital videotape footage taken of an actual human being. The resulting talking head library, assembled with image editing software, using selected individual video frames, contains an array of distinct head positions, facial expressions and mouth shapes that is frame by frame comparable with the referenced source video frames of the same subject. Output generated with the do-it-yourself photo realistic talking head creation system and method can be used instead of actual video on newscasts and can instruct a personal computer, PDA or cell phone to construct a talking head newscast from a series of script commands.

The do-it-yourself photo realistic talking head creation system and method of the present invention is capable of capturing and creating personal photo talking head libraries suitable for use with imbedded web content, animated e-mail, Internet messaging services, PDA's, cell phones and other wireless communication devices. The do-it-yourself photo realistic talking head creation system and method enables users to use capture software and an input from a digital video camera, or computer-based video camera to create a photo realistic talking head library. Automated image editing software may be used to assist the user with identifying and cropping target frames for inclusion in the photo realistic talking head library.

The do-it-yourself photo realistic talking head creation system and method may also optionally be used to create a library of computer based two dimensional images from digital videotape footage taken of a live newscaster. A user should be capable of manipulating a library of 3D rendered guide images or templates that are mixed, using personal computer software, and displayed on a computer monitor or other suitable device to provide a template for ordered head motion. A subject or newscaster may use the guides to maintain the correct pose alignment, while completing a series of facial expressions, blinking eyes, raising eyebrows, and speaking a phrase that includes target phonemes or mouth forms. The session is optionally capable of being recorded continuously on high definition digital videotape. A user can optionally assemble the talking head library with image editing software, using selected individual video frames containing an array of distinct head positions, facial expressions and mouth shapes that are frame by frame comparable to the referenced source video frames of the subject. Output generated with the do-it-yourself photo realistic talking head creation system and method may used in lieu of actual video on newscasts, and/or as an instructional aid on a personal computer, PDA or cell phone. The do-it-yourself photo realistic talking head creation system may be used to optionally construct a talking head newscast from script commands.

The do-it-yourself photo realistic talking head creation system and method can be used with portable devices and portable wireless devices. These portable devices and portable wireless devices include digital communications devices, portable digital assistants, cell phones, notebook computers, video phones, and other suitable devices.

The portable devices and portable wireless devices should be handheld devices, and the portable wireless devices should be capable of wirelessly transmitting and receiving signals.

These portable devices and portable wireless devices include digital communications devices often have video cameras and video displays.

A human subject may, for example, capture an image of himself or herself with a video camera of such a device and view live video of the captured image on a video display of the device.

Guide images of the human subject may be superimposed on the displays of the portable devices and/or portable wireless devices of the do-it-yourself photo realistic talking head creation systems.

Each of the displays of such devices may display a composite image of the collected image of the human subject and a selected alignment template, as aforedescribed. The display and the video camera allow the video camera to collect the image of the human subject, allow the human subject to view the composite image, and align the image of his or her head with the alignment template head at substantially the same angular position as the specified alignment template head angular position.

Such portable devices and/or portable wireless devices may, for example, be connected to a personal computer via a wired or wireless connection, and/or to a remote server via a network of sufficient bandwidth to support real-time video streaming and/or transmission of suitable signals. Typical networks include cellular networks, distributed networks, such as the internet, global network, wide area network, metropolitan area network, or local area network, and other suitable networks.

More than one user may be connected to a remote server at any particular time. Captured video streams and/or still images may be communicated to the computer and/or the server for processing into a photo realistic talking head library, or optionally, processing may be carried out in the devices themselves.

Software applications and/or hardware may reside in such devices, computers and/or remote servers to analyze composite signals of the collected images of the human subjects and the alignment templates, and determine the accuracy of alignment to the guide images.

Voice prompts may be created by a synthetically generated voice, actual recorded human voice, or via a live human technical advisor, and communicated to the human subject in real-time to assist the user during the alignment process. Video prompts may alternatively and/or additionally be used. The human subject may then follow the information in the prompts to adjust his or her head position, and when properly aligned initiate the spoken phrase portion of the capture process. Voice and/or video prompts may be used to assist the human subject in other tasks as well, such as when to repeat a sequence, if proper alignment is possibly lost during the capture and/or alignment process, and/or when to start and/or stop the session.

An apparatus for constructing a photo realistic human talking head having features of the present invention comprises: a handheld device; a network; a server; the network and the handheld device communicating one with the other; the network and the server communicating one with the other; a library of alignment templates, the server comprising the library of alignment templates, each of the alignment templates being different one from the other and representational of an alignment template frame of a photo realistic human talking head having an alignment template head angular position, comprising a template head tilt, a template head nod, and a template head swivel component, each of the alignment template frame different one form the other, each of the alignment template head angular positions different one from the other; a controller, the server comprising the controller, the controller selecting an alignment template from the library of alignment templates corresponding to a specified alignment template head angular position and having an image output signal representational of the alignment template; a video camera, the handheld device comprising the video camera, the video camera collecting an image of a human subject having a head having a human subject head angular position, comprising a human subject head tilt, a human subject head nod, and a human subject head swivel component, the video camera having an output signal representational of the collected image of the human subject, the handheld device communicating the output signal of the video camera representational of the collected image of the human subject to the server via the network; the server, the server having an input receiving the output signal of the video camera representational of the collected image of the human subject, the server having a mixer, the server receiving the selected alignment template image output signal from the controller, and communicating the selected alignment template image output signal and the received collected image signal of the human subject to the mixer, the mixer receiving the selected alignment template image output signal and the communicated collected image signal of the human subject, and mixing one with the other into an output signal representational of a composite image of the collected image of the human subject and the selected alignment template, and communicating the composite image signal of the collected image of the human subject and the selected alignment template to the server, the server having an output signal representational of the composite image signal of the collected image of the human subject and the selected alignment template received from the mixer, the server communicating the output signal representational of the composite image signal of the collected image of the human subject and the selected alignment template to the handheld device via the network; a display, the handheld device comprising the display, the display having an input receiving the output signal representational of the composite image signal of the collected image of the human subject and the selected alignment template, the display and the video camera adapted to allow the video camera to collect the image of the human subject and the human subject to view the composite image and the human subject to align the image of the head of the human subject with the alignment template head at substantially the same angular position as the specified alignment template head angular position; storage means storing a library of collected images of the human subject with the head of the subject at different human subject head angular positions, the server comprising the storage means, the server communicating the received collected image signal of the human subject to the storage means, the storage means receiving and storing the received collected image signal of the human subject as a stored image of the human subject, when the human subject has the head of the human subject substantially aligned with the alignment template head, the stored image of the human subject having the human subject head angular position substantially the same as the specified alignment template head angular position, each of the stored images in the library of collected images being different one from the other, each of the stored images of the human subject head angular positions different one from the other; each of the stored images of the human subject head angular positions of the library of collected images corresponding to and substantially the same as and aligned with a selected one of the alignment template head angular positions of the library of alignment templates; each of the stored images representing a different frame of a photo realistic human talking head. A method of constructing a photo realistic human talking head having features of the present invention comprises at least the following steps: selecting an alignment template from a library of alignment templates, each of the alignment templates being different one from the other and representational of an alignment template frame of a photo realistic human talking head having an alignment template head angular position, comprising a template head tilt, a template head nod, and a template head swivel component, each of the alignment template frames different one form the other, each of the alignment template head angular positions different one from the other; collecting an image of a human subject with a video camera; communicating the collected image of the human subject to a computer, comprising a mixer; mixing the collected image of the human subject with an image of the selected alignment template in the mixer, thus, creating a composite image of the human subject and the selected alignment template; communicating the composite image to a display for display to the human subject, the display adapted to facilitate the human subject aligning an image of a head of the human subject with the image of the selected alignment template; substantially aligning the head of the human subject, having a human subject head angular position, comprising a human subject head tilt, a human subject head nod, and a human subject head swivel component, with the image of the selected alignment template head at substantially the same angular position as the selected alignment template head angular position; collecting and storing an image of the substantially aligned human subject in a library of collected images, each of the collected images having a different human subject angular position, which is substantially the same as the selected alignment template head angular position, each of the stored images representing a different frame of a photo realistic human talking head.

DRAWINGS

These and other features, aspects, and advantages of the present invention will become better understood with regard to the following description, appended claims, and accompanying drawings where:

Figure 1:
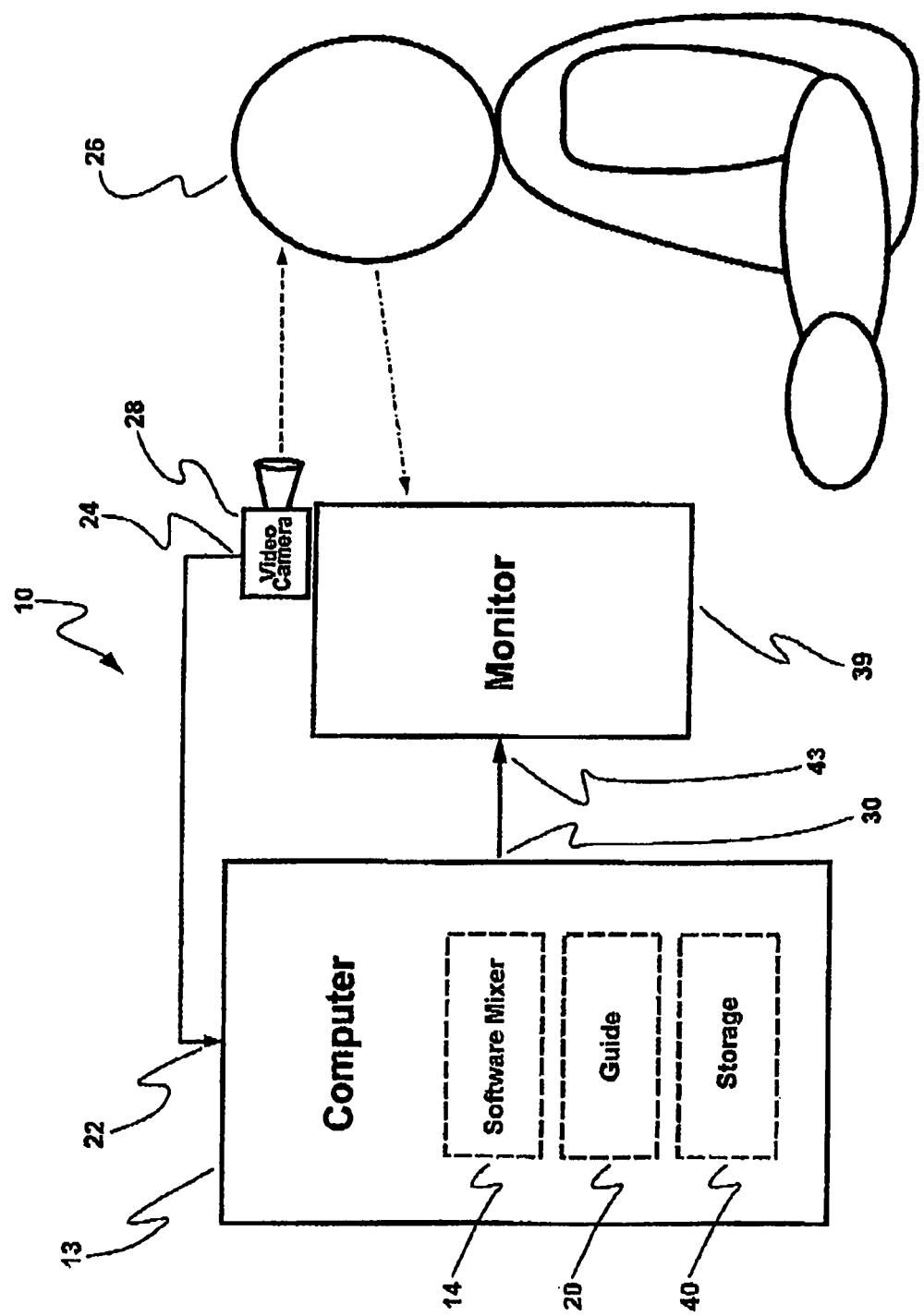
FIG. 1 is a block diagram of a do-it-yourself photo realistic talking head creation system, constructed in accordance with the present invention.
Figure 2:
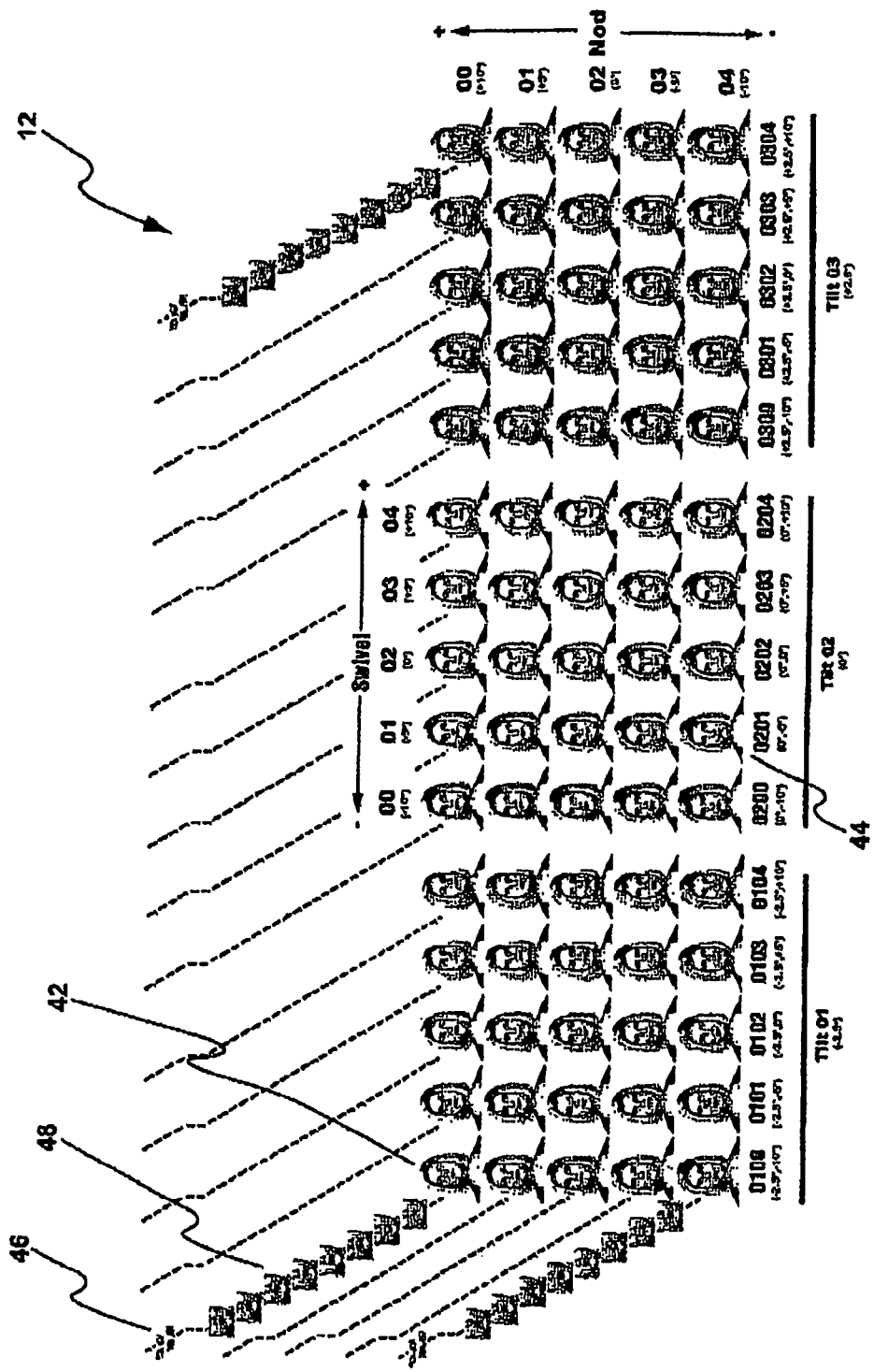
FIG. 2 is a diagrammatic representation of a photo realistic talking head library of the present invention.
Figure 3:
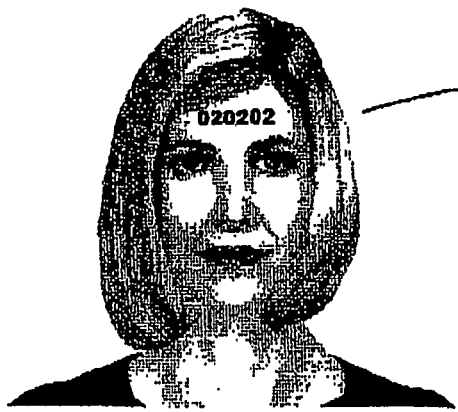
FIG. 3 is a view of a guide, which is used as an alignment template.
Figure 4:
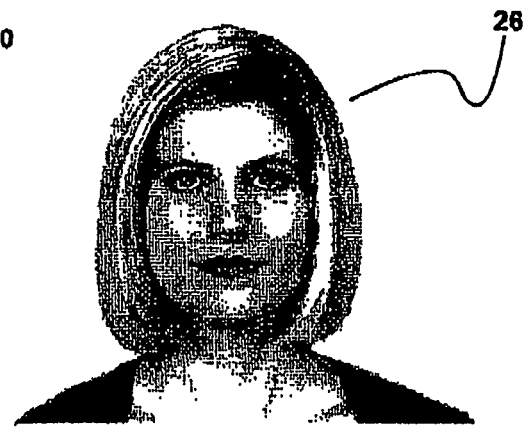
FIG. 4 is a view of a subject to be incorporated into the photo realistic talking head library of FIG. 2.
Figure 7:
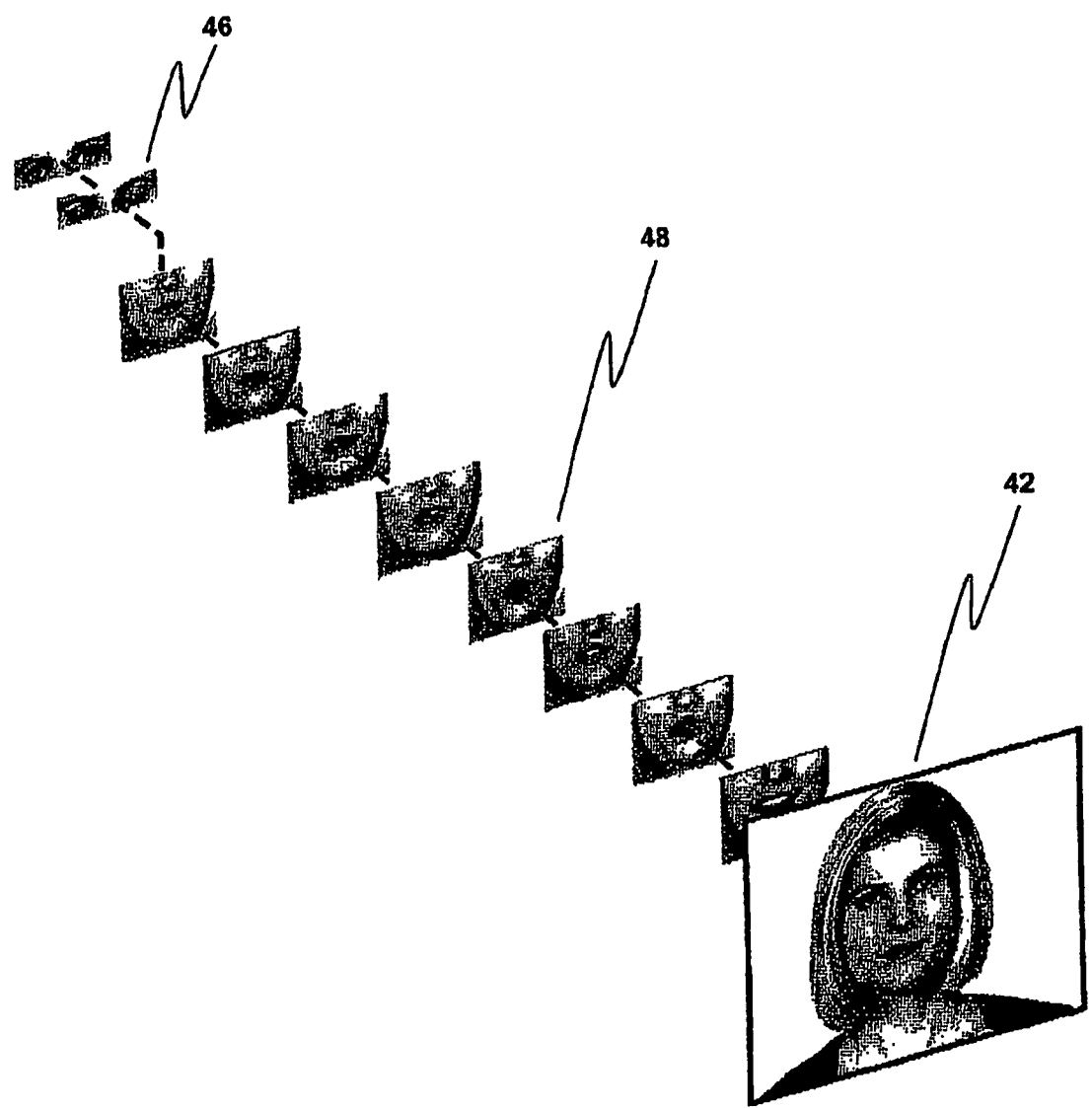
FIG. 7 shows an enlarged one of a selected image of the photo realistic talking head library of FIG. 2 at a particular angular position, and ones of different eye characteristics, and ones of different mouth characteristics at the particular angular position of the selected image, each also of the photo realistic talking head library of FIG. 2.
Figure 8:
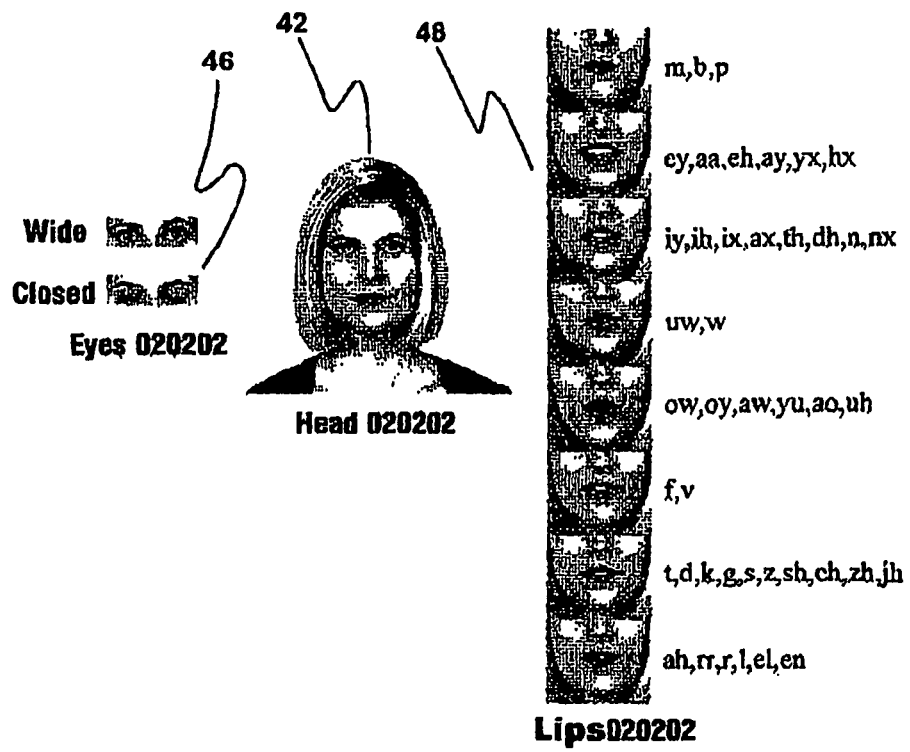
Figure 9:
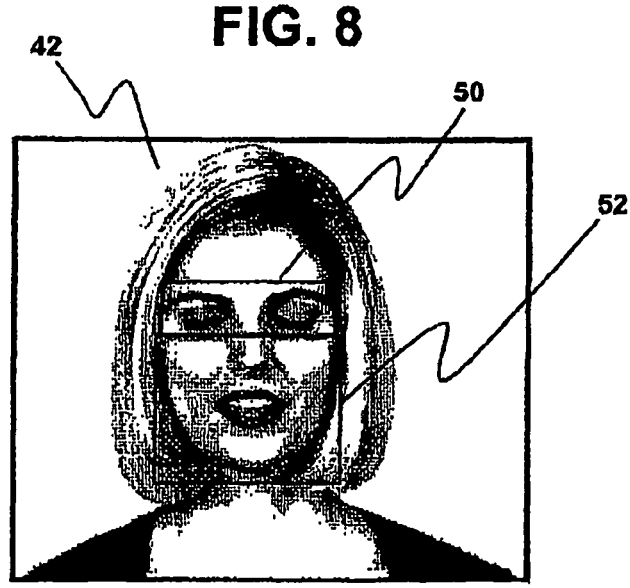
Figure 10:
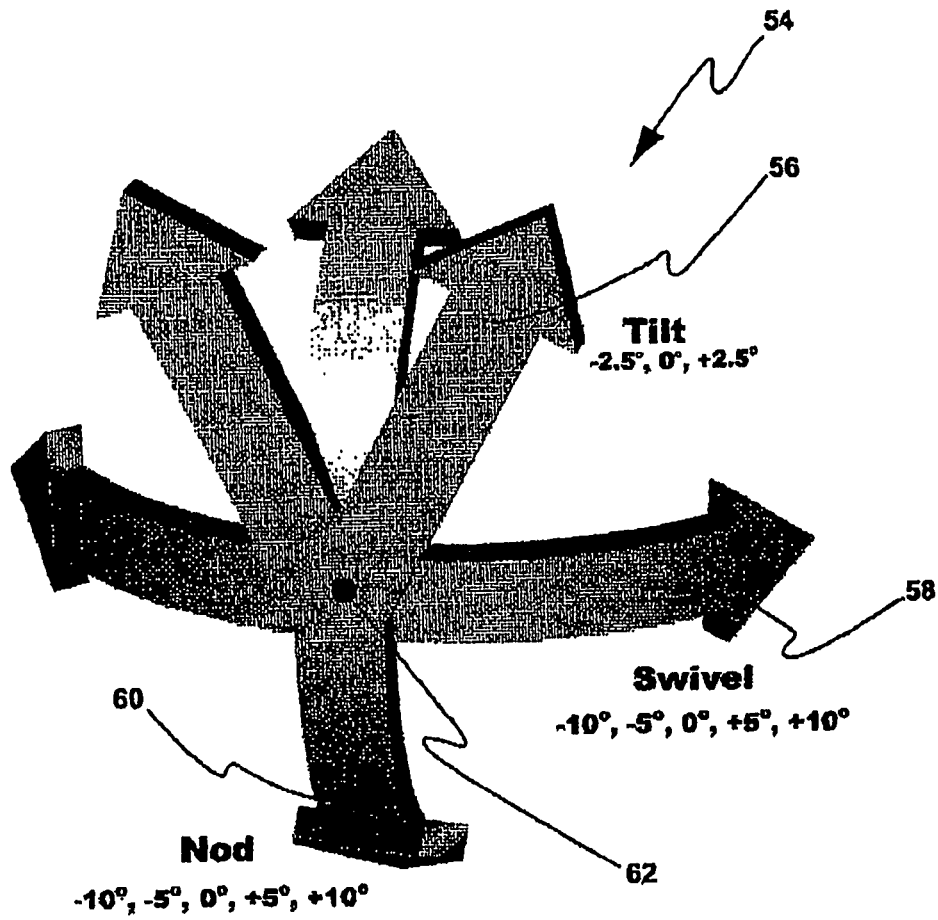
Figure 11:
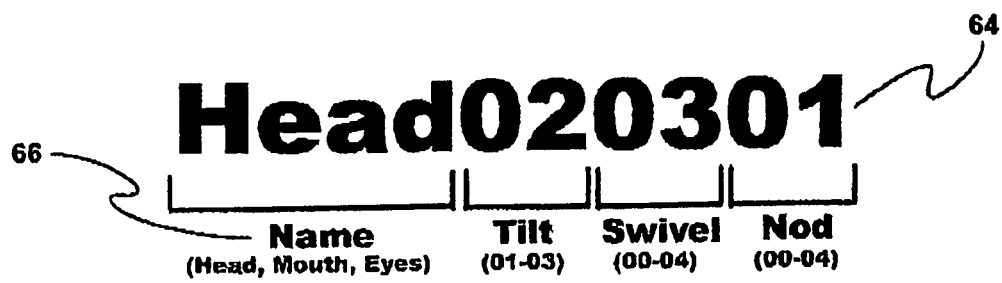
Figure 12:
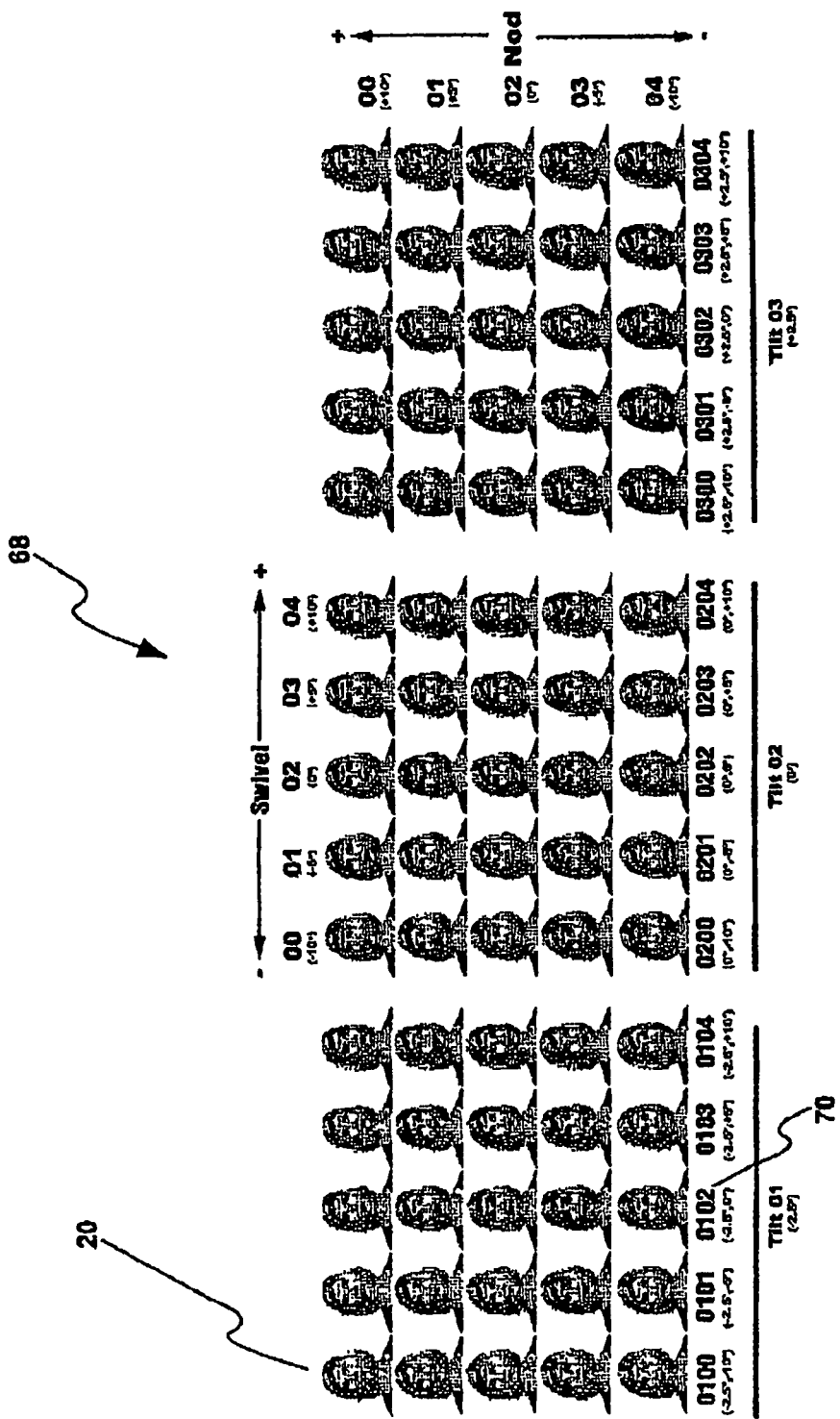
Figures 13A, 13B:
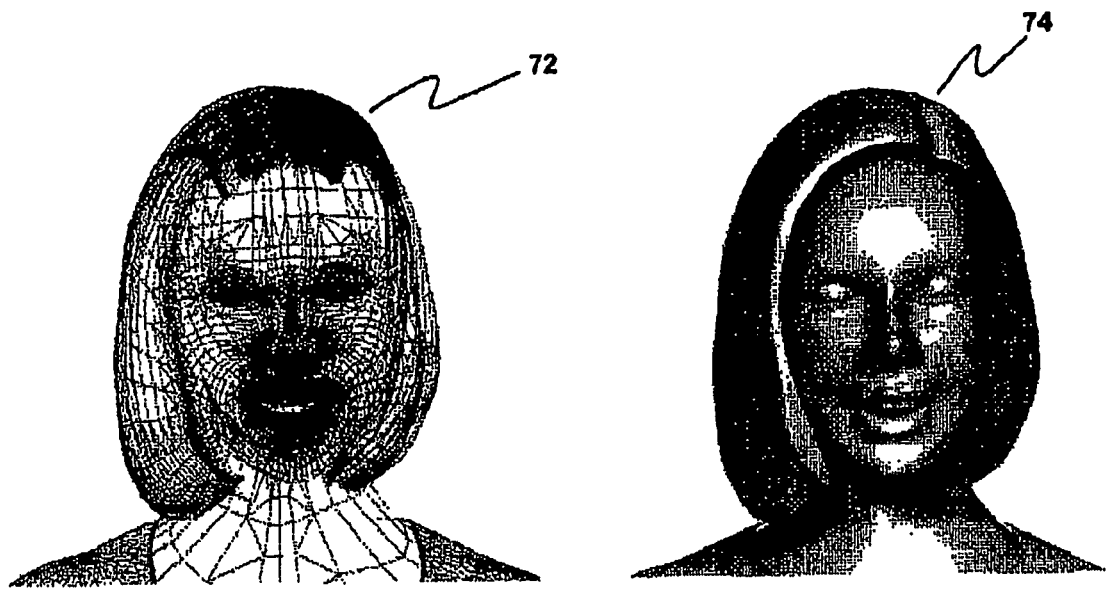
Figure 13C:
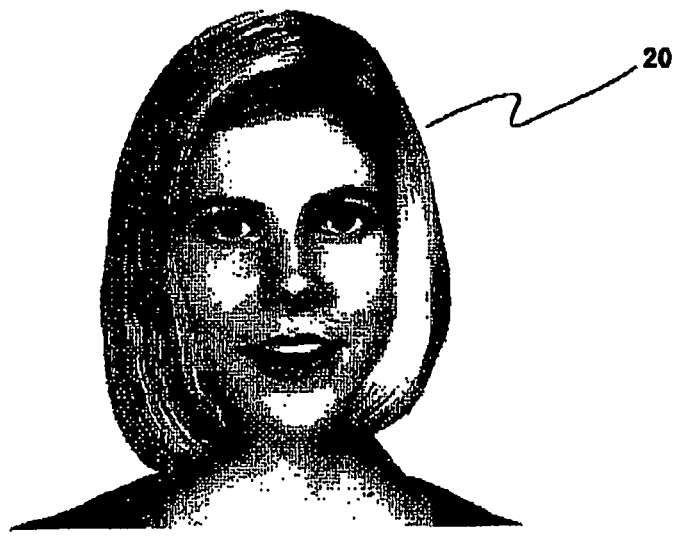
Figure 15:
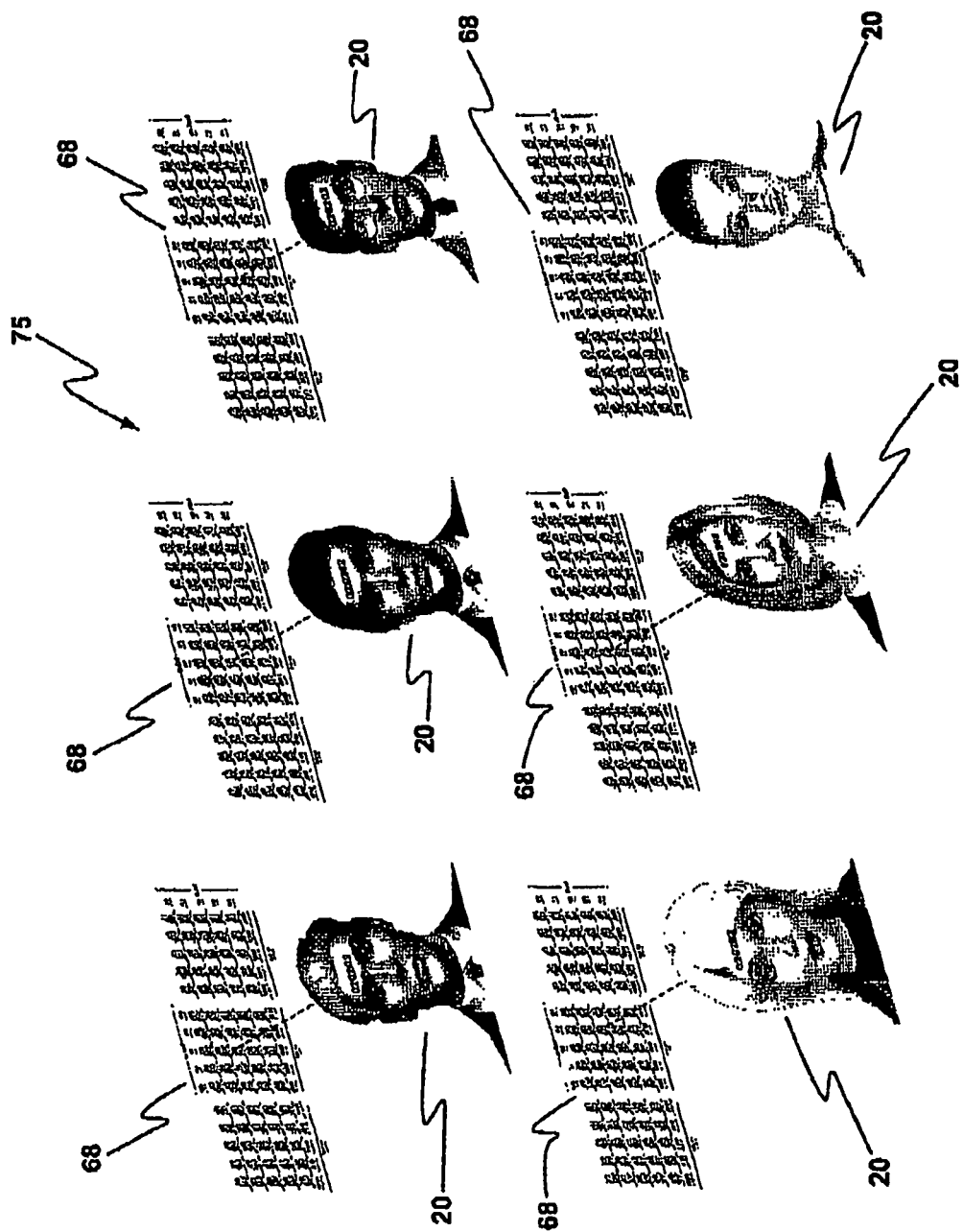
Figure 16:
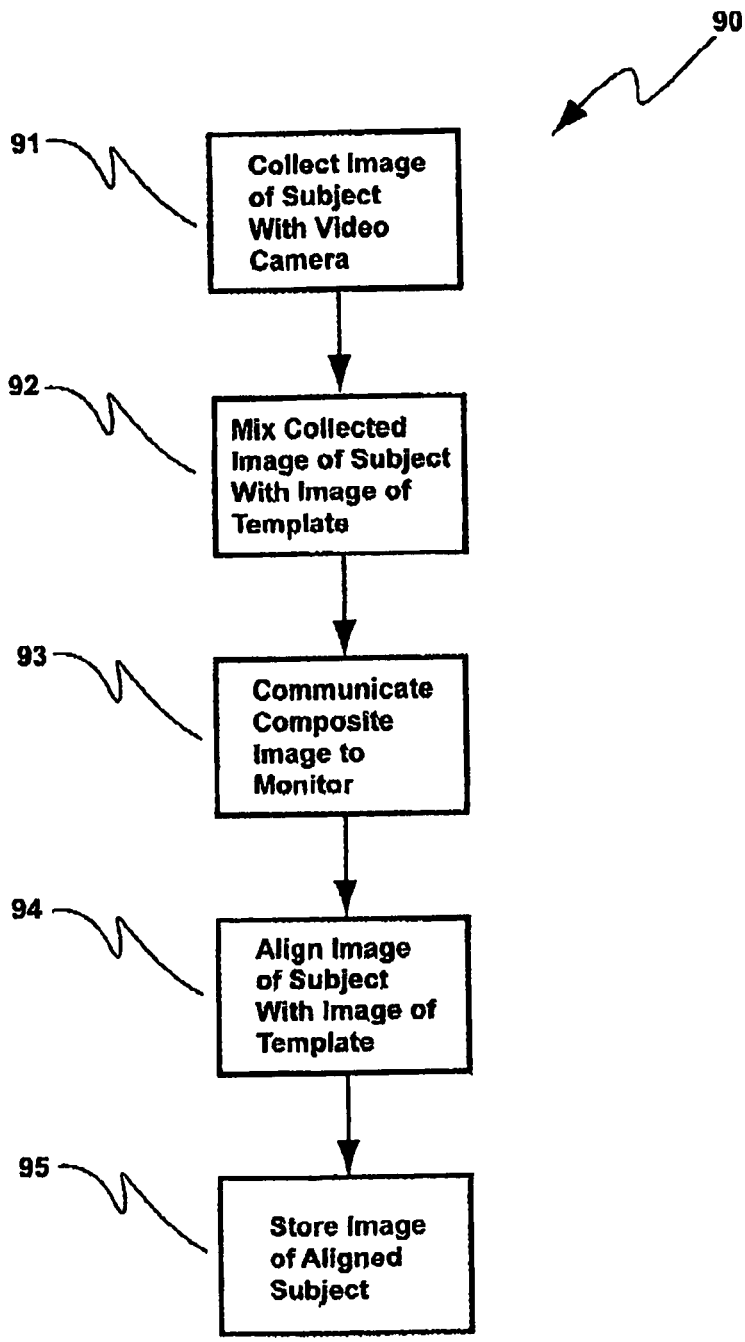
Figure 17:
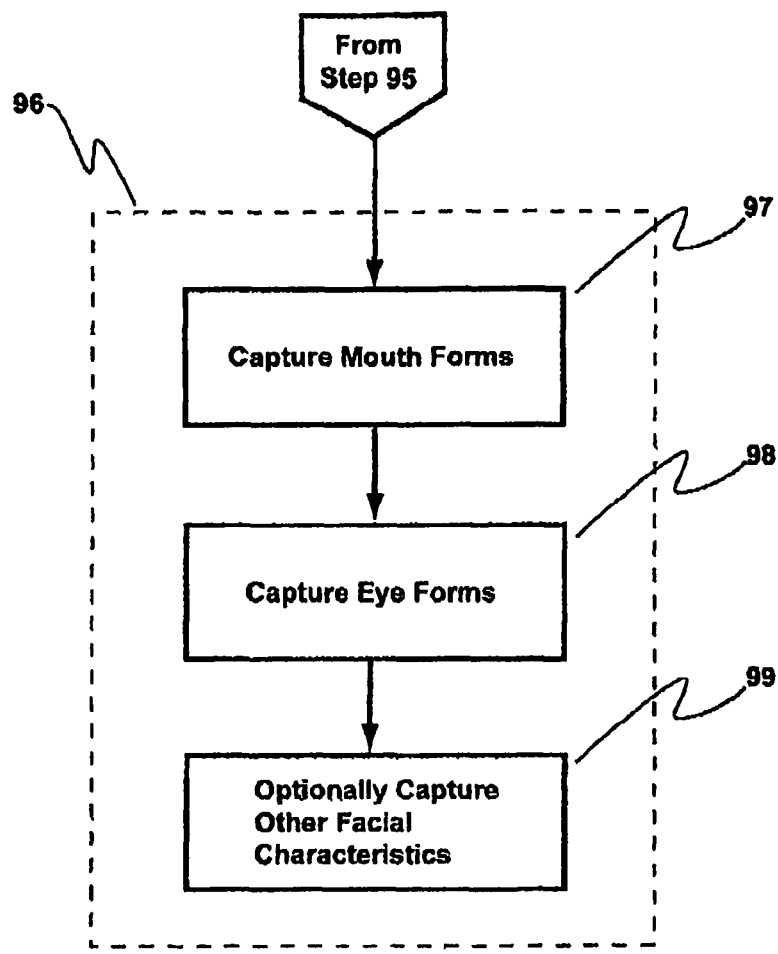
Figure 18:
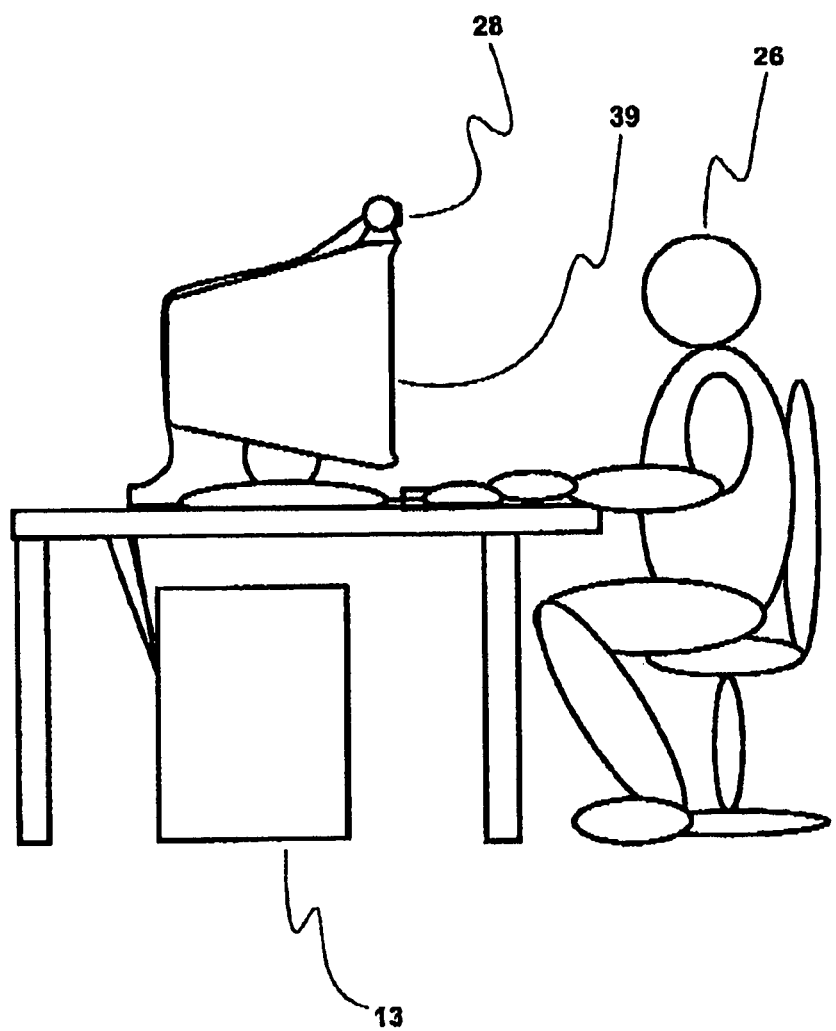
Figure 19:
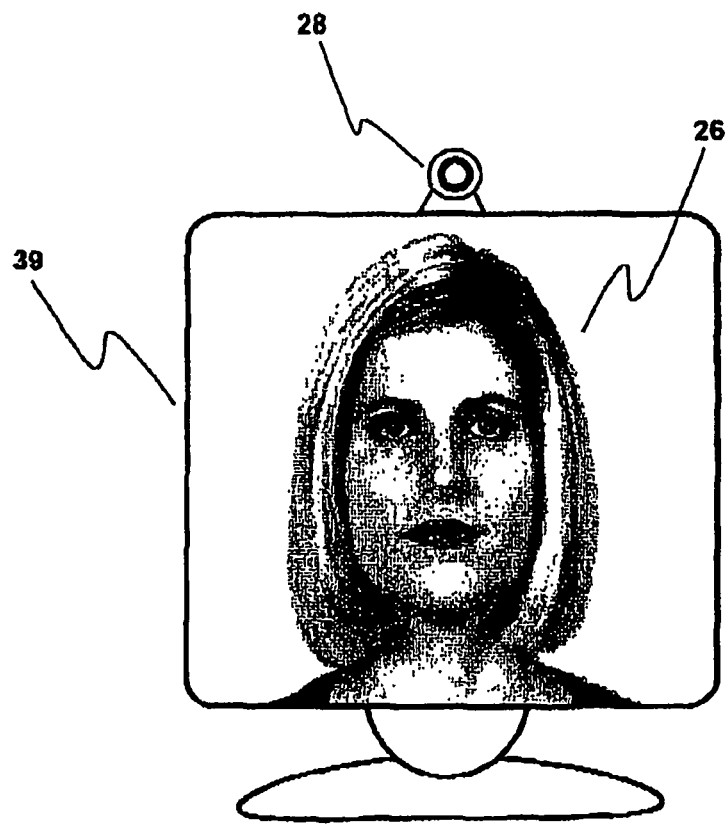
Figure 20:
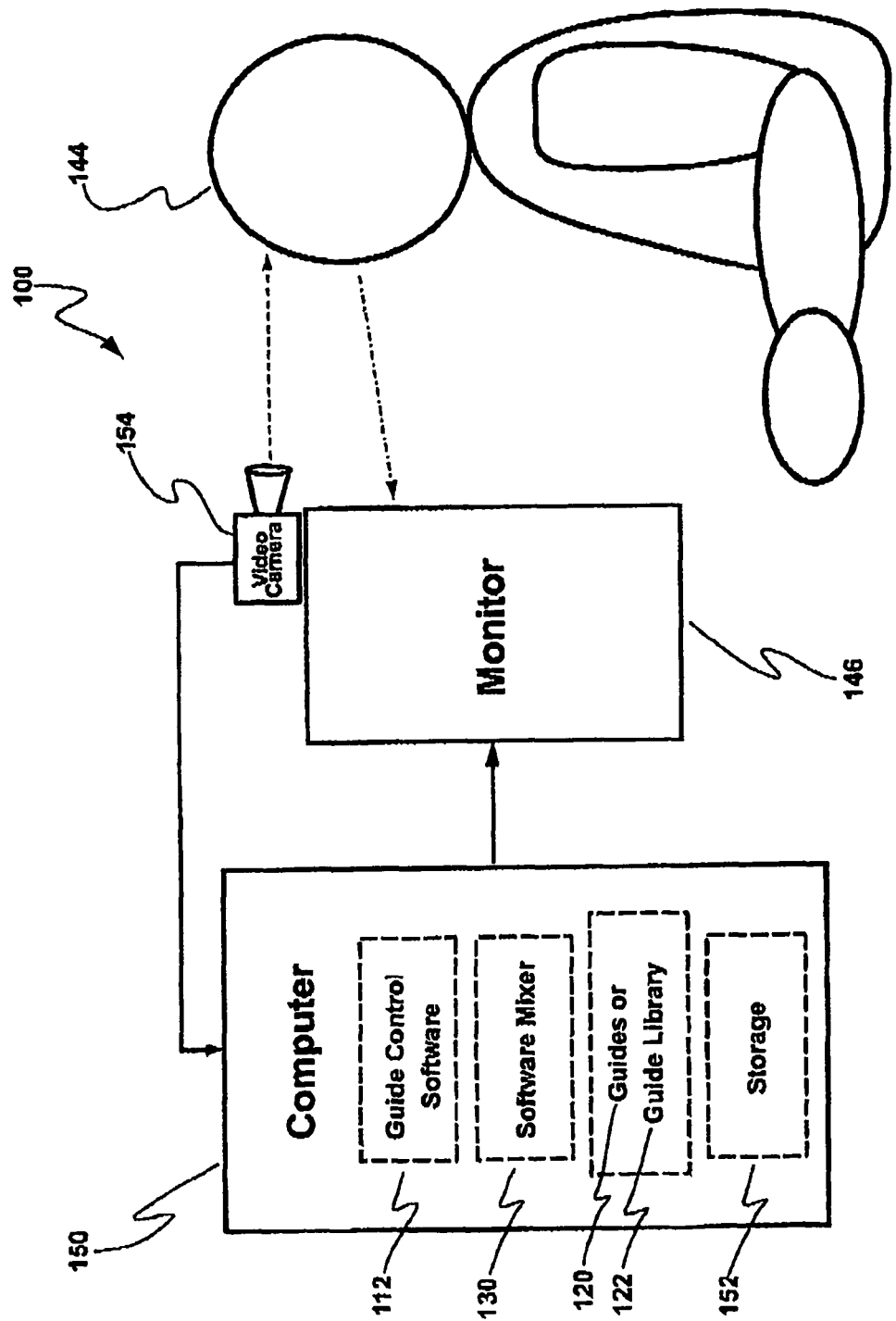
Figure 21:
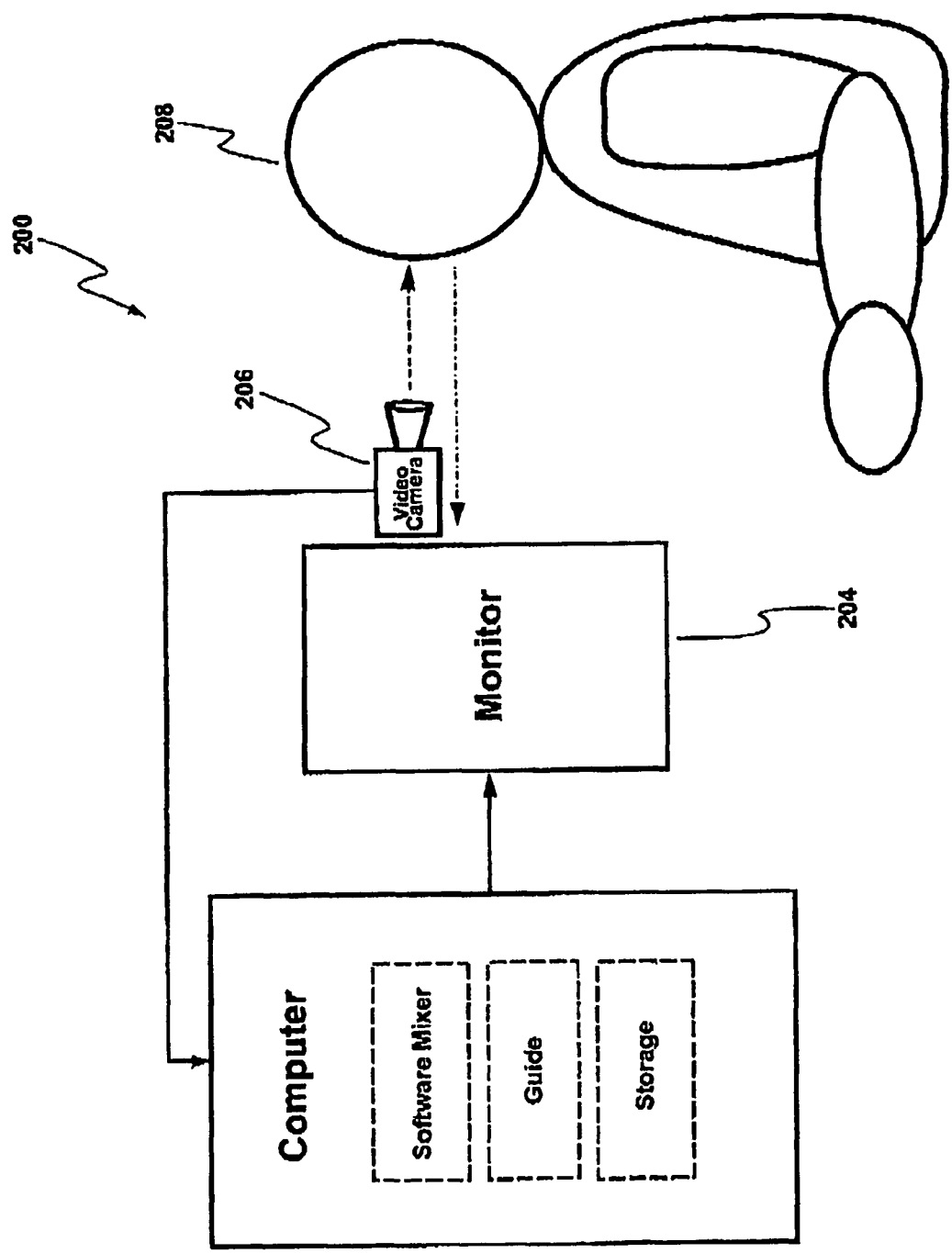
Figure 22:
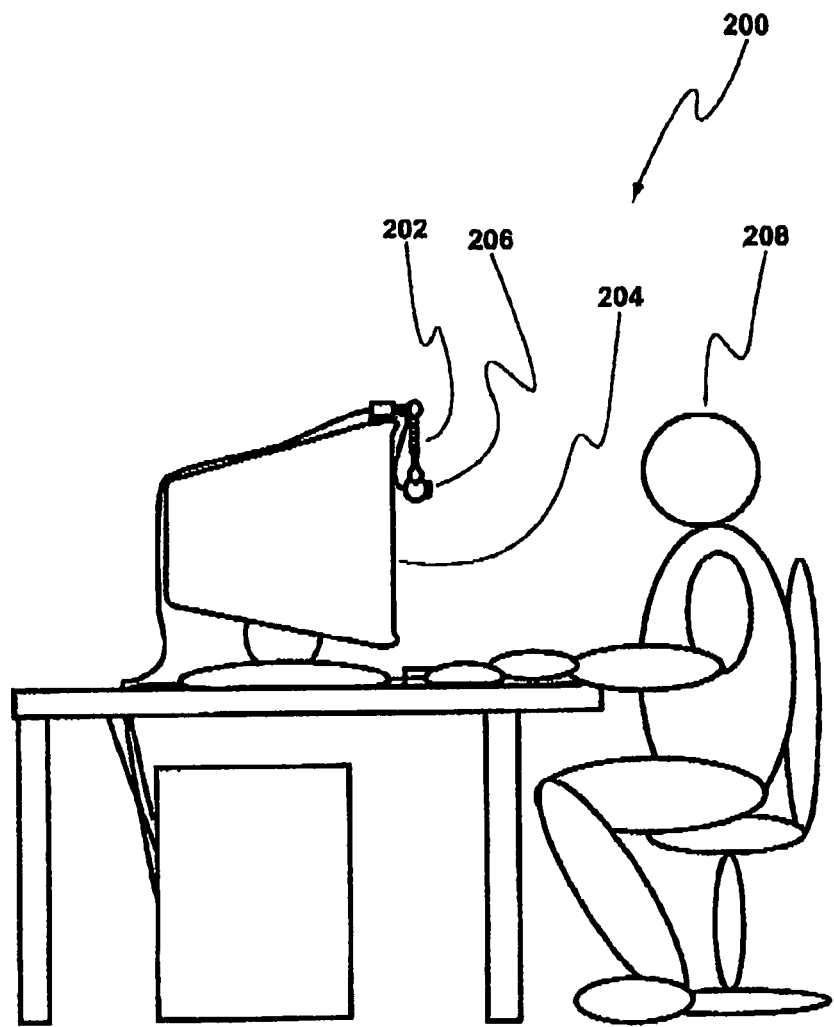
Figure 23:
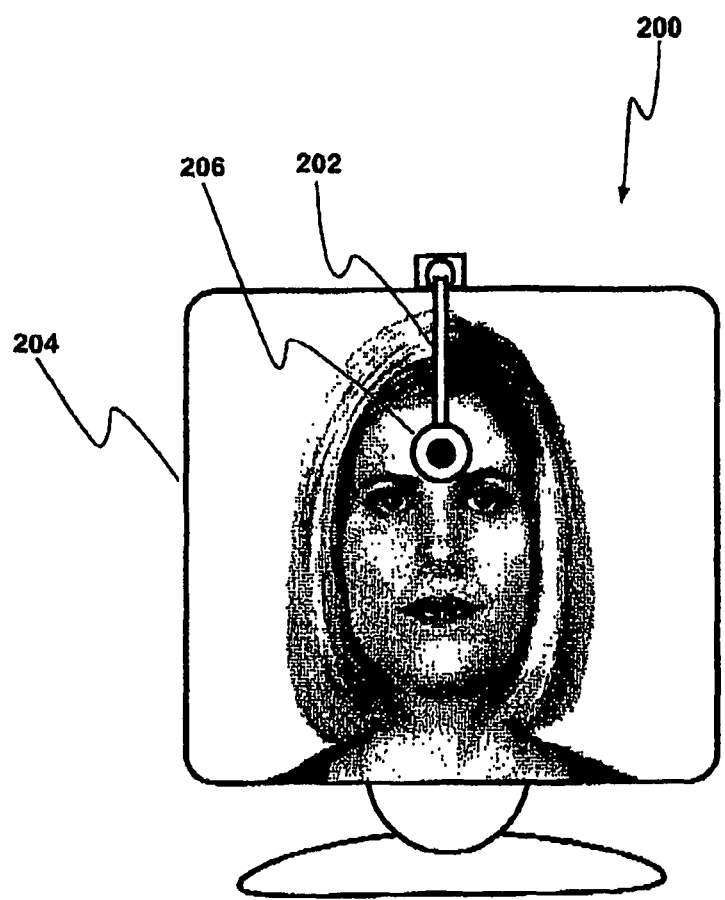
Figure 24:
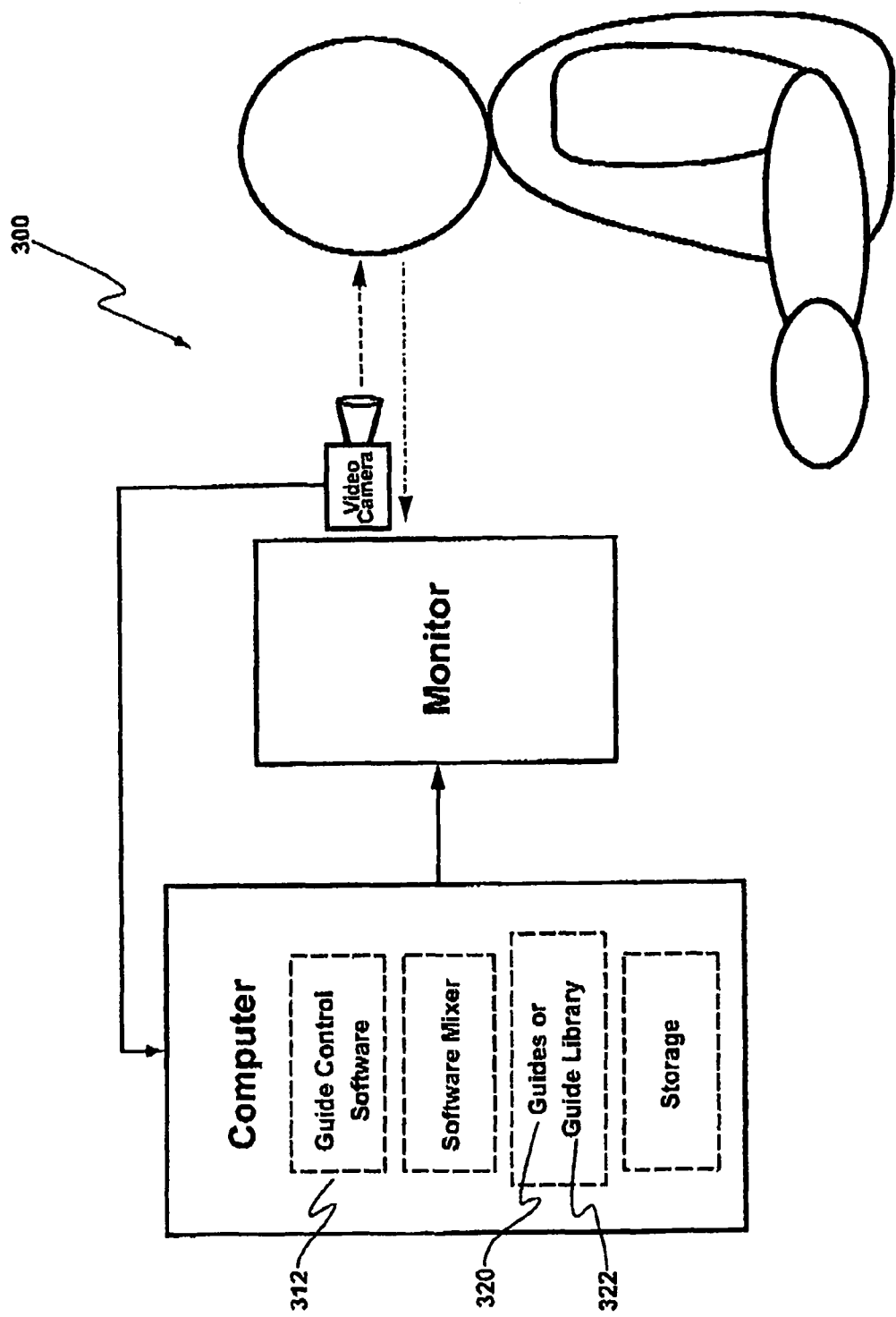
Figure 25:
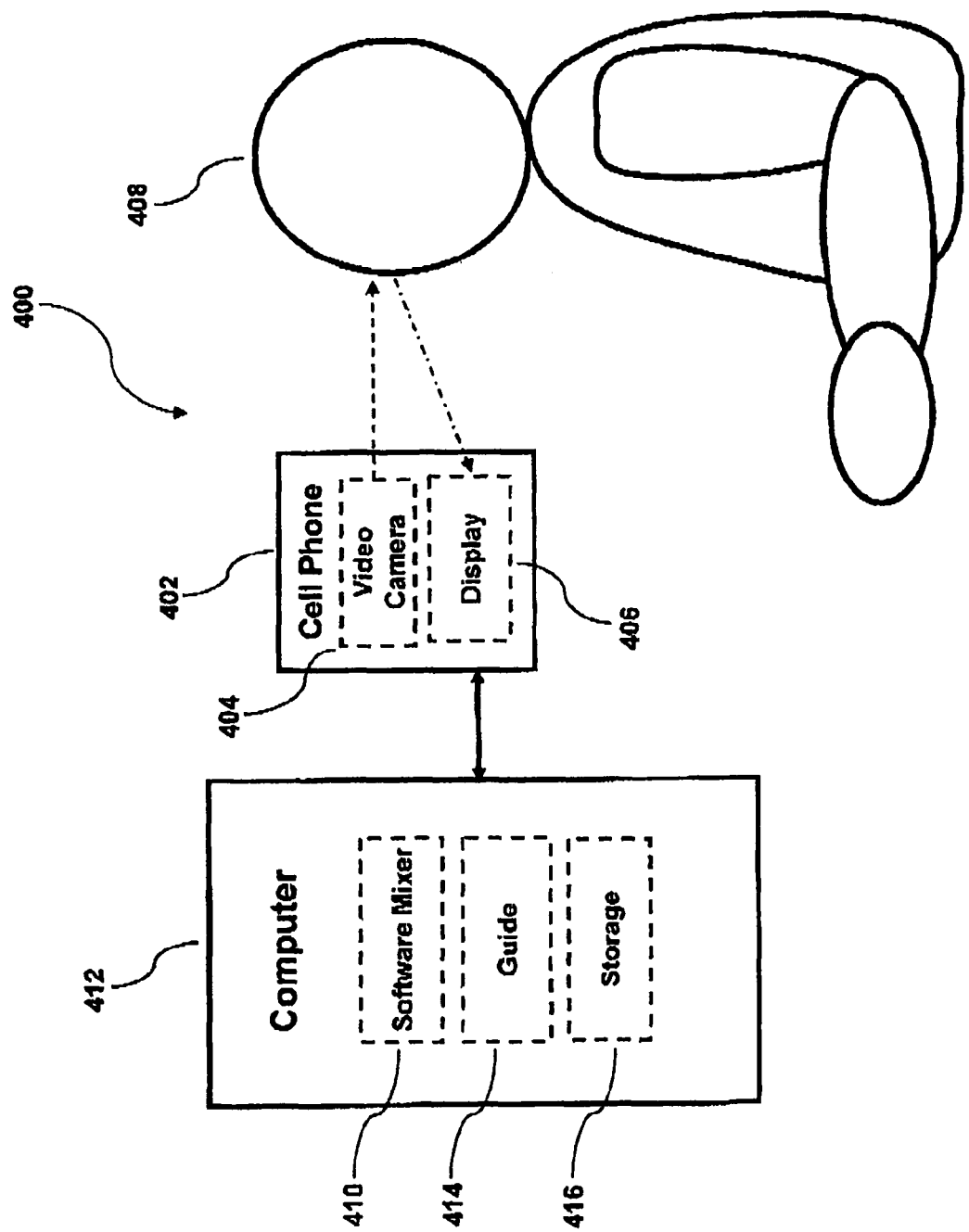
Figure 26:
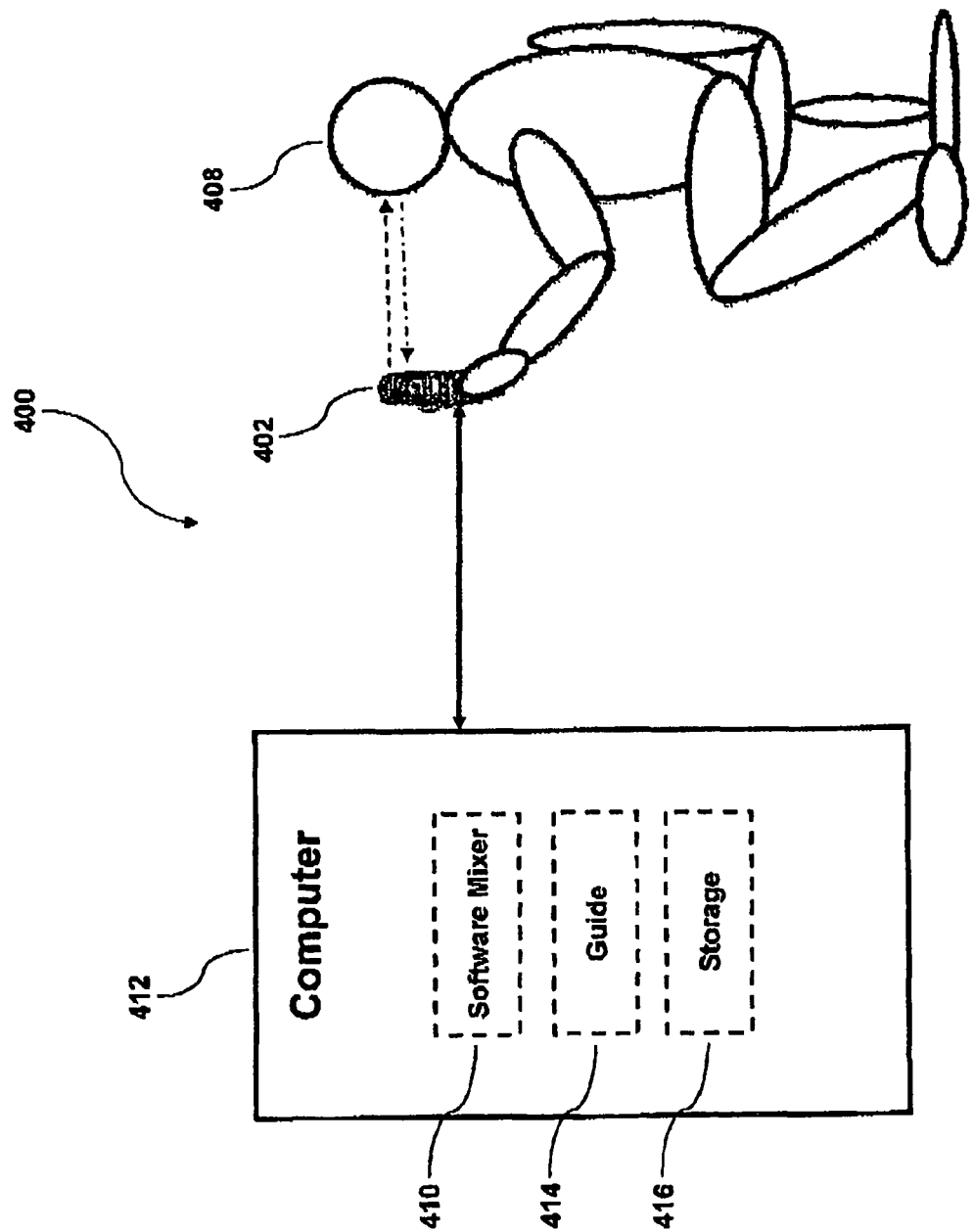
Figure 27:
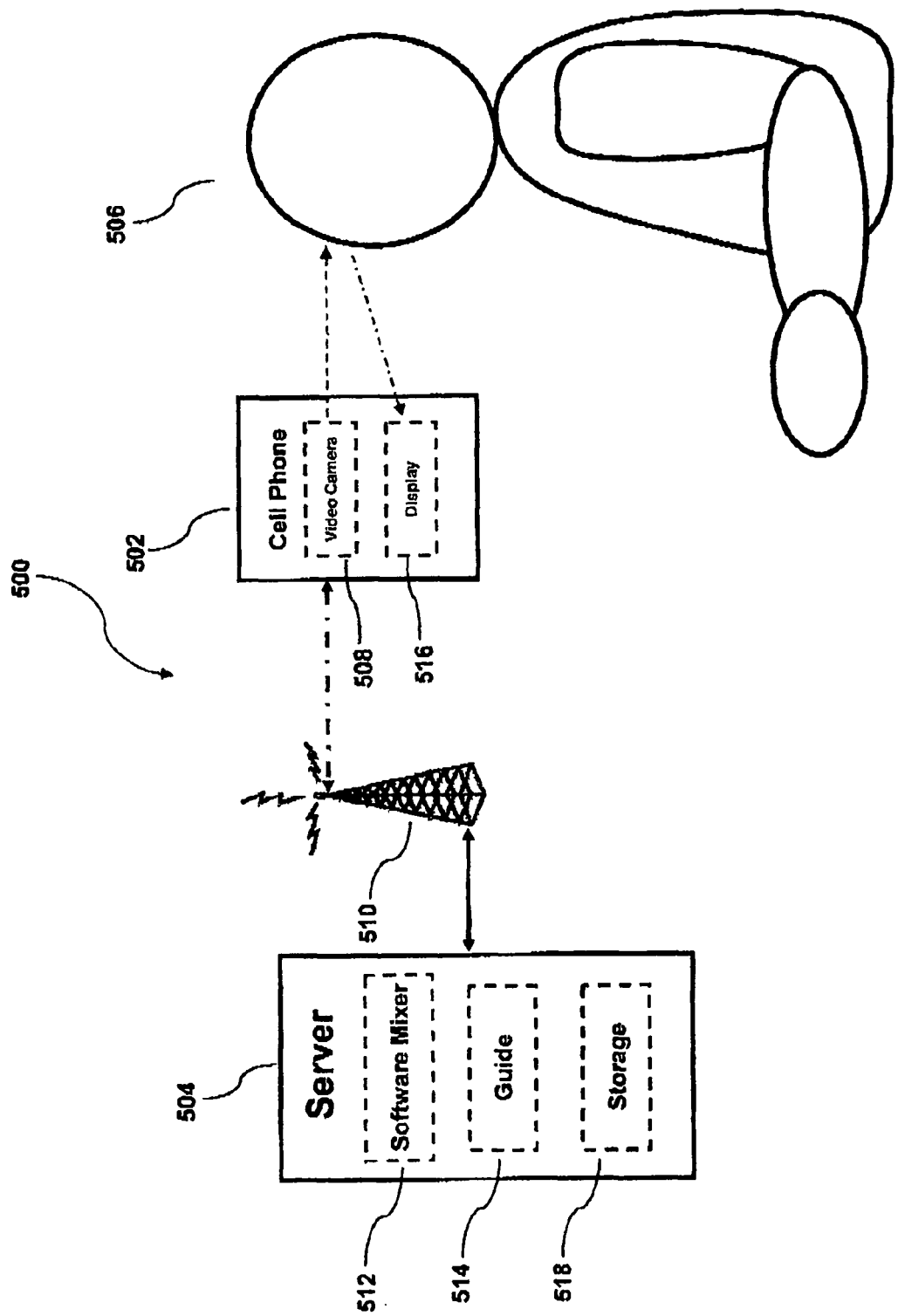
Figure 28:
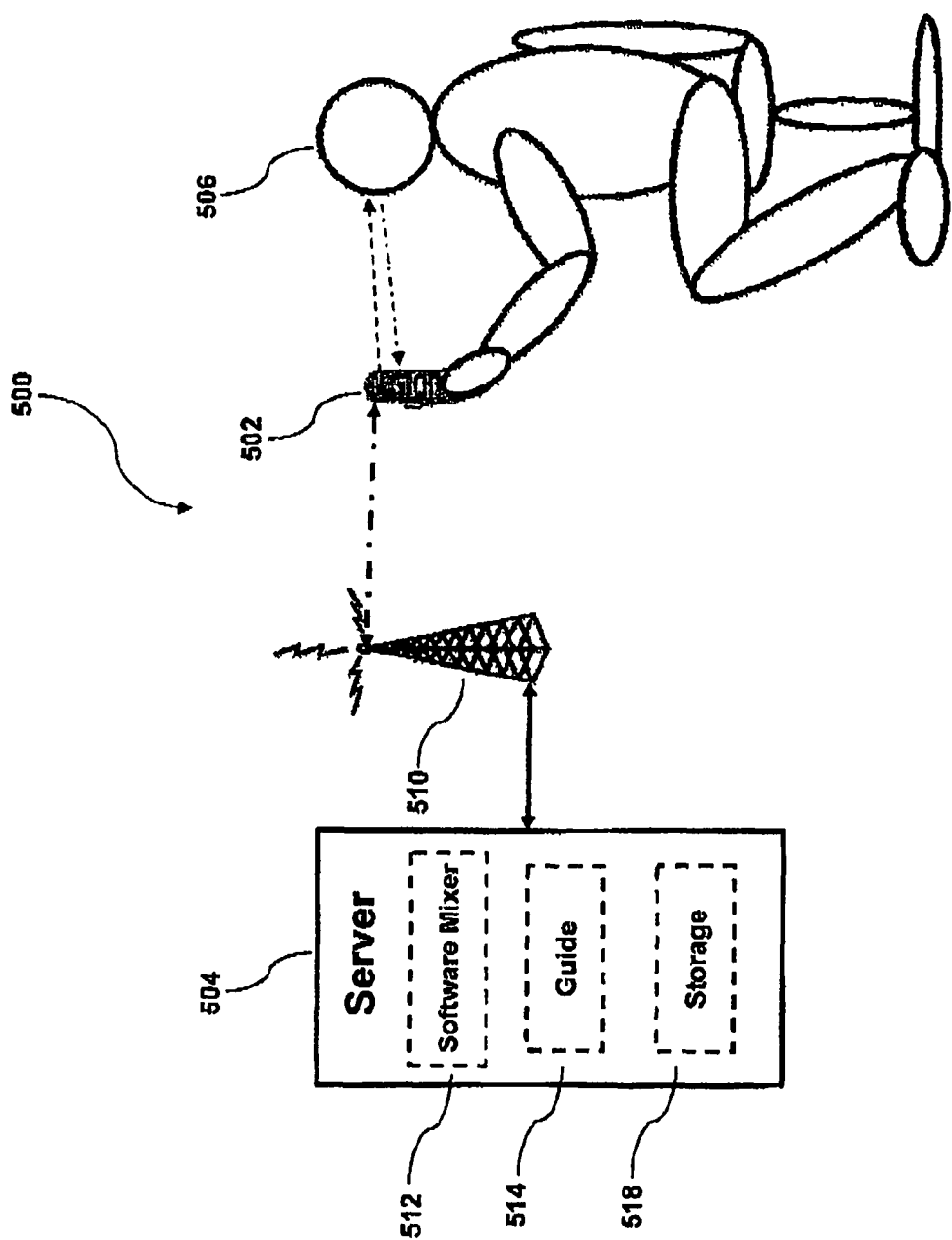
Figure 29:
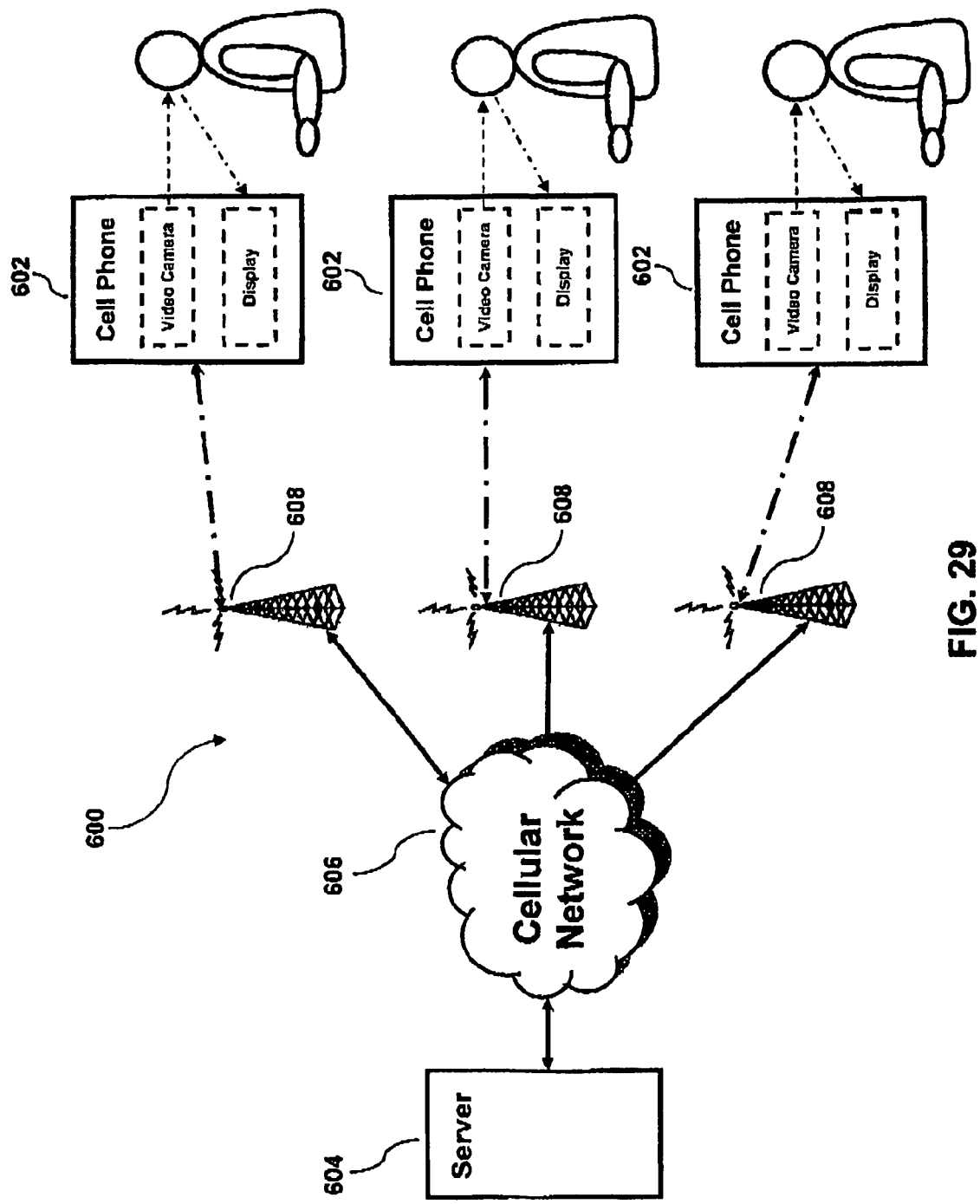
Figure 30:
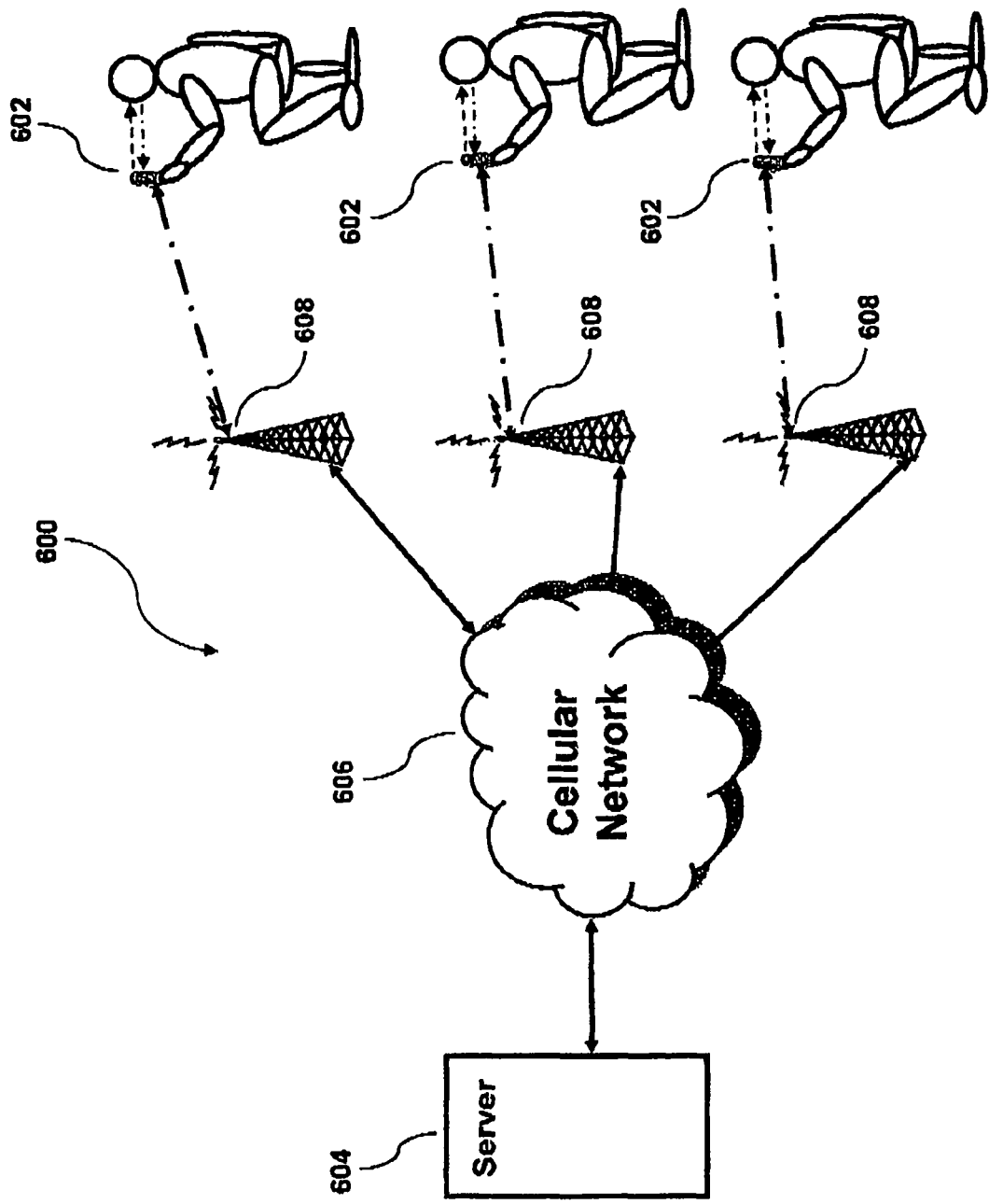
Figure 31:
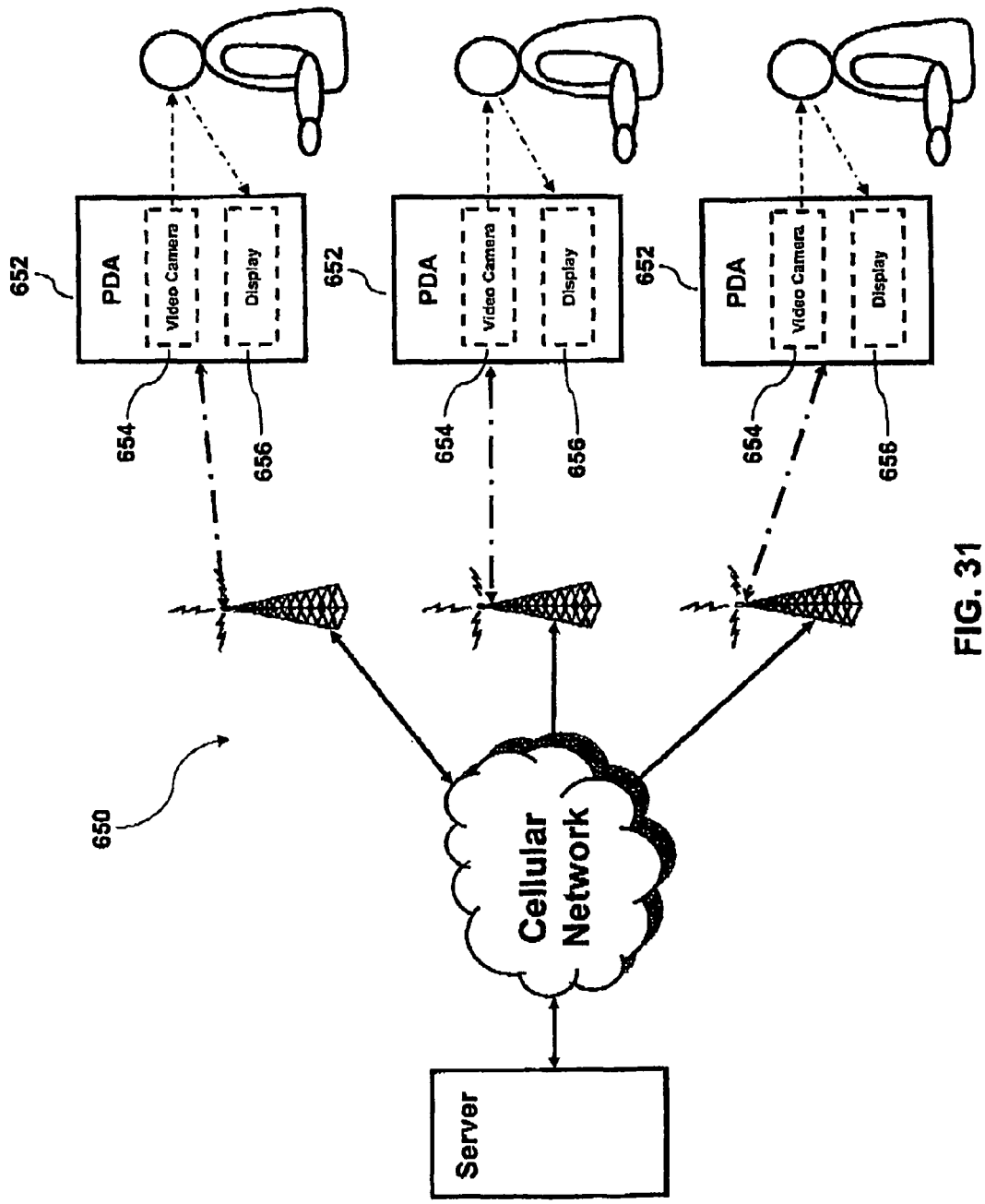
Figure 32:
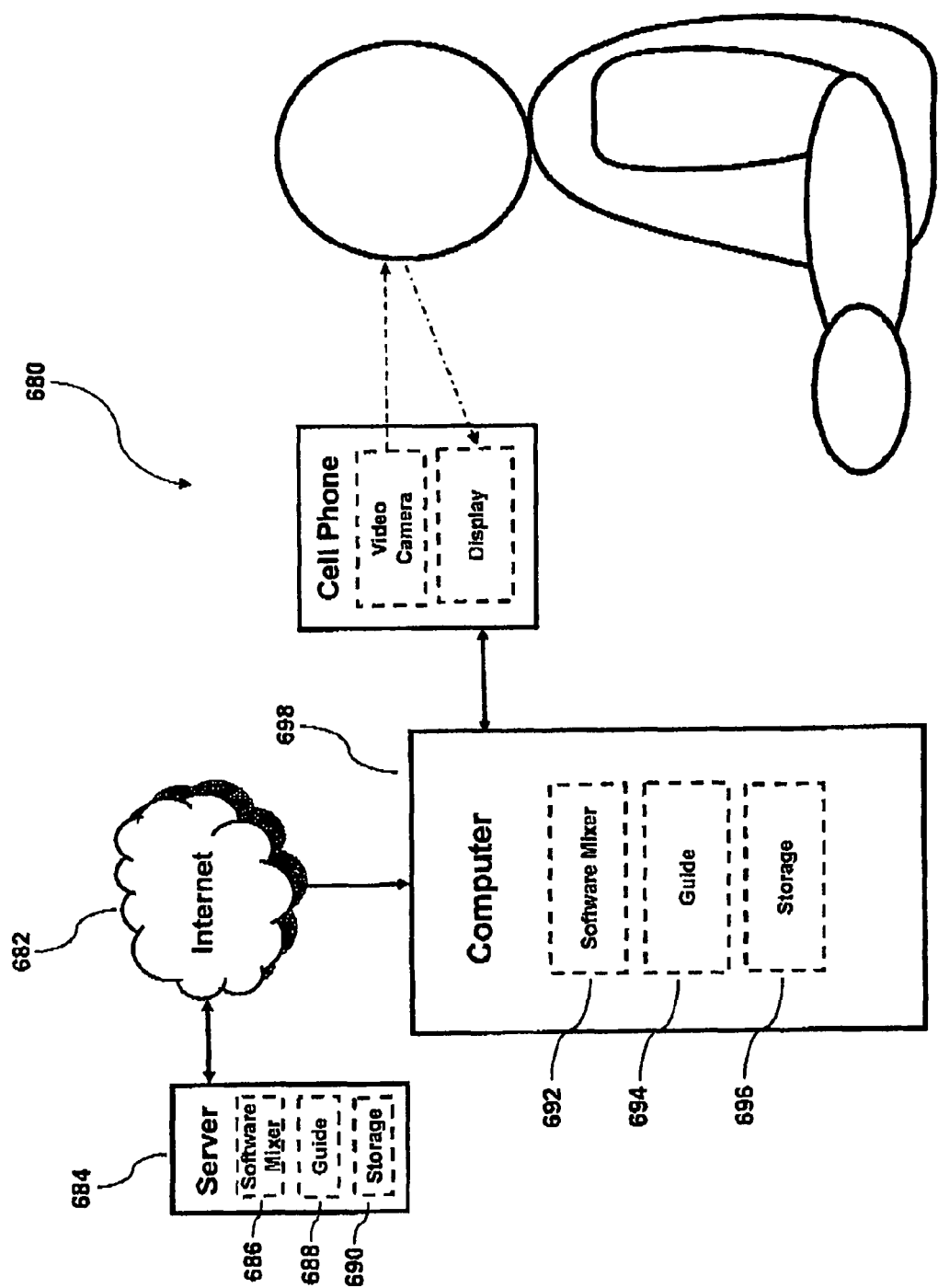
Figure 33:
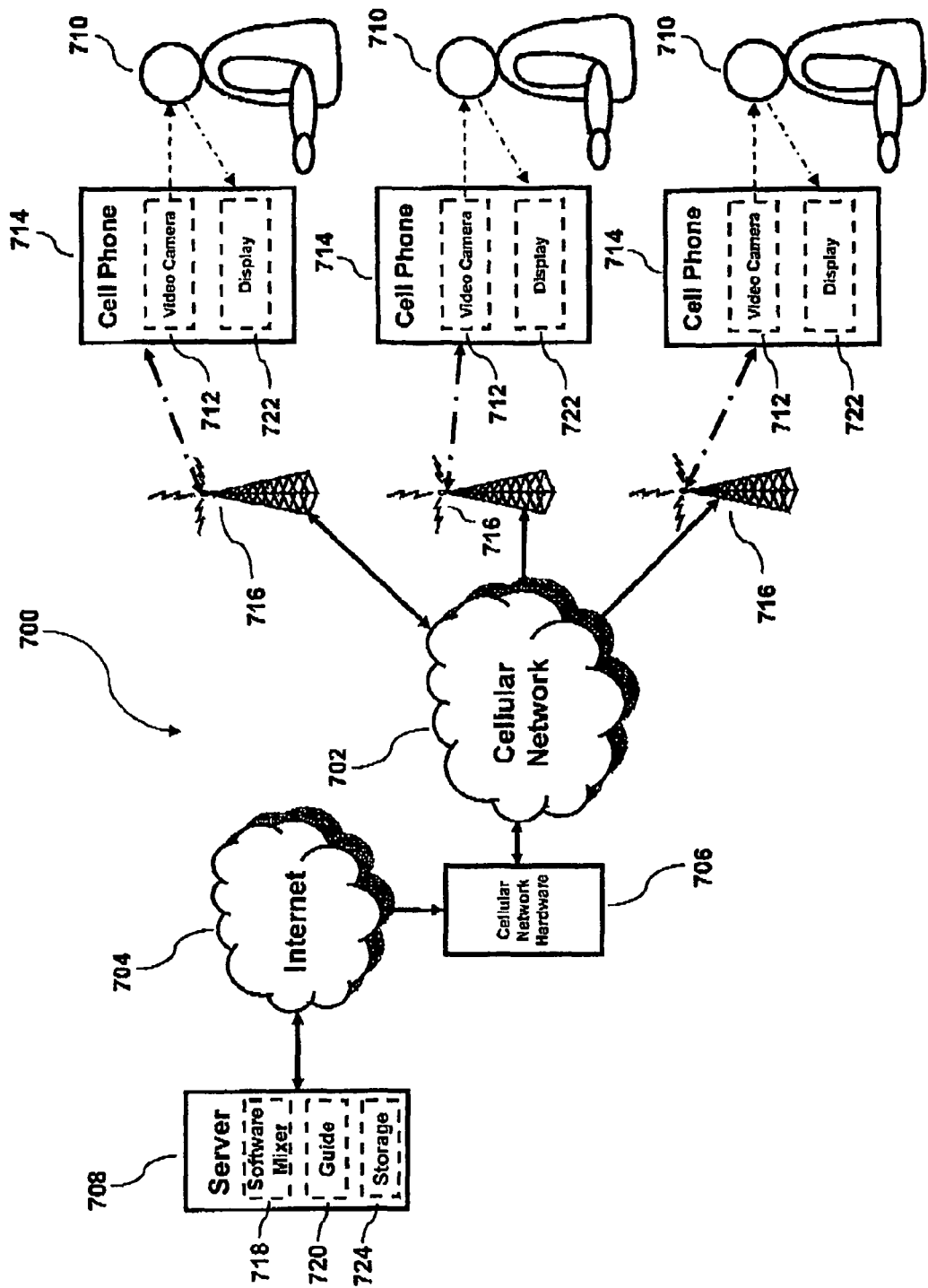
Figure 34:
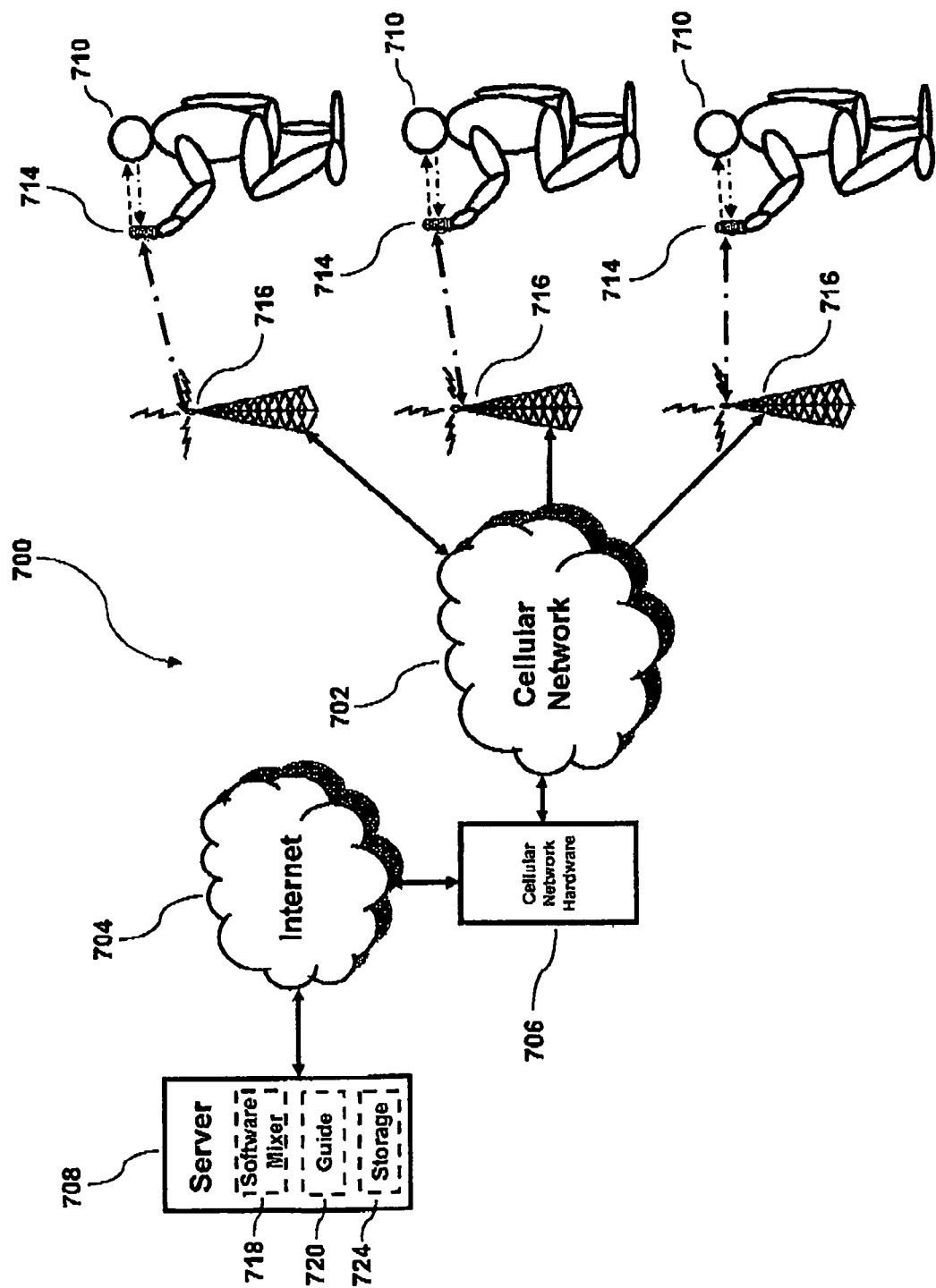
Figure 35:
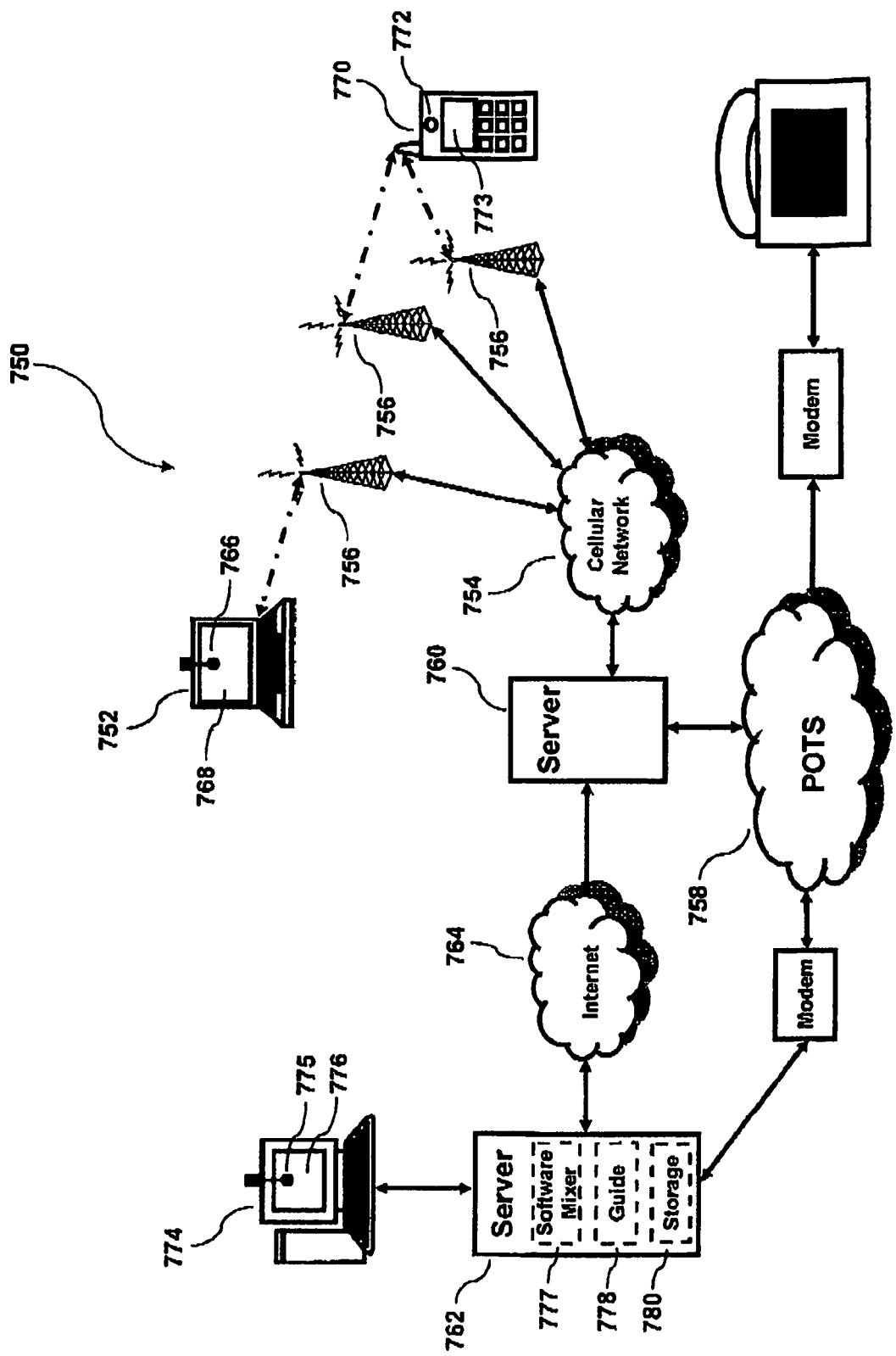
Figure 36:
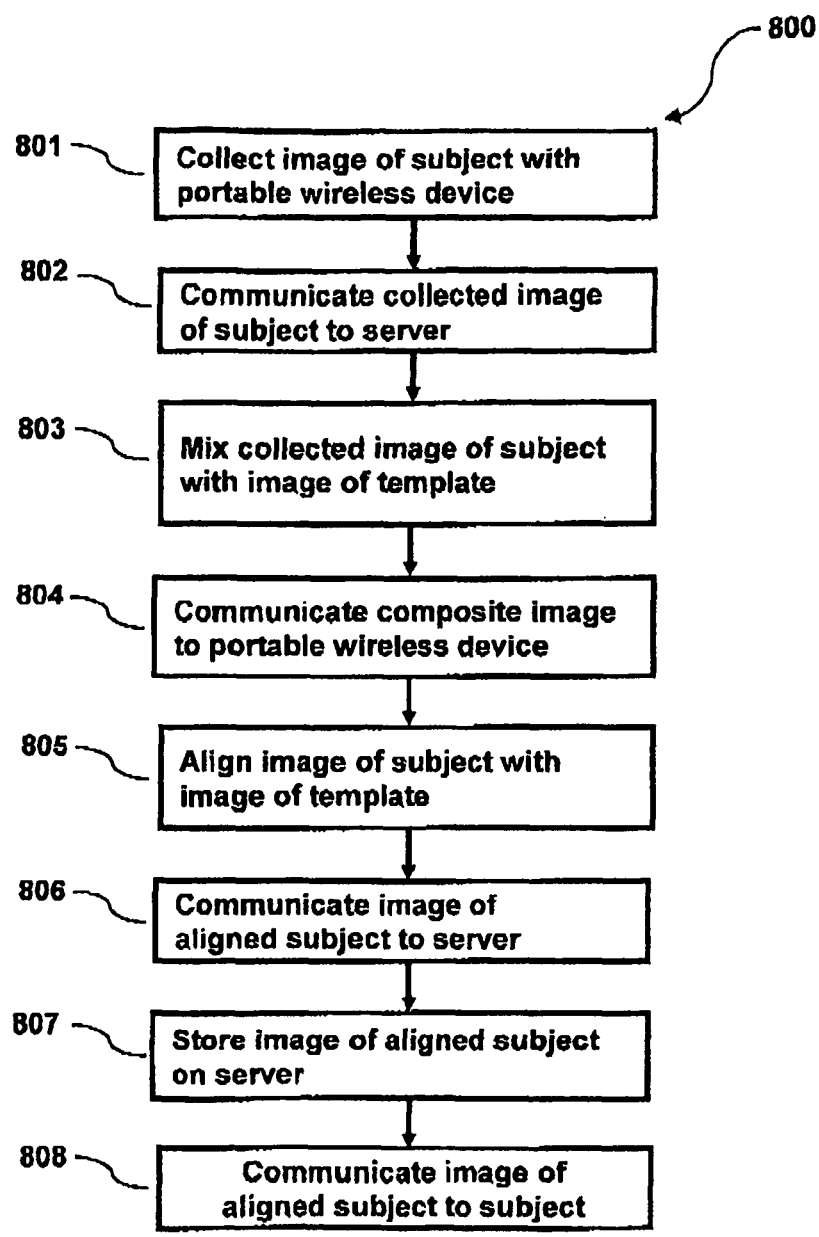
Figure 37:
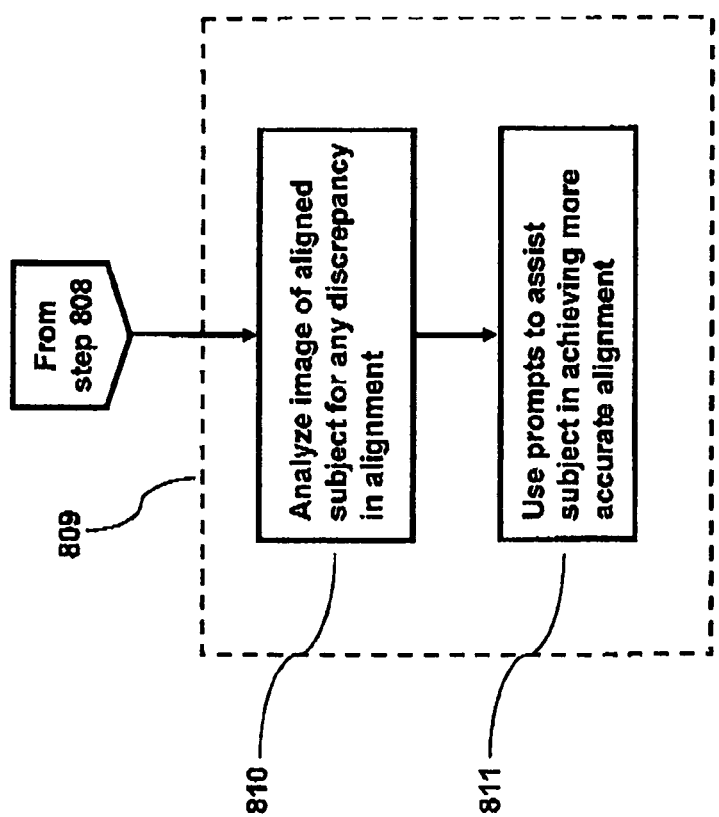
Figure 38:
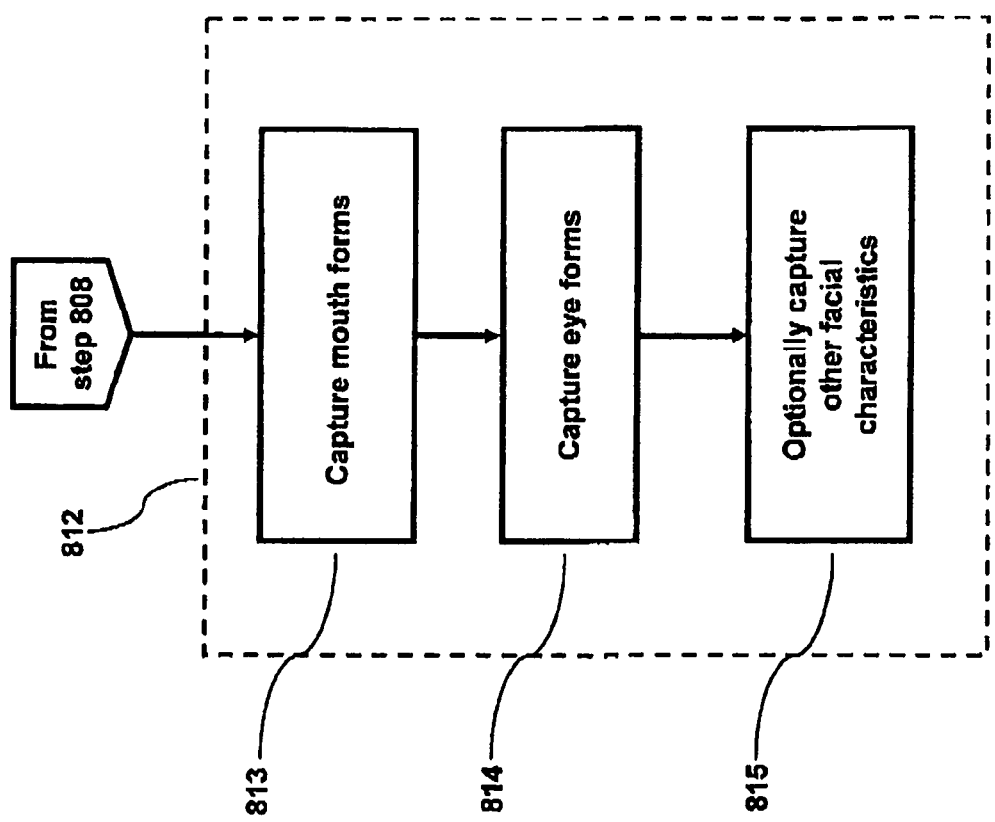
Figure 39:
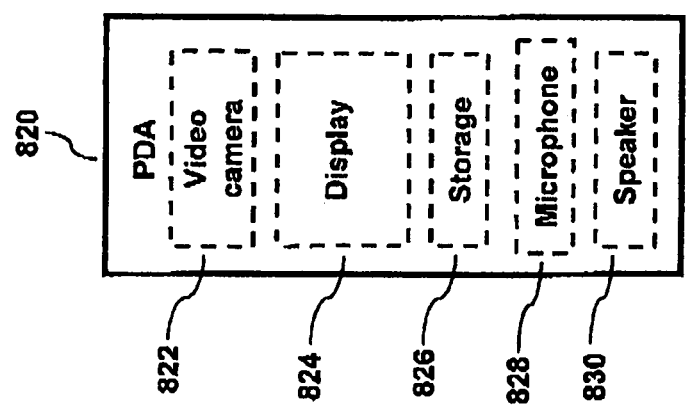
Figure 40:
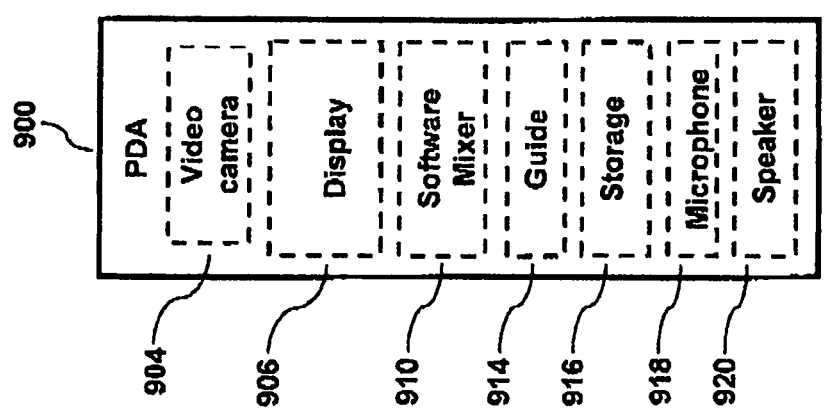
Figure 41:
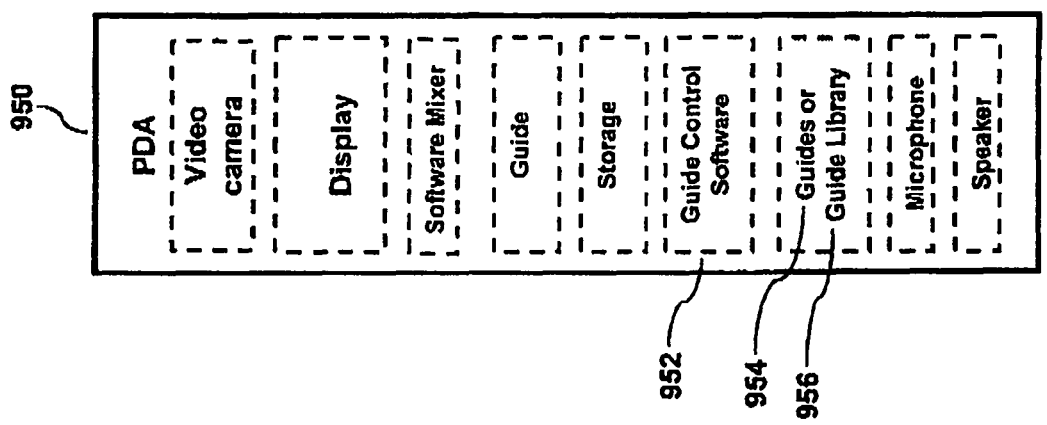

FIG. 8 shows a typical one of the selected images of the photo realistic talking head library of FIG. 2 at the particular angular position of FIG. 7, and typical ones of the different eye characteristics obtained by the subject having eyes closed and eyes wide open at the particular angular position of FIG. 7, and typical ones of the different mouth characteristics at the particular angular position of FIG. 7, obtained by the subject mouthing selected sounds;

FIG. 9 shows typical eye region and typical mouth region of the subject for obtaining the ones of the different eye characteristics and the typical ones of the different mouth characteristics of FIG. 8;

FIG. 10 shows a coordinate system having tilt, swivel, and nod vectors;

FIG. 11 shows an optional naming convention, that may be used for optional labels;

FIG. 12 is a diagrammatic representation of a guide library;

FIG. 13A is a view of a wire mesh model of the guide;

FIG. 13B is a view of the wire mesh model of the guide of FIG. 13A having phong shading;

FIG. 13C is a view of the guide of FIG. 13B having phong shading, photo mapped with a picture of a desired talking head or preferred newscaster;

FIG. 14A is a view of another guide showing typical facial features;

FIG. 14B is a view of another guide showing other typical facial features;

FIG. 14C is a view of another guide showing other typical facial features;

FIG. 14D is a view of another guide showing other typical facial features;

FIG. 14E is another view of the guide of FIG. 3 showing other typical facial features;

FIG. 14F is a view of another guide showing other typical facial features;

FIG. 15 is diagrammatic representation of a library of guide libraries associated therewith the guides of FIGS. 14A-F;

FIG. 16 is a schematic representation of a method of constructing a photo realistic talking head of the present invention;

FIG. 17 is a schematic representation of additional optional steps of the method of constructing the photo realistic talking head of FIG. 14;

FIG. 18 is a side elevation view of the do-it-yourself photo realistic talking head creation system of FIG. 1;

FIG. 19 is a front view of a video camera and monitor of the do-it-yourself photo realistic talking head creation system of FIG. 1, having an image thereon; and FIG. 20 is a block diagram of an alternate embodiment of a do-it-yourself photo realistic talking head creation system, constructed in accordance with the present invention;

FIG. 21 is a block diagram of an alternate embodiment of a do-it-yourself photo realistic talking head creation system, constructed in accordance with the present invention;

FIG. 22 is a side elevation view of the do-it-yourself photo realistic talking head creation system of FIG. 21;

FIG. 23 is a front view of a video camera and monitor of the do-it-yourself photo realistic talking head creation system of FIG. 21, having an image thereon; and FIG. 24 is a block diagram of an alternate embodiment of a do-it-yourself photo realistic talking head creation system, constructed in accordance with the present invention;

FIG. 25 is a block diagram of an alternate embodiment of a do-it-yourself photo realistic talking head creation system, constructed in accordance with the present invention;

FIG. 26 is a partial block diagram and diagrammatic representation of the alternate embodiment of the do-it-yourself photo realistic talking head creation system of FIG. 25;

FIG. 27 is a block diagram of an alternate embodiment of a do-it-yourself photo realistic talking head creation system, constructed in accordance with the present invention;

FIG. 28 is a partial block diagram and diagrammatic representation of the alternate embodiment of the do-it-yourself photo realistic talking head creation system of FIG. 27;

FIG. 29 is a block diagram of an alternate embodiment of a do-it-yourself photo realistic talking head creation system, constructed in accordance with the present invention;

FIG. 30 is a partial block diagram and diagrammatic representation of the alternate embodiment of the do-it-yourself photo realistic talking head creation system of FIG. 29;

FIG. 31 is a block diagram of an alternate embodiment of a do-it-yourself photo realistic talking head creation system, constructed in accordance with the present invention;

FIG. 32 is a block diagram of an alternate embodiment of a do-it-yourself photo realistic talking head creation system, constructed in accordance with the present invention;

FIG. 33 is a block diagram of an alternate embodiment of a do-it-yourself photo realistic talking head creation system, constructed in accordance with the present invention;

FIG. 34 is a partial block diagram and diagrammatic representation of the alternate embodiment of the do-it-yourself photo realistic talking head creation system of FIG. 33;

FIG. 35 is a block diagram of an alternate embodiment of a do-it-yourself photo realistic talking head creation system, constructed in accordance with the present invention;

FIG. 36 is a schematic representation of an alternate method of constructing a photo realistic talking head of the present invention;

FIG. 37 is a schematic representation of additional optional steps of the method of constructing the photo realistic talking head of FIG. 36;

FIG. 38 is a schematic representation of additional optional steps of the method of constructing the photo realistic talking head of FIG. 36;

FIG. 39 is a block diagram of a video capture device;

FIG. 40 is a block diagram of an alternate embodiment of a do-it-yourself photo realistic talking head creation system, constructed in accordance with the present invention; and FIG. 41 is a block diagram of an alternate embodiment of a do-it-yourself photo realistic talking head creation system, constructed in accordance with the present invention.

DESCRIPTION

The preferred embodiments of the present invention will be described with reference to FIGS. 1-41 of the drawings. Identical elements in the various figures are identified with the same reference numbers.

FIG. 1 shows an embodiment of the present invention, a do-it-yourself photo realistic talking head creation system 10, which is used to construct a photo realistic talking head library 12, shown in FIG. 2. The do-it-yourself photo realistic talking head creation system 10 has personal computer 13 having software mixer 14, guide 20, shown in FIG. 3, input 22 for receiving image signal output 24 of subject 26, shown in FIG. 4, from video camera 28, and mixed signal output 30, which has composite output image 38 of the guide 20 and the subject 26. The personal computer 13 translates the received image signal output 24 of the subject 26 to computer readable format, and communicates the computer readable image signal of the subject 26 thereto the software mixer 14. The software mixer 14 creates a composite image of the subject 26 and the guide 20. The do-it-yourself photo realistic talking head creation system 10 has monitor 39, for displaying the composite output image 38, shown in FIG. 5, therefrom the personal computer 13, which is a composite image of the subject 26 aligned with the guide 20. The personal computer 13 has storage 40 therein for storing ones of selected images 42, shown in FIG. 2, viewed therewith the video camera 28, for construction thereof the photo realistic talking head library 12, shown in FIG. 2. The storage 40 may, however, be alternatively external thereto and/or supplemented with storage internal and/or external thereto the personal computer 13. The monitor 39 has input 43 for receiving the mixed signal output 30 therefrom the personal computer 13.

Figure 5:
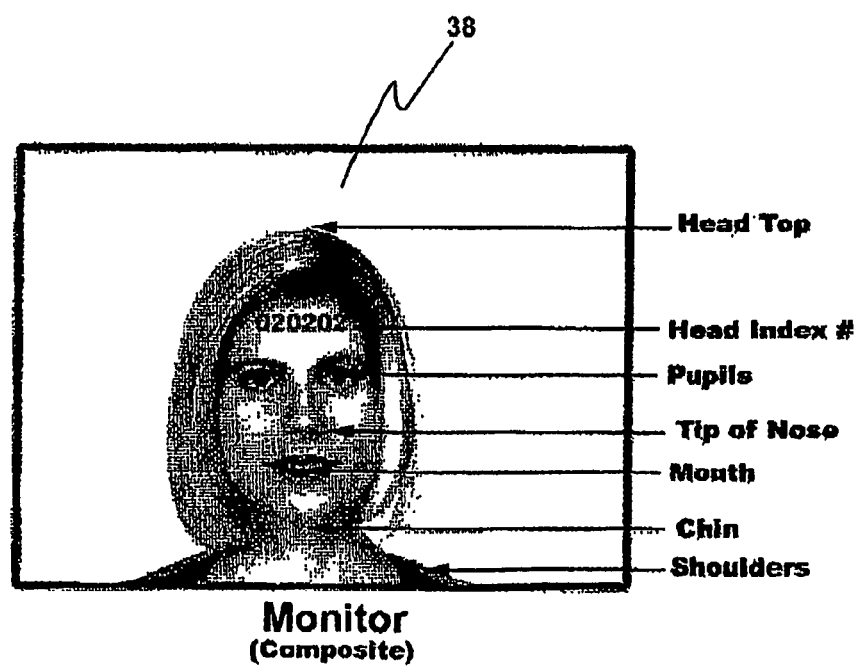
FIG. 5 is a composite view of the subject of FIG. 4 aligned with the guide of FIG. 3.
Figure 6:
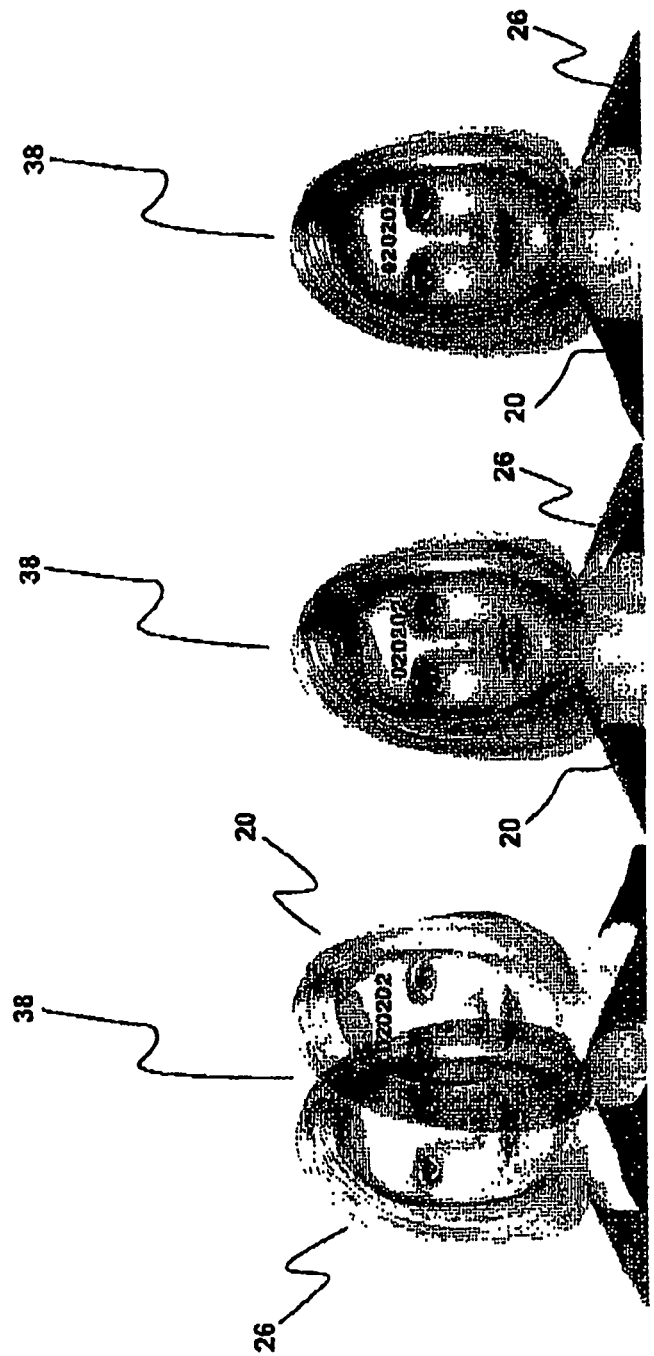
FIG. 6A is a composite view of the subject of FIG. 4 horizontally displaced from the guide of FIG. 3.
FIG. 6B is a composite view of the subject of FIG. 4 vertically displaced from the guide of FIG. 3.
FIG. 6C is a composite view of the subject of FIG. 4 and the guide of FIG. 3 in close proximity to being aligned.

The guide 20 is used as a template for aligning the subject 26 therewith in the composite output image 38. Upon alignment of the subject 26 with the guide 20, the image 42 is stored therein the storage 40. FIGS. 6A-6C show the composite output image 38 at different stages of alignment of the subject 26 with the guide 20. FIG. 6A shows the subject 26 horizontally displaced from the guide 20; FIG. 6B shows the subject 26 vertically displaced from the guide 20; and FIG. 6C shows the subject 26 and the guide 20 in closer alignment. FIG. 5 shows the subject 26 aligned with the guide 20.

The photo realistic talking head library 12 is constructed of ones of the selected images 42 at different angular positions 44 and different eye characteristics 46 and different mouth characteristics 48 at each of the angular positions 44, shown in FIG. 2, in accordance with coordinate system and optional naming convention of FIGS. 10 and 11, respectively. FIG. 7 shows an enlarged one of the selected images 42 at a particular angular position of FIG. 2, and ones of the different eye characteristics 46 and ones of the different mouth characteristics 48 at the particular angular position of the selected image 42. FIG. 8 shows a typical one of the selected images 42 at the particular angular position of FIG. 7, and typical ones of the different eye characteristics 46 obtained by the subject 26 having eyes closed and eyes wide open at the particular angular position of FIG. 7, and typical ones of the different mouth characteristics 48 at the particular angular position of FIG. 7, obtained by the subject 26 mouthing selected sounds. Once the subject 26 aligns his or herself with the guide 20 at the particular angular positions, the subject 26 performs closes and opens the eyes, and speaks a set of prose, which includes selected phonemes. The subject 26 may also, optionally, perform additional facial gestures such as smiling and/or frowning. FIG. 9 shows typical eye region 50 and typical mouth region 52 of the subject 26 for obtaining the ones of the different eye characteristics 46 obtained by the subject 26 having eyes closed and eyes wide open at the particular angular position of FIG. 7, and typical ones of the different mouth characteristics 48 at the particular angular position of FIG. 7, respectively.

FIG. 10 shows coordinate system 54 having tilt 56, swivel 58, and nod 60 vectors for the different angular positions 44 of the subject 26, the guide 20, the selected images 42, and the different eye characteristics 46 and the different mouth characteristics 48 associated therewith the selected images 42 of the photo realistic talking head library 12. The tilt 56, the swivel 58, and the nod 60 vectors, each designate direction and angular position therefrom neutral 62, typical angles and directions of which are shown in FIG. 10, although other suitable angles and directions may be used. The swivel 58 vector uses azimuthal angular position (side to side) as the angular component thereof, and the nod 60 vector uses elevational angular position (up or down) as the angular component thereof. The tilt 56 vector is upwardly left or right directed angularly either side of the nod 60 vector.

FIG. 11 shows optional naming convention 64 associated therewith the tilt 56, the swivel 58, and the nod 60 vectors for the subject 26, the guide 20, the selected images 42, and the different eye characteristics 46 and the different mouth characteristics 48 associated therewith the selected images 42 of the photo realistic talking head library 12. Other suitable optional naming conventions may be used or actual vector directions and angles. The optional naming convention 64 uses a consecutive numbering scheme having the tilt 56 vectors monotonically increasing upward from 01 for each of the designated directions and angles from a minus direction to a plus direction; thus, for the typical angles of $-2.5°$, $0°$, and $+2.5°$ for the tilt 56, the optional naming convention 64 uses 01, 02, and 03 to designate the typical angles of $-2.5°$, $0°$, and $+2.5°$, respectively. The optional naming convention 64 uses a consecutive numbering scheme having the swivel 58 and the nod 60 vectors monotonically increasing upward from 00 for each of the designated directions and angles from a minus direction to a plus direction; thus, for the typical angles of $-10°$, $-5°$, $0°$, $+5°$, and $+10°$ for the swivel 58 and the nod 60, the optional naming convention 64 uses 00, 01, 02, and 03 to designate the typical angles of $-10°$, $-5°$, $0°$, $+5°$, and $+10°$, respectively. Suitable angles other than the typical angles of $-2.5°$, $0°$, and $+2.5°$ for the tilt 56, and/or suitable angles other than the typical angles of $-10°$, $-5°$, $0°$, $+5°$, and $+10°$ for the swivel 58 and the nod 60 may be used; however, the monotonically increasing consecutive numbering scheme may still be used, starting at 01 for the tilt 56, and 00 for the swivel 58 and the nod 60 for other directions and angles from negative through zero degrees to positive angles. Name 66 uses head, mouth, and eyes as optional labels or designators, head for the selected image 42, the subject 26, or the guide 20, eye for the eye characteristic 46, and mouth for the mouth characteristic 48. Head020301, thus, represents, for example, the selected image 42 having the tilt 56, the swivel 58, and the nod 60 as $0°$, $+5°$, $-5°$, respectively, for the typical angles shown in FIG. 10.

FIG. 12 shows a guide library 68 having ones of the guides 20 at different angular positions 70, shown in accordance with the coordinate system 54 of FIG. 10 and the optional naming convention 64 of FIG. 11. Each of the guides 20 of FIG. 11 is used to construct corresponding ones of the selected images 42 at corresponding ones of the angular positions 44 and the different eye characteristics 46 and the different mouth characteristics 48 at the corresponding ones of the angular positions 44 corresponding to the angular positions 70 of each of the guides 20 thereof the guide library 68. The subject 26, thus, aligns himself or herself with the guide 20 in the composite output image 38 each at a different one of the angular positions 70 to construct each of the selected images 42, opens and closes his or her eyes to construct each of the ones of the different eye characteristics 46 at the particular angular position of each of the aligned selected images 42, and repetitively mouths each of the ones of the different mouth characteristics 48 at the particular angular position of each of the aligned selected images 42 corresponding to each of the angular positions 70, and, thus, constructs the photo realistic talking head library 12 of FIG. 2.

FIGS. 13A-C show a diagrammatic representation of typical stages in the development one of the guides 20. It should be noted, however, that other suitable techniques may be used to develop ones of the guides 20. Each of the guides 20 is typically a medium resolution modeled head, that resembles a desired talking head, a preferred newscaster, or a generic talking head or newscaster in a different angular position, a typical one of the guides 20 being shown in FIG. 13C, each of the guides 20 being used as a template for aligning the subject 26 thereto at a selected one of the different angular positions. Each of the guides 20 may be constructed, using a suitable technique, such as laser scanning, artistic modeling, or other suitable technique, which typically results in the guides 20 each being a 3D modeled head having approximately 5000 polygons. Modeling software, such as 3D modeling software or other suitable software, may be used to create the guides 20. Typical commercial 3D modeling software packages that are available to create the guides 20 are: 3D Studio Max, Lightwave, Maya, and SoftImage, although other suitable modeling software may be used. First, an underlying wire mesh model 72 is created, as shown in FIG. 13A. Phong shading is typically added to the wire mesh model 72 to create a shaded model 74, as shown in FIG. 13B, which has a solid appearance. The shaded model 74 having the solid appearance is then typically photo mapped with a picture of the desired talking head, the preferred newscaster, or the generic talking head or newscaster to create the guide 20 of FIG. 13C, which resembles the desired talking head, preferred newscaster, or the generic talking head or newscaster. The guide 20 is rendered in specific head poses, with an array of right and left, up and down, and side-to-side rotations that correspond to desired talking head library poses of the selected images 42 of the photo realistic talking head library 12, which results in the guide library 68 having ones of the guides 20 at different angular positions, each of which is used as an alignment template at each of the different angular positions. Each of the guides 20 are typically stored as bitmapped images, typically having 512×384 pixels or less, typically having a transparent background color, and typically indexed with visible indicia typically in accordance with the coordinate system 54 of FIG. 10 and the optional naming convention 64 of FIG. 11, although other suitable indicia and storage may be used.

The subject 26 sees a superposition of his or her image and the image of the guide 20 in the monitor 39, and aligns his or her image with the image of the guide 20, as shown at different stages of alignment in FIGS. 5, 6A, 6B, and 6C.

Now again, the guide 20 is rendered in specific head poses, with an array of right and left, up and down, and side-to-side rotations that correspond to desired talking head library poses of the selected images 42 of the photo realistic talking head library 12, which results in the guide library 68 having ones of the guides 20 at different angular positions, each of which is used as an alignment template at each of the different angular positions.

The photo realistic talking head library 12 is capable of being constructed quickly, easily, and efficiently by an individual having ordinary computer skills, and minimizing production time, using the guides 20, which may be used as the templates for mixing and alignment with images of an actual human being in different angular positions.

A library 75 of different ones of the guide libraries 68 are provided, each of the guide libraries 68 having different ones of the guides 20 therein, and each of the guides 20 for a different angular position. Each of the guide libraries 68 has facial features different one from the other, thus, allowing a user to select the guide library 68 therefrom the library 75 having facial features and characteristics close to those of the user.

FIGS. 14A-F show typical ones of the guides 20 having different facial features. Proper alignment of the subject 26 with the guide 20 is achieved when various key facial features and shoulder features are used to facilitate alignment. The subject 26 may choose from the library 75 of different ones of the guide libraries 68, shown in FIG. 15, and select the best match with respect to his or her facial features. Distance 76 between pupils 77, length 78 of nose 79, width 80 of mouth 81, style 82 of hair 83, distance 84 between top of head 85 and chin 86, shape 87 of shoulders 88, and optional eyewear 89, are typical alignment features that provide targets for the subject 26 to aid in aligning himself or herself with the guide 20. The closer the guide 20 is in size, appearance, proportion, facial features, and shoulder features to the subject 26, the better the alignment will be, and, thus, the resulting photo realistic talking head library 12.

The video camera 28 is preferably a high definition digital video camera, which can produce digital video frame stills comparable in quality and resolution to a digital still camera, although other suitable cameras and/or electronic image collection apparatus may be used.

The storage 40 may alternatively be digital videotape or real time digital video feed played into a lossless digital video editing system, although other suitable storage may be used.

The guide 20 and the software mixer 14, which is a computer program, may be loaded into the personal computer 13 and/or stored therein.

FIG. 16 shows steps of a method of constructing a photo realistic talking head 90, which comprises at least the following steps: collecting the image of a subject with a video camera or other device 91; mixing the collected image of the subject with the image of a guide or template, thus, creating a composite image thereof the subject and the guide or template 92; and communicating the composite image thereto a monitor or television for display to the subject 93, the monitor or television adapted to facilitate the subject aligning the image of the subject with the image of the guide or template; aligning the image of the subject with the image of the guide or template 94; storing the image of the aligned subject 95. The step of mixing the collected image of the subject with the image of the guide or template, thus, creating the composite image thereof the subject and the guide or template 92 is preferably performed therein a computer having a mixer program, the mixer program adapted to create the composite image therefrom the collected image and the image of the template, although other suitable techniques may be used. The method of constructing a photo realistic talking head 90 may have additional optional steps, as shown in FIG. 17, comprising: capturing facial characteristics 96; including capturing mouth forms 97; capturing eye forms 98; optionally capturing other facial characteristics 99.

FIG. 18 shows a side elevation view of the do-it-yourself photo realistic talking head creation system 10, and FIG. 19 shows a front view of the video camera and the monitor of the do-it-yourself photo realistic talking head creation system 10 having an image thereon.

FIG. 20 shows a do-it-yourself photo realistic talking head creation system 100, which is substantially the same as the do-it-yourself photo realistic talking head creation system 10, except that the do-it-yourself photo realistic talking head creation system 100 has guide control software 112, which may be used to control guides 120 individually and/or as guide library 122. Software mixer 130 creates a composite image of subject 144 and the guide 120. The guide control software 112 provides optional control of the guides 120, easy access to and selection thereof the guides 120 and/or the guide library 122, and control of the superposition of the 5 image of the subject 144 and the image of the guide 120 one with the other. The guides 120 and/or the guide library 122 may be loaded into personal computer 145 and/or stored therein. The guide control software 112 and the software mixer 130, which are computer programs, may be loaded into personal computer 145 and/or stored therein. The guides 120 and/or the guide library 122 may be optionally viewed on monitor 146 for quality and optional image adjustment, adjustment of the percent or proportion of superposition of the image of the subject 144 and the image of the guide 120 one with the other, and/or control of position and size of the guides 120 and/or the image of the subject 144.

The personal computer 145 has storage 152, or video camera 154 may alternatively and/or supplementally have storage therein for storing images of the subject 144. The storage 152 may alternatively be external thereto the personal computer 145 and/or the video camera 154 and/or supplemented with additional storage external thereto. The storage 152 may alternatively be digital videotape or real time digital video feed played into a lossless digital video editing system, although other suitable storage may be used.

The video camera 154 is preferably a high definition digital video camera, which can produce digital video frame stills comparable in quality and resolution to a digital still camera, although other suitable cameras and/or electronic image collection apparatus may be used.

A user may optionally play the session, and select specific frames, i.e., freeze frames to be source images of a final photo realistic talking head library. The user may frequently synchronize selected frames with corresponding ones of the guides 120 to assess the accuracy of the captured frame, thus, creating the final photo realistic talking head library of actual photographs, which substantially match position and motion patterns of the guides 120.

FIG. 21 shows a do-it-yourself photo realistic talking head creation system 200, which is substantially the same as the do-it-yourself photo realistic talking head creation system 10, except that the do-it-yourself photo realistic talking head creation system 200 has adjustable cantilevered support arm 202, as shown in FIGS. 22 and 23, affixed thereto monitor 204, and adapted to support video camera 206 in front of the monitor 204 between the monitor 204 and subject 208. The subject 208 may adjust the position of the video camera 206 for decreased parallax, thus, facilitating better alignment and improvement in the resulting photo realistic talking head library.

FIG. 24 shows a do-it-yourself photo realistic talking head creation system 300, which is substantially the same as the do-it-yourself photo realistic talking head creation system 100, except that the do-it-yourself photo realistic talking head creation system 300 has guide control software 312, which may be used to control guides 320 individually and/or as guide library 322, as in the do-it-yourself photo realistic talking head creation system 100 of FIG. 20.

FIGS. 25-41 show alternate embodiments of do-it-yourself photo realistic talking head creation systems that use portable devices and portable wireless devices. These portable devices and portable wireless devices include digital communications devices, portable digital assistants, cell phones, notebook computers, video phones, and other suitable devices.

These portable devices and portable wireless devices include digital communications devices often have video cameras and video displays.

A human subject may, for example, capture an image of himself or herself with a video camera of such a device and view live video of the captured image on a video display of the device.

Guide images of the human subject are superimposed on the displays of the portable devices and/or portable wireless devices of the do-it-yourself photo realistic talking head creation systems of FIGS. 25-41.

Each of the displays of such devices displays a composite image of the collected image of the human subject and a selected alignment template, as aforedescribed, the display and the video camera adapted to allow the video camera to collect the image of the human subject and the human subject to view the composite image and the human subject to align the image of the head of the human subject with the alignment template head at substantially the same angular position as the specified alignment template head angular position.

Such portable devices and/or portable wireless devices may, for example, be connected to a personal computer via a wired or wireless connection, and/or to a remote server via a network of sufficient bandwidth to support real-time video streaming and/or transmission of suitable signals. Typical networks include cellular networks, distributed networks, such as the internet, global network, wide area network, metropolitan area network, or local area network, and other suitable networks.

More than one user may be connected to a remote server at any particular time. Captured video streams and/or still images may be communicated to the computer and/or the server for processing into a photo realistic talking head library, or optionally, processing may be carried out in the devices themselves.

Software applications and/or hardware may reside in such devices, computers and/or remote servers to analyze composite signals of the collected images of the human subjects and the alignment templates, and determine the accuracy of alignment to the guide images.

Voice prompts may be created by a synthetically generated voice, actual recorded human voice, or via a live human technical advisor, and communicated to the human subject in real-time to assist the user during the alignment process. Video prompts may alternatively and/or additionally be used. The human subject may then follow the information in the prompts to adjust his or her head position, and when properly aligned initiate the spoken phrase portion of the capture process. Voice and/or video prompts may be used to assist the human subject in other tasks as well, such as when to repeat a sequence, if proper alignment is possibly lost during the capture and/or alignment process, and/or when to start and/or stop the session.

The portable devices and/or wireless handheld devices may be cell phones, personal digital assistants (PDA's), web-enabled phones, portable phones, personal computers, laptop computers, tablet computers, video phones, televisions, handheld televisions, wireless digital cameras, wireless camcorders, e-mail devices, instant messaging devices, pc phones, video conferencing devices, mobile phones, handheld devices, wireless devices, wireless handheld devices, and other suitable devices, that have a video camera and a display or other suitable cameras and displays.

FIGS. 25 and 26 show a do-it-yourself photo realistic talking head creation system 400, which is substantially the same as the do-it-yourself photo realistic talking head creation system 10, except that the do-it-yourself photo realistic talking head creation system 400 has cell phone 402 having video camera 404 and display 406.

An image of subject 408 is collected by the video camera 404, substantially the same as previously described for the do-it-yourself photo realistic talking head creation system 10. Software mixer 410 of computer 412 creates a composite image of the collected image of the subject 404 and guide 414 that is displayed on the display 406, which may be aligned one with the other by the subject 408, and storage 416 may then be used to store ones of selected images, substantially the same as previously described for the do-it-yourself photo realistic talking head creation system 10.

FIGS. 27 and 28 show a do-it-yourself photo realistic talking head creation system 500, which is substantially the same as the do-it-yourself photo realistic talking head creation system 400, except that the do-it-yourself photo realistic talking head creation system 500 has cell phone 502 that communicates wirelessly with server 504, which may be a computer.

An image of subject 506 is collected by video camera 508 of the cell phone 502 substantially the same as previously described for the do-it-yourself photo realistic talking head creation system 400. The cell phone 502 communicates wirelessly with the server 504 via antenna 510.

Software mixer 512 of the server 504, which may be a computer, creates a composite image of the collected image of the subject 506 and guide 514 that is displayed on display 516 of the cell phone 502, which may be aligned one with the other by the subject 506, and storage 518 may then be used to store ones of selected images, substantially the same as previously described for the do-it-yourself photo realistic talking head creation system 400.

FIGS. 29 and 30 show a do-it-yourself photo realistic talking head creation system 600, which is substantially the same as the do-it-yourself photo realistic talking head creation system 500, except that the do-it-yourself photo realistic talking head creation system 600 has a plurality of cell phones 602 that communicate with server 604 via cellular network 606. Each of the cell phones 604 communicate wirelessly with the cellular network 606 via antennas 608.

FIG. 31 shows a do-it-yourself photo realistic talking head creation system 650, which is substantially the same as the do-it-yourself photo realistic talking head creation system 600, except that the do-it-yourself photo realistic talking head creation system 650 has a plurality of personal digital assistants (PDA's) 652, each of which have a video camera 654 and a display 656.

FIG. 32 shows a do-it-yourself photo realistic talking head creation system 680, which is substantially the same as the do-it-yourself photo realistic talking head creation system 400, except that the do-it-yourself photo realistic talking head creation system 680 is connected to internet 682 having server 684 connected thereto. The server 684 may have software mixer 686, guide 688, and storage 690 alternatively and/or additionally to software mixer 692, guide 694, and storage 696 of computer 698, which may be used alternatively and/or additionally to the software mixer 692, the guide 694, and the storage 696 of the computer 698.

FIGS. 33 and 34 show a do-it-yourself photo realistic talking head creation system 700, which is substantially the same as the do-it-yourself photo realistic talking head creation system 600, except that the do-it-yourself photo realistic talking head creation system 700 has cellular network 702 connected to internet 704 via cellular network hardware 706 and server 708 connected to the internet 704.

Images of subjects 710 are collected by video cameras 712 of cell phones 714 substantially the same as previously described for the do-it-yourself photo realistic talking head creation system 400. The cell phones 714 communicate wirelessly with the cellular network 702 via antennas 716 and with the server 708 via the internet 704, which is connected to the cellular network 702 via the cellular network hardware 706.

Software mixer 718 of the server 708, which may be a computer, creates composite images of the collected images of the subjects 710 and guide 720 that are displayed on displays 722 of the cell phones 714, which may be aligned one with the other by the subjects 710, and storage 724 may then be used to store ones of selected images from each of the cell phones 714.

FIG. 35 shows a do-it-yourself photo realistic talking head creation system 750, which is substantially the same as the do-it-yourself photo realistic talking head creation system 700, except that the do-it-yourself photo realistic talking head creation system 750 has laptop computer 752 wirelessly connected to cellular network 754 via antennas 756 and plain old telephone system (POTS) 758 also connected to servers 760 and 762, each of which are also connected to internet 764, the server 760 being used to connect the cellular network 754 and the plain old telephone system (POTS) 758 to the internet 764.

Signals to and from the laptop computer 752, which has video camera 766 and display 768, and signals to and from portable wireless device 770, which has video camera 772 and display 773, are communicated to the server 762 via the cellular s network 754 and the internet 764. Signals to and from desktop computer 774, which has video camera 775 and display 776 are also communicated to and from the server 762. Portable wireless devices 770 that may be used include cell phones, personal digital assistants (PDA's), and other suitable portable wireless devices.

Software mixer 777 of the server 762, which may be a computer, creates composite images of the collected images of subjects and guide 778 that are displayed on the displays 768, 773, and 776 of the laptop computer 752, the portable wireless device 770, and the desktop computer 774, respectively, which may be aligned one with the other by the subjects, and storage 780 may then be used to store ones of selected images from the laptop computer 752, the portable wireless device 770, and the desktop computer 774.

FIG. 36 shows steps of a method of constructing a photo realistic talking head 800, which are substantially the same as the steps of the method of constructing a photo realistic talking head 90, except that the method of constructing a photo realistic talking head 800 comprises the steps of communicating an image of an aligned subject to a server 806, storing the image of the aligned subject on the server 806, and communicating the image back to the subject 808.

In more detail, the method of constructing a photo realistic talking head 800 comprises the steps of: collecting an image of a subject with a portable wireless device, such as a cell phone video camera, personal digital assistant (PDA) video camera, or other suitable device 801, communicating the collected image of the subject to a server 802, mixing the collected image of the subject with an image of a template 803, communicating a composite image to the portable wireless device, and more particularly to a display of the portable wireless device 804, aligning an image of the subject with an image of the template 805, communicating an image of the aligned subject to the server 806, storing the image of the aligned subject on the server 806, and communicating the image of the aligned subject to the subject 808.

FIG. 37 shows additional optional steps 809 of the method of constructing a photo realistic talking head 800, comprising the steps of: analyzing the image of the aligned subject for any discrepancy in alignment 810, and using prompts, such as audio, voice prompts, and/or video prompts, to assist the subject in achieving more accurate alignment 811.

The method of constructing a photo realistic talking head 800 may have additional optional steps, comprising: capturing facial characteristics 812 after the step 808 and/or after the step 811, which are substantially the same as the additional optional steps shown in FIG. 17, and which are repeated here for clarity and understanding.

The method of constructing a photo realistic talking head 800 may have additional optional steps, shown in FIG. 38, comprising: capturing facial characteristics 812; including capturing mouth forms 813; capturing eye forms 814; optionally capturing other facial characteristics 815.

FIG. 39 is a block diagram of a video capture device 820, such as a personal digital assistant (PDA) or other suitable device, that has a video camera 822, display 824, storage 826, microphone 828, and speaker 830, and which may be used with various aforedescribed embodiments of the present invention.

FIG. 40 is a block diagram of an alternate embodiment of a do-it-yourself photo realistic talking head creation system, constructed in accordance with the present invention; and FIG. 40 shows a do-it-yourself photo realistic talking head creation system 900, which is substantially the same as the do-it-yourself photo realistic talking head creation system 10, except that the do-it-yourself photo realistic talking head creation system 900 comprises substantially all the equipment of the do-it-yourself photo realistic talking head creation system 10 packaged into a single portable device.

The do-it-yourself photo realistic talking head creation system 900 comprises a personal digital assistant (PDA) or other suitable device having a video camera 904, display 906, software mixer 910, guide 914, storage 916, optional microphone 918, and optional speaker 920.

An image of a subject is collected by the video camera 904, substantially the same as previously described for the do-it-yourself photo realistic talking head creation system 10. The software mixer 910 creates a composite image of the collected image of the subject and the guide 914 that is displayed on the display 906, which may be aligned one with the other by the subject, and storage 916 may then be used to store ones of selected images, substantially the same as previously described for the do-it-yourself photo realistic talking head creation system 10.

FIG. 41 shows a do-it-yourself photo realistic talking head creation system 950, which is substantially the same as the do-it-yourself photo realistic talking head creation system 300, except that the do-it-yourself photo realistic talking head creation system 950 comprises substantially all the equipment of the do-it-yourself photo realistic talking head creation system 300 packaged into a single portable device.

The do-it-yourself photo realistic talking head creation system 950, has substantially the same components as the do-it-yourself photo realistic talking head creation system 900, except that the do-it-yourself photo realistic talking head creation system 950 has guide control software 952, which may be used to control guides 954 individually and/or as guide library 956, as in the do-it-yourself photo realistic talking head creation system 300.

Although the present invention has been described in considerable detail with reference to certain preferred versions thereof, other versions are possible.

Therefore, the spirit and scope of the appended claims should not be limited to the description of the preferred versions contained herein.

What is claimed is:

1. An apparatus for constructing a photo realistic human talking head, comprising:
   a handheld device;
   a network;
   a server;
   said network and said handheld device communicating one with the other;
   said network and said server communicating one with the other;
   a library of alignment templates,
      said server comprising said library of alignment templates,
      each said alignment template being different one from the other and representational of an alignment template frame of a photo realistic human talking head having an alignment template head angular position, comprising a template head tilt, a template head nod, and a template head swivel component,
      each said alignment template frame different one form the other,
      each said alignment template head angular position different one from the other;
   a controller,
      said server comprising said controller,
      said controller selecting a said alignment template from said library of alignment templates corresponding to a specified alignment template head angular position and having an image output signal representational of said alignment template;
   a video camera,
      said handheld device comprising said video camera,
      said video camera collecting an image of a human subject having a head having a human subject head angular position, comprising a human subject head tilt, a human subject head nod, and a human subject head swivel component,
      said video camera having an output signal representational of said collected image of said human subject,
      said handheld device communicating said output signal of said video camera representational of said collected image of said human subject to said server via said network;
   said server,
      said server having an input receiving said output signal of said video camera representational of said collected image of said human subject, said server having a mixer,
      said server receiving said selected alignment template image output signal from said controller, and communicating said selected alignment template image output signal and said received collected image signal of said human subject to said mixer,
      said mixer receiving said selected alignment template image output signal and said communicated collected image signal of said human subject, and mixing one with the other into an output signal representational of a composite image of said collected image of said human subject and said selected alignment template, and
      communicating said composite image signal of said collected image of said human subject and said selected alignment template to said server,
      said server having an output signal representational of said composite image signal of said collected image of said human subject and said selected alignment template received from said mixer,
      said server communicating said output signal representational of said composite image signal of said collected image of said human subject and said selected alignment template to said handheld device via said network;
   a display,
      said handheld device comprising said display,
      said display having an input receiving said output signal representational of said composite image signal of said collected image of said human subject and said selected alignment template,
      said display and said video camera adapted to allow said video camera to collect said image of said human subject and said human subject to view said composite image and said human subject to align said image of said head of said human subject with said alignment template head at substantially the same angular position as said specified alignment template head angular position;
   storage means storing a library of collected images of said human subject with said head of said subject at different human subject head angular positions,
      said server comprising said storage means,
      said server communicating said received collected image signal of said human subject to said storage means,
      said storage means receiving and storing said received collected image signal of said human subject as a stored image of said human subject, when said human subject has said head of said human subject substantially aligned with said alignment template head,
      said stored image of said human subject having said human subject head angular position substantially the same as said specified alignment template head angular position,
      each said stored image in said library of collected images being different one from the other,
      each said stored image human subject head angular position different one from the other;

each said stored image human subject head angular position of said library of collected images corresponding to and substantially the same as and aligned with a selected said alignment template head angular position of said library of alignment templates;

each said stored image representing a different frame of a photo realistic human talking head.

2. The apparatus for constructing a photo realistic human talking head according to claim 1, wherein said server comprises a computer comprising said library of alignment templates.

3. The apparatus for constructing a photo realistic human talking head according to claim 1, wherein said server comprises a computer comprising said controller.

4. The apparatus for constructing a photo realistic human talking head according to claim 1, wherein said server comprises a computer comprising at least one program, said at least one program comprising said mixer.

5. The apparatus for constructing a photo realistic human talking head according to claim 1, wherein said server comprises a computer comprising said storage means.

6. The apparatus for constructing a photo realistic human talking head according to claim 1, wherein said collected image of said human subject further comprises additional collected images of at least one facial characteristic of said head of said human subject corresponding to said specified alignment template head angular position, said library of collected images further comprises different stored images of said at least one facial characteristic at each said different human subject head angular position;

each said stored facial characteristic image representing an additional frame of said photo realistic human talking head.

7. The apparatus for constructing a photo realistic human talking head according to claim 6, wherein said at least one facial characteristic comprises different mouth forms.

8. The apparatus for constructing a photo realistic human talking head according to claim 6, wherein said at least one facial characteristic comprises different eye forms.

9. The apparatus for constructing a photo realistic human talking head according to claim 7, wherein said at least one facial characteristic comprises different eye forms.

10. The apparatus for constructing a photo realistic human talking head according to claim 1, wherein said server comprises a computer comprising at least one program comprising said controller, which comprises a control program.

11. The apparatus for constructing a photo realistic human talking head according to claim 10, wherein said alignment template has at least one characteristic, said control program is adapted to control said at least one characteristic of said selected alignment template.

12. The apparatus for constructing a photo realistic human talking head according to claim 10, wherein said collected image of said human subject has at least one characteristic, said control program is adapted to control said at least one characteristic of said collected image of said human subject.

13. The apparatus for constructing a photo realistic human talking head according to claim 11, wherein said collected image of said human subject has at least one characteristic, said control program is adapted to control said at least one characteristic of said collected image of said human subject.

14. The apparatus for constructing a photo realistic human talking head according to claim 2, wherein said library of alignment templates comprises at least two libraries of alignment templates.

15. The apparatus for constructing a photo realistic human talking head according to claim 14, wherein each said library of alignment templates is representational of a human talking head having different facial features.

16. The apparatus for constructing a photo realistic human talking head according to claim 1, wherein said mixer comprises a software mixer.

17. The apparatus for constructing a photo realistic human talking head according to claim 1, wherein said network comprises a distributed network.

18. The apparatus for constructing a photo realistic human talking head according to claim 17, wherein said distributed network comprises the internet.

19. The apparatus for constructing a photo realistic human talking head according to claim 1, wherein said network is from the group consisting of a cellular network, a wireless network, a wireless digital network, a distributed network, the internet, a global network, a wide area network, a metropolitan area network, a local area network, and combination thereof.

20. The apparatus for constructing a photo realistic human talking head according to claim 1, wherein said handheld device is from the group consisting of a cell phone, a personal digital assistant, a PDA, a web-enabled phone, a portable phone, a personal computer, a laptop computer, a tablet computer, a video phone, a television, a handheld television, a wireless digital camera, a wireless camcorder, a wireless camera having a display, an e-mail device, an instant messaging device, a pc phone, a video conferencing device, a mobile phone, a handheld device, a wireless device, and a wireless handheld device.

21. The apparatus for constructing a photo realistic human talking head according to claim 1, wherein said server comprises a computer that is adapted to translate said received collected image signal to computer readable format.

22. The apparatus for constructing a photo realistic human talking head according to claim 1, wherein said apparatus for constructing a photo realistic human talking head is a do-it-yourself apparatus for constructing a photo realistic human talking head.

23. An apparatus for constructing a photo realistic human talking head, comprising:
a wireless handheld device;
a wireless network;
a server;
said wireless network and said wireless handheld device wirelessly communicating one with the other;
said wireless network and said server communicating one with the other;
a library of alignment templates,
said server comprising said library of alignment templates,
each said alignment template being different one from the other and representational of an alignment template frame of a photo realistic human talking head having an alignment template head angular position, comprising a template head tilt, a template head nod, and a template head swivel component,
each said alignment template frame different one form the other,
each said alignment template head angular position different one from the other;
a controller,
said server comprising said controller,
said controller selecting a said alignment template from said library of alignment templates corresponding to a specified alignment template head angular position and having an image output signal representational of said alignment template;

a video camera,
  said wireless handheld device comprising said video camera,
  said video camera collecting an image of a human subject having a head having a human subject head angular position, comprising a human subject head tilt, a human subject head nod, and a human subject head swivel component,
  said video camera having an output signal representational of said collected image of said human subject,
  said wireless handheld device communicating said output signal of said video camera representational of said collected image of said human subject to said server via said wireless network;
said server,
  said server having an input receiving said output signal of said video camera representational of said collected image of said human subject,
  said server having a mixer,
  said server receiving said selected alignment template image output signal from said controller, and communicating said selected alignment template image output signal and said received collected image signal of said human subject to said mixer,
  said mixer receiving said selected alignment template image output signal and said communicated collected image signal of said human subject, and mixing one with the other into an output signal representational of a composite image of said collected image of said human subject and said selected alignment template, and communicating said composite image signal of said collected image of said human subject and said selected alignment template to said server,
  said server having an output signal representational of said composite image signal of said collected image of said human subject and said selected alignment template received from said mixer,
  said server communicating said output signal representational of said composite image signal of said collected image of said human subject and said selected alignment template to said wireless handheld device via said wireless network;
a display,
  said wireless handheld device comprising said display,
  said display having an input receiving said output signal representational of said composite image signal of said collected image of said human subject and said selected alignment template,
  said display and said video camera adapted to allow said video camera to collect said image of said human subject and said human subject to view said composite image and said human subject to align said image of said head of said human subject with said alignment template head at substantially the same angular position as said specified alignment template head angular position;
storage means storing a library of collected images of said human subject with said head of said subject at different human subject head angular positions,
  said server comprising said storage means,
  said server communicating said received collected image signal of said human subject to said storage means,
  said storage means receiving and storing said received collected image signal of said human subject as a stored image of said human subject, when said human subject has said head of said human subject substantially aligned with said alignment template head,
  said stored image of said human subject having said human subject head angular position substantially the same as said specified alignment template head angular position,
  each said stored image in said library of collected images being different one from the other,
  each said stored image human subject head angular position different one from the other;
  each said stored image human subject head angular position of said library of collected images corresponding to and substantially the same as and aligned with a selected said alignment template head angular position of said library of alignment templates;
  each said stored image representing a different frame of a photo realistic human talking head.

24. The apparatus for constructing a photo realistic human talking head according to claim 23, wherein said server comprises a computer comprising said library of alignment templates.

25. The apparatus for constructing a photo realistic human talking head according to claim 23, wherein said server comprises a computer comprising said controller.

26. The apparatus for constructing a photo realistic human talking head according to claim 23, wherein said server comprises a computer comprising at least one program, said at least one program comprising said mixer.

27. The apparatus for constructing a photo realistic human talking head according to claim 23, wherein said server comprises a computer comprising said storage means.

28. The apparatus for constructing a photo realistic human talking head according to claim 23, wherein said collected image of said human subject further comprises additional collected images of at least one facial characteristic of said head of said human subject corresponding to said specified alignment template head angular position, said library of collected images further comprises different stored images of said at least one facial characteristic at each said different human subject head angular position;
  each said stored facial characteristic image representing an additional frame of said photo realistic human talking head.

29. The apparatus for constructing a photo realistic human talking head according to claim 28, wherein said at least one facial characteristic comprises different mouth forms.

30. The apparatus for constructing a photo realistic human talking head according to claim 28, wherein said at least one facial characteristic comprises different eye forms.

31. The apparatus for constructing a photo realistic human talking head according to claim 29, wherein said at least one facial characteristic comprises different eye forms.

32. The apparatus for constructing a photo realistic human talking head according to claim 23, wherein said server comprises a computer comprising at least one program comprising said controller, which comprises a control program.

33. The apparatus for constructing a photo realistic human talking head according to claim 32, wherein said alignment template has at least one characteristic, said control program is adapted to control said at least one characteristic of said selected alignment template.

34. The apparatus for constructing a photo realistic human talking head according to claim 32, wherein said collected image of said human subject has at least one characteristic, said control program is adapted to control said at least one characteristic of said collected image of said human subject.

35. The apparatus for constructing a photo realistic human talking head according to claim 33, wherein said collected image of said human subject has at least one characteristic, said control program is adapted to control said at least one characteristic of said collected image of said human subject.

36. The apparatus for constructing a photo realistic human talking head according to claim 24, wherein said library of alignment templates comprises at least two libraries of alignment templates.

37. The apparatus for constructing a photo realistic human talking head according to claim 36, wherein each said library of alignment templates is representational of a human talking head having different facial features.

38. The apparatus for constructing a photo realistic human talking head according to claim 23, wherein said mixer comprises a software mixer.

39. The apparatus for constructing a photo realistic human talking head according to claim 23, wherein said wireless network further comprises a distributed network.

40. The apparatus for constructing a photo realistic human talking head according to claim 39, wherein said distributed network comprises the internet.

41. The apparatus for constructing a photo realistic human talking head according to claim 23, wherein said wireless network is from the group consisting of a cellular network, a wireless network, a wireless digital network, a distributed network, the internet, a global network, a wide area network, a metropolitan area network, a local area network, and combination thereof.

42. The apparatus for constructing a photo realistic human talking head according to claim 23, wherein said wireless handheld device is from the group consisting of a cell phone, a personal digital assistant, a PDA, a web-enabled phone, a portable phone, a personal computer, a laptop computer, a tablet computer, a video phone, a television, a handheld television, a wireless digital camera, a wireless camcorder, a wireless camera having a display, an e-mail device, an instant messaging device, a pc phone, a video conferencing device, a mobile phone, a handheld device, a wireless device, and a wireless handheld device.

43. The apparatus for constructing a photo realistic human talking head according to claim 23, wherein said server comprises a computer that is adapted to translate said received collected image signal to computer readable format.

44. The apparatus for constructing a photo realistic human talking head according to claim 23, wherein said apparatus for constructing a photo realistic human talking head is a do-it-yourself apparatus for constructing a photo realistic human talking head.

45. A device for constructing a photo realistic human talking head, comprising:
a library of alignment templates,
each said alignment template being different one from the other and representational of an alignment template frame of a photo realistic human talking head having an alignment template head angular position, comprising a template head tilt, a template head nod, and a template head swivel component,
each said alignment template frame different one form the other,
each said alignment template head angular position different one from the other;
a controller,
said controller selecting a said alignment template from said library of alignment templates corresponding to a specified alignment template head angular position and having an image output signal representational of said alignment template;
a video camera,
said video camera collecting an image of a human subject having a head having a human subject head angular position, comprising a human subject head tilt, a human subject head nod, and a human subject head swivel component,
said video camera having an output signal representational of said collected image of said human subject;
a computer,
said computer having an input receiving said output signal of said video camera representational of said collected image of said human subject,
said computer having a mixer,
said computer receiving said selected alignment template image output signal from said controller, and communicating said selected alignment template image output signal and said received collected image signal of said human subject to said mixer,
said mixer receiving said selected alignment template image output signal and said communicated collected image signal of said human subject, and mixing one with the other into an output signal representational of a composite image of said collected image of said human subject and said selected alignment template, and communicating said composite image signal of said collected image of said human subject and said selected alignment template to said computer,
said computer having an output signal representational of said composite image signal of said collected image of said human subject and said selected alignment template received from said mixer;
a display,
said display having an input receiving said computer output signal representational of said composite image signal of said collected image of said human subject and said selected alignment template,
said display and said video camera adapted to allow said video camera to collect said image of said human subject and said human subject to view said composite image and said human subject to align said image of said head of said human subject with said alignment template head at substantially the same angular position as said specified alignment template head angular position;
storage means storing a library of collected images of said human subject with said head of said subject at different human subject head angular positions,
said computer communicating said received collected image signal of said human subject to said storage means,
said storage means receiving and storing said received collected image signal of said human subject as a stored image of said human subject, when said human subject has said head of said human subject substantially aligned with said alignment template head,
said stored image of said human subject having said human subject head angular position substantially the same as said specified alignment template head angular position,
each said stored image in said library of collected images being different one from the other,
each said stored image human subject head angular position different one from the other;

each said stored image human subject head angular position of said library of collected images corresponding to and substantially the same as and aligned with a selected said alignment template head angular position of said library of alignment templates;

each said stored image representing a different frame of a photo realistic human talking head.

46. The device for constructing a photo realistic human talking head according to claim 45, wherein said computer comprises said library of alignment templates.

47. The device for constructing a photo realistic human talking head according to claim 45, wherein said computer comprises said controller.

48. The device for constructing a photo realistic human talking head according to claim 45, wherein said computer comprises at least one program, said at least one program comprising said mixer.

49. The device for constructing a photo realistic human talking head according to claim 45, wherein said computer comprises said storage means.

50. The device for constructing a photo realistic human talking head according to claim 45, wherein said collected image of said human subject further comprises additional collected images of at least one facial characteristic of said head of said human subject corresponding to said specified alignment template head angular position, said library of collected images further comprises different stored images of said at least one facial characteristic at each said different human subject head angular position;

each said stored facial characteristic image representing an additional frame of said photo realistic human talking head.

51. The device for constructing a photo realistic human talking head according to claim 50, wherein said at least one facial characteristic comprises different mouth forms.

52. The device for constructing a photo realistic human talking head according to claim 50, wherein said at least one facial characteristic comprises different eye forms.

53. The device for constructing a photo realistic human talking head according to claim 51, wherein said at least one facial characteristic comprises different eye forms.

54. The device for constructing a photo realistic human talking head according to claim 45, wherein said computer comprises at least one program comprising said controller, which comprises a control program.

55. The device for constructing a photo realistic human talking head according to claim 54, wherein said alignment template has at least one characteristic, said control program is adapted to control said at least one characteristic of said selected alignment template.

56. The device for constructing a photo realistic human talking head according to claim 54, wherein said collected image of said human subject has at least one characteristic, said control program is adapted to control said at least one characteristic of said collected image of said human subject.

57. The device for constructing a photo realistic human talking head according to claim 55, wherein said collected image of said human subject has at least one characteristic, said control program is adapted to control said at least one characteristic of said collected image of said human subject.

58. The device for constructing a photo realistic human talking head according to claim 46, wherein said library of alignment templates comprises at least two libraries of alignment templates.

59. The device for constructing a photo realistic human talking head according to claim 58, wherein each said library of alignment templates is representational of a human talking head having different facial features.

60. The device for constructing a photo realistic human talking head according to claim 45, wherein said mixer comprises a software mixer.

61. The device for constructing a photo realistic human talking head according to claim 45, wherein said display is from the group consisting of a monitor, a display, and a television.

62. The device for constructing a photo realistic human talking head according to claim 45, wherein said video camera is mounted to said display, said display comprising a monitor.

63. The device for constructing a photo realistic human talking head according to claim 45, wherein said video camera is mounted atop said display, said display comprising a monitor.

64. The device for constructing a photo realistic human talking head according to claim 45, wherein said device for constructing a photo realistic human talking head has an adjustable cantilevered support arm adapted to support said video camera.

65. The device for constructing a photo realistic human talking head according to claim 64, wherein said adjustable cantilevered support arm is mounted to said display, said display comprising a monitor.

66. The apparatus for constructing a photo realistic human talking head according to claim 45, wherein said server comprises a computer that is adapted to translate said received collected image signal to computer readable format.

67. The apparatus for constructing a photo realistic human talking head according to claim 45, wherein said apparatus for constructing a photo realistic human talking head is a do-it-yourself apparatus for constructing a photo realistic human talking head.

68. A method of constructing a photo realistic human talking head, comprising at least the following steps:

selecting an alignment template from a library of alignment templates, each said alignment template being different one from the other and representational of an alignment template frame of a photo realistic human talking head having an alignment template head angular position, comprising a template head tilt, a template head nod, and a template head swivel component, each said alignment template frame different one form the other, each said alignment template head angular position different one from the other;

collecting an image of a human subject with a video camera;

communicating said collected image of said human subject to a computer, comprising a mixer;

mixing said collected image of said human subject with an image of said selected alignment template in said mixer, thus, creating a composite image of said human subject and said selected alignment template;

communicating said composite image to a display for display to said human subject, said display adapted to facilitate said human subject aligning an image of a head of said human subject with said image of said selected alignment template;

substantially aligning said head of said human subject, having a human subject head angular position, comprising a human subject head tilt, a human subject head nod, and a human subject head swivel component, with said image of said selected alignment template head at substantially the same angular position as said selected alignment template head angular position;

collecting and storing an image of said substantially aligned human subject in a library of collected images, each said collected image having a different human subject angular position, which is substantially the same as a said selected alignment template head angular position, each said stored image representing a different frame of a photo realistic human talking head.

69. The method of constructing a photo realistic human talking head according to claim 68, wherein said computer comprises at least one program, said at least one program comprising said mixer having a mixer program, said mixer program adapted to create said composite image from said collected image of said human subject and said image of said selected alignment template.

70. The method of constructing a photo realistic human talking head according to claim 68, further comprising:

capturing different facial characteristics of said substantially aligned human subject head at substantially the same angular position as said selected alignment template head angular position storing images of said different facial characteristics in said library of collected images, each said stored facial characteristic image representing an additional frame of said photo realistic human talking head.

71. The method of constructing a photo realistic human talking head according to claim 68, further comprising:

capturing mouth forms.

72. The method of constructing a photo realistic human talking head according to claim 68, further comprising:

capturing eye forms.

73. The method of constructing a photo realistic human talking head according to claim 68, further comprising:

capturing mouth forms and eye forms.

74. The method of constructing a photo realistic human talking head according to claim 73, further comprising:

capturing additional facial characteristics.

75. The method of constructing a photo realistic human talking head according to claim 68, wherein said method of constructing a photo realistic human talking head is a do-it-yourself method of constructing a photo realistic human talking head.

* * * * *